US010836528B2

(12) United States Patent
Lester et al.

(10) Patent No.: US 10,836,528 B2
(45) Date of Patent: Nov. 17, 2020

(54) METHODS OF SEALING FLEXIBLE CONTAINERS WITH EXPANSION MATERIALS

(71) Applicant: The Procter & Gamble Company, Cincinnati, OH (US)

(72) Inventors: Joseph Craig Lester, Liberty Township, OH (US); Marc Richard Bourgeois, Liberty Township, OH (US); Benjamin Jacob Clare, Cincinnati, OH (US); Jun You, West Chester, OH (US); Mark Levandoski, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 362 days.

(21) Appl. No.: 15/953,535

(22) Filed: Apr. 16, 2018

(65) Prior Publication Data
US 2018/0312286 A1 Nov. 1, 2018

Related U.S. Application Data

(60) Provisional application No. 62/490,870, filed on Apr. 27, 2017.

(51) Int. Cl.
B65B 31/00 (2006.01)
B65B 61/24 (2006.01)
(Continued)

(52) U.S. Cl.
CPC ............ B65B 61/24 (2013.01); B65B 1/02 (2013.01); B65B 3/02 (2013.01); B65B 9/087 (2013.01);
(Continued)

(58) Field of Classification Search
CPC .. B65B 3/00; B65B 3/02; B65B 43/00; B65B 43/06; B65B 43/08; B65B 31/006; B65B 61/24
(Continued)

(56) References Cited

U.S. PATENT DOCUMENTS 3,975,885 A 8/1976 Carlisle
4,044,867 A 8/1977 Fisher
(Continued)

FOREIGN PATENT DOCUMENTS

CA 2482555 A1 10/1999
CN 1640777 7/2005
(Continued)

OTHER PUBLICATIONS

International Search Report and Written Opinion dated Jun. 8, 2018, 18 pgs.
(Continued)

Primary Examiner — Chelsea E Stinson
(74) Attorney, Agent, or Firm — Amanda T Barry

(57) ABSTRACT

In methods of making disposable, flexible containers for fluent products, methods of sealing the flexible containers when such containers include expansion materials, are disclosed. The methods include forming a partially completed container blank that has layers of flexible materials. The layered structure includes a first space for a fluent product, and a second space for an expansion material. The methods of sealing the flexible containers include adding an expansion material into the second space and pressing parts of at least some of the layers together to close off the second space.

20 Claims, 22 Drawing Sheets

(51) Int. Cl.

| | | |
|---|---|---|
| *B65B 1/02* | (2006.01) | |
| *B65B 3/02* | (2006.01) | |
| *B65D 75/58* | (2006.01) | |
| *B65D 75/26* | (2006.01) | |
| *B65D 65/40* | (2006.01) | |
| *B65D 75/00* | (2006.01) | |
| *B65B 51/14* | (2006.01) | |
| *B65B 43/26* | (2006.01) | |
| *B65B 9/093* | (2012.01) | |
| *B65B 39/12* | (2006.01) | |
| *B65B 9/087* | (2012.01) | |
| *B65B 61/18* | (2006.01) | |
| *B65B 43/06* | (2006.01) | |
| *B65B 61/00* | (2006.01) | |
| *B65B 61/06* | (2006.01) | |
| *B65B 61/02* | (2006.01) | |

(52) U.S. Cl.
CPC ............ *B65B 9/093* (2013.01); *B65B 31/006* (2013.01); *B65B 39/12* (2013.01); *B65B 43/06* (2013.01); *B65B 43/26* (2013.01); *B65B 51/146* (2013.01); *B65B 61/005* (2013.01); *B65B 61/02* (2013.01); *B65B 61/06* (2013.01); *B65B 61/18* (2013.01); *B65D 65/40* (2013.01); *B65D 75/008* (2013.01); *B65D 75/26* (2013.01); *B65D 75/5811* (2013.01)

(58) Field of Classification Search
USPC ........................... 53/410, 412, 459, 558, 562
See application file for complete search history.

(56) References Cited

U.S. PATENT DOCUMENTS

| | | | |
|---|---|---|---|
| 4,949,530 | A | 8/1990 | Pharo |
| 4,988,016 | A | 1/1991 | Hawkins et al. |
| 5,137,154 | A | 8/1992 | Cohen |
| 5,140,801 | A | 8/1992 | Wild |
| 5,170,609 | A | 12/1992 | Bullock et al. |
| 5,960,975 | A | 10/1999 | Lennartsson |
| 6,244,466 | B1 | 6/2001 | Naslund |
| 6,520,491 | B2 | 2/2003 | Timlick |
| 7,207,717 | B2 | 4/2007 | Steele |
| 7,585,528 | B2 | 9/2009 | Ferri et al. |
| 8,181,428 | B2 | 5/2012 | Gustafsson |
| 8,540,094 | B2 | 9/2013 | Riedl |
| 8,661,772 | B2 | 3/2014 | Yasuhira |
| 8,662,751 | B2 | 3/2014 | Forss |
| 9,327,867 | B2 | 5/2016 | Stanley et al. |
| 9,586,744 | B2 | 3/2017 | Arent et al. |
| 9,694,942 | B2 | 7/2017 | Stanley et al. |
| 9,802,719 | B2* | 10/2017 | Stanley .............. B65D 81/3261 |
| 10,640,247 | B2* | 5/2020 | Bourgeois ............. B65B 39/007 |
| 2003/0094394 | A1 | 5/2003 | Anderson et al. |
| 2003/0096068 | A1 | 5/2003 | Peper |
| 2004/0035865 | A1 | 2/2004 | Rosen |
| 2005/0126941 | A1 | 6/2005 | Ferri et al. |
| 2006/0030471 | A1 | 2/2006 | Schaller |
| 2007/0092164 | A1 | 4/2007 | Yasuhira |
| 2010/0308062 | A1 | 12/2010 | Helou, Jr. |
| 2012/0097634 | A1 | 4/2012 | Riedl |
| 2013/0167481 | A1* | 7/2013 | Yasuhira ................. B65B 55/20 53/403 |
| 2013/0292287 | A1 | 11/2013 | Stanley et al. |
| 2013/0292353 | A1 | 11/2013 | Stanley et al. |
| 2013/0292395 | A1 | 11/2013 | Stanley et al. |
| 2013/0292413 | A1 | 11/2013 | Stanley et al. |
| 2013/0292415 | A1 | 11/2013 | Stanley et al. |
| 2013/0294711 | A1 | 11/2013 | Stanley et al. |
| 2013/0337244 | A1 | 12/2013 | Stanley et al. |
| 2014/0033654 | A1 | 2/2014 | Stanley et al. |
| 2014/0033655 | A1 | 2/2014 | Stanley et al. |
| 2014/0250834 | A1 | 9/2014 | Yoshikane et al. |
| 2015/0033671 | A1* | 2/2015 | Stanley .................. B65B 43/30 53/410 |
| 2015/0034662 | A1 | 2/2015 | Stanley et al. |
| 2015/0034670 | A1 | 2/2015 | Stanley et al. |
| 2015/0036950 | A1 | 2/2015 | Stanley et al. |
| 2015/0121810 | A1 | 5/2015 | Bourgeois et al. |
| 2015/0122373 | A1 | 5/2015 | Bourgeois et al. |
| 2015/0122840 | A1* | 5/2015 | Cox .................... B65D 75/5877 222/159 |
| 2015/0122841 | A1 | 5/2015 | McGuire et al. |
| 2015/0122842 | A1 | 5/2015 | Berg, Jr. et al. |
| 2015/0122846 | A1 | 5/2015 | Stanley et al. |
| 2015/0125099 | A1 | 5/2015 | Ishihara et al. |
| 2015/0125574 | A1 | 5/2015 | Arent et al. |
| 2015/0126349 | A1 | 5/2015 | Ishihara et al. |
| 2016/0176578 | A1 | 6/2016 | Stanley et al. |
| 2016/0176582 | A1 | 6/2016 | McGuire et al. |
| 2016/0176583 | A1 | 6/2016 | Ishihara et al. |
| 2016/0176584 | A1 | 6/2016 | Ishihara et al. |
| 2016/0176597 | A1 | 6/2016 | Ishihara et al. |
| 2016/0221727 | A1 | 8/2016 | Stanley et al. |
| 2016/0297569 | A1 | 10/2016 | Berg, Jr. et al. |
| 2016/0297589 | A1 | 10/2016 | You et al. |
| 2016/0297590 | A1* | 10/2016 | You .................... B05B 11/00412 |
| 2016/0297591 | A1* | 10/2016 | You .................... B65D 75/5872 |
| 2016/0325518 | A1 | 11/2016 | Ishihara et al. |
| 2016/0362228 | A1 | 12/2016 | McGuire et al. |
| 2017/0001782 | A1 | 1/2017 | Arent et al. |
| 2017/0305609 | A1 | 10/2017 | McGuire et al. |
| 2017/0305627 | A1 | 10/2017 | Arent et al. |
| 2018/0079574 | A1 | 3/2018 | Ishihara et al. |
| 2018/0236741 | A1 | 8/2018 | Hargett et al. |
| 2018/0237172 | A1 | 8/2018 | Lester et al. |
| 2018/0257836 | A1 | 9/2018 | McGuire et al. |
| 2018/0297725 | A1* | 10/2018 | Bourgeois ................. B65B 3/02 |
| 2018/0312283 | A1* | 11/2018 | Bourgeois ............... B65B 9/093 |
| 2018/0312286 | A1 | 11/2018 | Lester et al. |

FOREIGN PATENT DOCUMENTS

| | | |
|---|---|---|
| DE | 102005002301 | 2/2006 |
| EP | 2631195 A1 | 8/2013 |
| JP | AH107159 | 1/1998 |
| JP | 10129621 A * | 5/1998 |
| JP | 2005343492 | 12/2005 |
| JP | 2006027697 | 2/2006 |
| JP | 2006240651 | 9/2006 |
| JP | 2009184690 | 8/2009 |
| JP | 4639677 | 2/2011 |
| JP | 4736364 | 7/2011 |
| JP | 2012025394 | 2/2012 |
| JP | 2014094758 | 5/2014 |
| RU | 2038815 | 7/1995 |
| WO | WO1996001775 | 1/1996 |
| WO | WO9801354 | 1/1998 |
| WO | WO02085729 | 10/2002 |
| WO | WO2005063589 | 7/2005 |
| WO | WO2008064508 | 6/2008 |
| WO | WO2012073004 | 6/2012 |
| WO | WO2013124201 | 8/2013 |

OTHER PUBLICATIONS

Campbell, Phillip John, "The Rigidified Standing Pouch—A Concept for Flexible Packaging", A Thesis Written In Partial Fulfillment Of The Requirements For The Degree Of Master Of Industrial Design, North Carolina State University School Of Design Raleigh, 1993, pp. 1-35.
All Office Actions, U.S. Appl. No. 13/957,158, filed Aug. 1, 2013.
All Office Actions, U.S. Appl. No. 13/957,187, filed Aug. 1, 2013.
All Office Actions, U.S. Appl. No. 14/534,210, filed Nov. 6, 2014.
All Office Actions, U.S. Appl. No. 14/534,213, filed Nov. 6, 2014.
All Office Actions, U.S. Appl. No. 14/534,214, filed Nov. 6, 2014.
All Office Actions, U.S. Appl. No. 15/148,395, filed May 6, 2016.
All Office Actions, U.S. Appl. No. 15/534,197, filed Nov. 6, 2014.

(56) References Cited

OTHER PUBLICATIONS

All Office Actions, U.S. Appl. No. 15/198,472, filed Jun. 30, 2016.
U.S. Appl. No. 15/953,691, filed Apr. 16, 2018, Marc Richard Bourgeois et al.

* cited by examiner

METHODS OF SEALING FLEXIBLE CONTAINERS WITH EXPANSION MATERIALS

FIELD

The present disclosure relates in general to methods of making flexible containers, and in particular, to methods of sealing flexible containers that include expansion materials.

BACKGROUND

Fluent products include liquid products and/or pourable solid products. In various embodiments, a container can be used to receive, contain, and dispense one or more fluent products. And, in various embodiments, a container can be used to receive, contain, and/or dispense individual articles or separately packaged portions of a product. A container can include one or more product spaces. A product space can be configured to be filled with one or more fluent products. A container receives a fluent product when its product space is filled. Once filled to a desired volume, a container can be configured to contain the fluent product in its product space, until the fluent product is dispensed. A container contains a fluent product by providing a barrier around the fluent product. The barrier prevents the fluent product from escaping the product space. The barrier can also protect the fluent product from the environment outside of the container. A filled product space is typically closed off by a cap, seal, or dispenser. A container can be configured to dispense one or more fluent products contained in its product space(s). Once dispensed, an end user can consume, apply, or otherwise use the fluent product(s), as appropriate. In various embodiments, a container may be configured to be refilled and reused or a container may be configured to be disposed of after a single fill or even after a single use. A container is configured with sufficient structural integrity, such that it can receive, contain, and dispense its fluent product(s), as intended, without failure.

A container for fluent product(s) can be handled, displayed for sale, and put into use. A container can be handled in many different ways as it is made, filled, decorated, packaged, shipped, and unpacked. A container can experience a wide range of external forces and environmental conditions as it is handled by machines and people, moved by equipment and vehicles, and contacted by other containers and various packaging materials. A container for fluent product(s) is configured with sufficient structural integrity, such that it can be handled in any of these ways, or in any other way known in the art, as intended, without failure.

A container can also be displayed for sale in many different ways as it is offered for purchase. A container can be offered for sale as an individual article of commerce or packaged with one or more other containers or products, which together form an article of commerce. A container can be offered for sale as a primary package with or without a secondary package. A container can be decorated to display characters, graphics, branding, and/or other visual elements when the container is displayed for sale. A container can be configured to be displayed for sale while laying down or standing up on a store shelf, while presented in a merchandising display, while hanging on a display hanger, or while loaded into a display rack or a vending machine. A container for fluent product(s) can be configured with a structure that allows it to be displayed in any of these ways, or in any other way known in the art, as intended, without failure.

A container can also be put into use in many different ways, by its end user. A container can be configured to be held and/or gripped by an end user, so a container is appropriately sized and shaped for human hands; and for this purpose, a container can include useful structural features such as a handle and/or a gripping surface. A container can be stored while laying down or standing up on a support surface, while hanging on or from a projection such as a hook or a clip, or while supported by a product holder, or (for refillable or rechargeable containers) positioned in a refilling or recharging station. A container can be configured to dispense fluent product(s) while in any of these storage positions or while being held by the user. A container can be configured to dispense fluent product(s) through the use of gravity, and/or pressure, and/or a dispensing mechanism, such as a pump, or a straw, or through the use of other kinds of dispensers known in the art. Some containers can be configured to be filled and/or refilled by a seller (e.g. a merchant or retailer) or by an end user. A container for fluent product(s) is configured with a structure that allows it to be put to use in any of these ways, or in any other way known in the art, as intended, without failure. A container can also be configured to be disposed of by the end user, as waste and/or recyclable material, in various ways.

One conventional type of container for fluent products is a rigid container made from solid material(s). Examples of conventional rigid containers include molded plastic bottles, glass jars, metal cans, cardboard boxes, etc. These conventional rigid containers are well-known and generally useful; however their designs do present several notable difficulties.

First, some conventional rigid containers for fluent products can be expensive to make. Some rigid containers are made by a process shaping one or more solid materials. Other rigid containers are made with a phase change process, where container materials are heated (to soften/melt), then shaped, then cooled (to harden/solidify). Both kinds of making are energy intensive processes, which can require complex equipment.

Second, some conventional rigid containers for fluent products can require significant amounts of material. Rigid containers that are designed to stand up on a support surface require solid walls that are thick enough to support the containers when they are filled. This can require significant amounts of material, which adds to the cost of the containers and can contribute to difficulties with their disposal.

Third, some conventional rigid containers for fluent products can be difficult to decorate. The sizes, shapes, (e.g. curved surfaces) and/or materials of some rigid containers, make it difficult to print directly on their outside surfaces. Labeling requires additional materials and processing, and limits the size and shape of the decoration. Overwrapping provides larger decoration areas, but also requires additional materials and processing, often at significant expense.

Fourth, some conventional rigid containers for fluent products can be prone to certain kinds of damage. If a rigid container is pushed against a rough surface, then the container can become scuffed, which may obscure printing on the container. If a rigid container is pressed against a hard object, then the container can become dented, which may look unsightly. And if a rigid container is dropped, then the container can rupture, which may cause its fluent product to be lost.

Fifth, some fluent products in conventional rigid containers can be difficult to dispense. When an end user squeezes a rigid container to dispense its fluent product, the end user must overcome the resistance of the rigid sides, to deform the container. Some users may lack the hand strength to easily overcome that resistance; these users may dispense less than their desired amount of fluent product. Other users may need to apply so much of their hand strength, that they cannot easily control how much they deform the container; these users may dispense more than their desired amount of fluent product.

Sixth, when using conventional rigid containers, it can be difficult for a manufacturer to change such containers from one product size to another product size. When a product manufacturer offers a fluent product in a conventional rigid container, and the manufacturer needs to change the size of the product, the change usually requires the manufacturer to make and use a new size of container for the new amount. Unfortunately, making a new size of that container can be costly, time-consuming, and challenging to coordinate.

SUMMARY

The present disclosure describes various embodiments of making flexible containers, and in particular, to methods of adding expansion materials to flexible containers. These containers offer a number of advantages, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to print and/or decorate, because they are made from flexible materials, and flexible materials can be printed and/or decorated as conformable webs, before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands. Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed and put into use, as intended, without failure. Sixth, these flexible containers can be configured with easily variable sizing, allowing a product manufacturer to change a product's size with less expense, in less time, and with less coordination, when compared with conventional rigid containers.

DETAILED DESCRIPTION

The present disclosure describes various embodiments of containers made from flexible material. Because these containers are made from flexible material, these containers offer a number of advantages, when compared with conventional rigid containers.

Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed for sale and put into use, as intended, without failure.

Figure 1A:
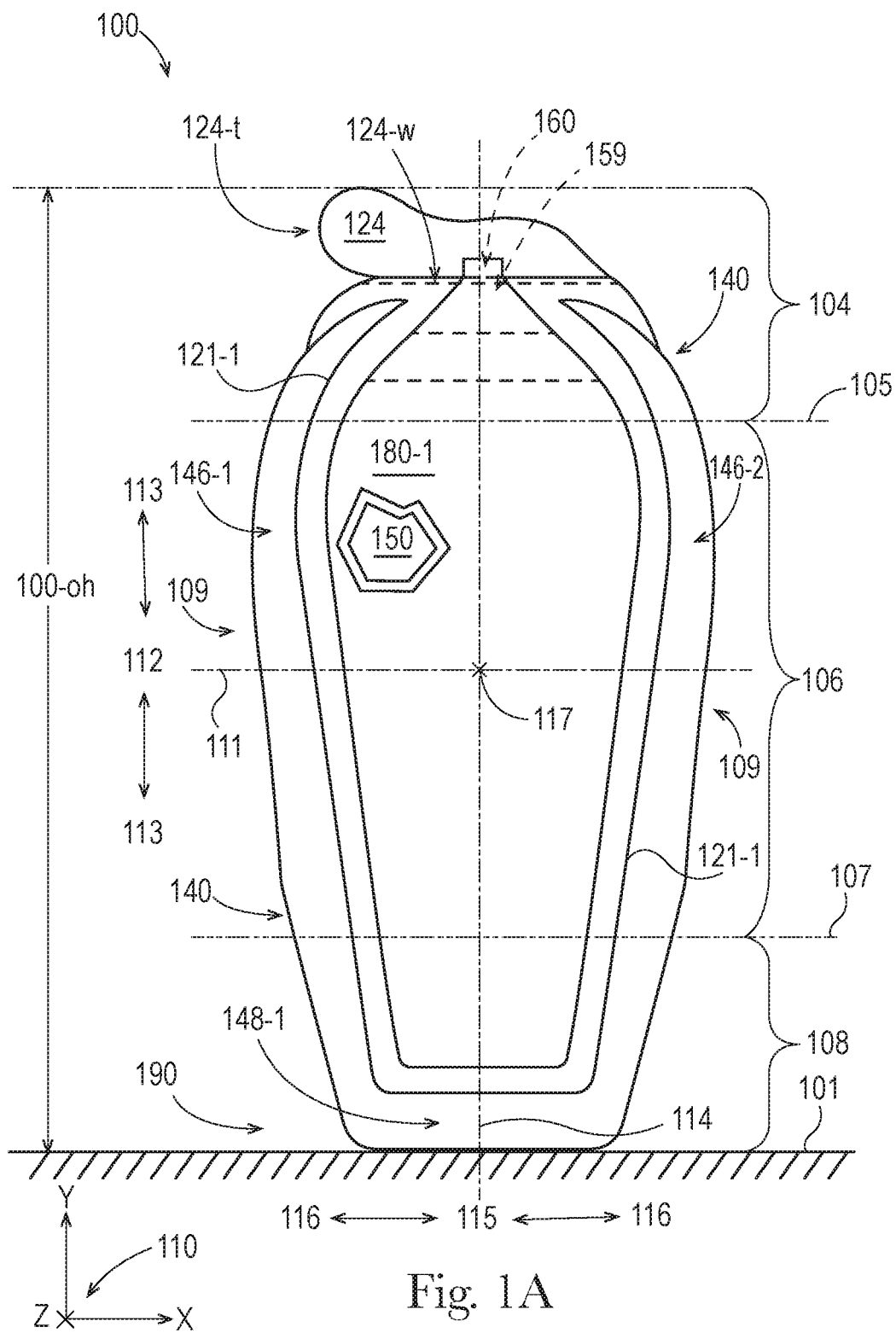
FIG. 1A illustrates a front view of an embodiment of a stand up flexible container.

FIGS. 1A-1G illustrate various views of an embodiment of a stand up flexible container 100 formed from one or more flexible materials, as described herein. FIG. 1A illustrates a front view of the container 100, which has an overall shape like a conventional bottle, although this is not required. The container 100 is standing upright on a horizontal support surface 101. The flexible container 100 is a film-based container, made entirely of film laminates; however, in various alternative embodiments, one or more other flexible materials can also be used to make a flexible container.

In the embodiments of FIG. 1A-1G, a coordinate system 110, provides lines of reference for referring to directions in each of these figures. The coordinate system 110 is a three-dimensional Cartesian coordinate system with an X-axis, a Y-axis, and a Z-axis, wherein each axis is perpendicular to the other axes, and any two of the axes define a plane. The X-axis and the Z-axis are parallel with the horizontal support surface 101 and the Y-axis is perpendicular to the horizontal support surface 101.

FIGS. 1A-1G also includes other lines of reference, for referring to directions and locations with respect to the container 100. A lateral centerline 111 runs parallel to the X-axis. An XY plane at the lateral centerline 111 separates the container 100 into a front half and a back half. An XZ plane at the lateral centerline 111 separates the container 100 into an upper half and a lower half. A longitudinal centerline 114 runs parallel to the Y-axis. A YZ plane at the longitudinal centerline 114 separates the container 100 into a left half and a right half. A third centerline 117 runs parallel to the Z-axis. The lateral centerline 111, the longitudinal centerline 114, and the third centerline 117 all intersect at a center of the container 100.

A disposition with respect to the lateral centerline 111 defines what is longitudinally inboard 112 and longitudinally outboard 113. A disposition with respect to the longitudinal centerline 114 defines what is laterally inboard 115 and laterally outboard 116. A disposition in the direction of the third centerline 117 and toward a front 102-1 of the container is referred to as forward 118 or in front of. A disposition in the direction of the third centerline 117 and toward a back 102-2 of the container is referred to as backward 119 or behind.

The container 100 includes a gusseted top 104, a middle 106, and a gusseted bottom 108, the front 102-1, the back 102-2, and left and right sides 109. The top 104 is separated from the middle 106 by a reference plane 105, which is parallel to the XZ plane. The middle 106 is separated from the bottom 108 by a reference plane 107, which is also parallel to the XZ plane. The container 100 has an overall height of 100-*oh*. In the embodiment of FIG. 1A, the front 102-1 and the back 102-2 of the container are joined together at an outer seal 129, which extends along portions of the sides 109 of the container 100. In various embodiments, any outer seal on a flexible container can be configured according to any of the embodiments for seams disclosed in U.S. patent application Ser. No. 14/448,440 filed Jul. 31, 2014, entitled "Flexible Containers having Improved Seam and Methods of Making the Same," published as US20150036950. The container 100 includes a sealed tear tab 124, a structural support frame 140, a product space 150, a dispenser 160, panels 180-1 and 180-2, and a base structure 190. A portion of panel 180-1 is illustrated as broken away, in order to illustrate the product space 150. The product space 150 is configured to contain one or more fluent products.

The tear tab 124 is formed at the distal end of a sealed leg 142-1 of a top gusset, disposed in the top 104 of the container 100, and in the front 102-1. When the tear off portion 124 is removed, by pulling on a protruding tab 124-*t*, and causing separation along a line of weakness 124-*w*, the container 100 can dispense fluent product(s) from the product space 150 through a flow channel 159 then through the dispenser 160 at the end of the flow channel 159, to the environment outside of the container 100. In various embodiments, the line of weakness can be any kind of line weakness as disclosed herein, as known in the art of flexible containers, or as disclosed in U.S. patent application Ser. No. 15/198,472 filed Jun. 30, 2016 entitled "Flexible Containers with Removable Portions."

In the embodiment of FIGS. 1A-1D, the dispenser 160 is disposed in the top 104, however, in various alternative embodiments, the dispenser 160 can be disposed anywhere else on the top 140, middle 106, or bottom 108, including anywhere on either of the sides 109, on either of the panels 180-1 and 180-2, and on any part of the base 190 of the container 100. The structural support frame 140 supports the mass of fluent product(s) in the product space 150, and makes the container 100 stand upright.

The panels 180-1 and 180-2 are nonstructural panels that are squeeze panels, made of layers of a film laminate. Panel 180-1 overlays a front of the product space 150. Substantially all of a periphery of the panel 180-1 is surrounded by a front panel seal 121-1. In various embodiments, about all, approximately all, nearly all, or all of a front panel can be surrounded by a front panel seal. Panel 180-2 overlays a back of the product space 150. Substantially all of a periphery of the panel 180-2 is surrounded by a back panel seal 121-2. In various embodiments, about all, approximately all, nearly all, or all of a back panel can be surrounded by a back panel seal. The panels 180-1 and 180-2 have exterior surfaces that are about flat, suitable for displaying any kind of characters, graphics, branding, and/or other visual elements. In various alternate embodiments, a panel of a flexible container can be configured to include any of the embodiments of surface elements disclosed in: U.S. patent application Ser. No. 14/448,396 filed Jul. 31, 2014, entitled "Disposable Flexible Containers Having Surface Elements," published as US20150034670; and/or in U.S. patent application Ser. No. 14/448,599 filed Jul. 31, 2014, entitled "Enhancements to Tactile Interaction with Film Walled Packaging Having Air Filled Structural Support Volumes," published as US20150034662; in any workable combination.

In various embodiments, a front or back panel can have an exterior surface that is approximately, substantially, nearly, or completely flat. However, in various embodiments, part, parts, or about all, or approximately all, or substantially all, or nearly all, or all of either or both of the panels 180-1 and 180-2 can include one or more curved surfaces. The base structure 190 is part of the structural support frame 140 and provides stability to the flexible container 100 as it stands upright. In various alternative embodiments, either of the panels 180-1 and 180-2 can be modified in any of the following ways: part, parts, or all of a front panel or a back panel can be replaced by one or more additional expanded structural support volumes; part, parts, or all of a front panel or a back panel can be filled with one or more fluent products; or part, parts, or all of a front panel or a back panel can include one or more additional materials, elements, components, or structures (of any kind disclosed herein); in some of these alternatives, the modified panel may no longer be considered a nonstructural panel and/or may no longer be considered a squeeze panel, as described herein.

In various embodiments, a front panel, a back panel, or any similar panel in a flexible container can be configured according to any of the embodiments: for multi-wall panels disclosed in U.S. patent application Ser. No. 13/888,679 filed May 7, 2013, entitled "Flexible Containers," published as US 20130292353; for squeeze panels disclosed in U.S.

patent application Ser. No. 13/888,963 filed May 7, 2013, entitled "Flexible Containers," published as US20130292395; for decoration panels disclosed in U.S. patent application Ser. No. 13/888,756 filed May 7, 2013, entitled "Flexible Containers," published as US20130292287; and/or for squeeze panels disclosed in U.S. patent application Ser. No. 15/094,096 filed Apr. 8, 2016, entitled "Flexible Containers having a Squeeze Panel," published as US20160221727; in any workable combination.

The structural support frame 140 is formed by a plurality of structural support members, each of which includes an expanded structural support volume, made from one or more film laminates that are locally sealed together. In the embodiment of FIGS. 1A-1G, the structural support frame 140 does not include any mechanical reinforcing elements; however, such elements may be included in various alternative embodiments. The structural support frame 140 includes top structural support member 144-2, middle structural support members 146-1, 146-2, 146-3, and 146-4, bottom structural support members 148-1 and 148-2, as well as bottom middle structural support members 149-1 and 149-2.

The top structural support member 144-2 is formed in a folded leg 142-2 of a top gusset, disposed in the top 104 of the container 100, and in the back 102-2. The top structural support member 144-2 is adjacent to the sealed leg 142-1 of the top gusset that includes the flow channel 159 and the dispenser 160. The flow channel 159 allows the container 100 to dispense fluent product(s) from the product space 150 through the flow channel 159 then through the dispenser 160. In the embodiment of FIGS. 1A-1G, the flow channel 159 and the dispenser are formed entirely from the flexible materials of the flexible container 100; however, in various embodiments part, parts, or all of a flow channel and/or part, parts, or all of a dispenser may include or be formed by one or more rigid materials or components. In various embodiments, a flow channel can be configured to provide visibility for fluent product(s) being dispensed, as they travel through the flow channel, as disclosed in U.S. patent application Ser. No. 15/094,293, filed on Apr. 8, 2016, entitled "Flexible Containers with Product Dispensing Visibility." And, in various embodiments, a flow channel and dispenser can be configured to dispense one or more fluent products from various locations at various orientations as disclosed in U.S. patent application Ser. No. 15/094,319, filed on Apr. 8, 2016, entitled "Flexible Containers with Biased Dispensing," published as US20160297569.

The top structural support member 144-2 is disposed above substantially all of the product space 150. Overall, the top structural support member 144-2 is oriented about horizontally, but with its ends curved slightly downward; however, these particular orientations and shapes are not required, and in various alternative embodiments can vary in any way described herein, for structural support members. In particular, for a top structural support member, part, parts, or all of either of its ends and/or its middle can be straight or curved, can be angled longitudinally upward or angled longitudinally downward and/or angled forward or angled backward and/or not angled such that the middle structural support volume is oriented about horizontally, approximately horizontally, substantially horizontally, nearly horizontally, or completely horizontally. The top structural support member 144-2 has a cross-sectional area that is substantially uniform along its length but the cross-sectional areas at its ends are slightly larger than the cross-sectional area in its middle; however, in various alternative embodiments their cross-sections can be configured in any way described herein, for structural support members.

The middle structural support members 146-1, 146-2, 146-3, and 146-4 are disposed on the left and right sides 109, from the top 104, through the middle 106, into the bottom 108. The middle structural support member 146-1 is disposed in the front 102-1, on the left side 109; the middle structural support member 146-4 is disposed in the back 102-2, on the left side 109, behind the middle structural support member 146-1. The middle structural support members 146-1 and 146-4 are adjacent to each other and in contact with each other along parts of their lengths, except that a lower portion of the middle structural support member 146-1 and a lower portion of the middle structural support member 146-4 are spaced apart from each other by a reinforcing seal 127. In various embodiments, the middle structural support members 146-1 and 146-4 can be in contact with each other at one or more relatively smaller locations and/or at one or more relatively larger locations, along part, or parts, or about all, or approximately all, or substantially all, or nearly all, or all of their overall lengths. The middle structural support members 146-1 and 146-4 are not directly connected to each other. However, in various alternative embodiments, the middle structural support members 146-1 and 146-4 can be directly connected and/or joined together along part, or parts, or about all, or approximately all, or substantially all, or nearly all, or all of their overall lengths.

The middle structural support member 146-2 is disposed in the front 102-1, on the right side 109; the middle structural support member 146-3 is disposed in the back 102-2, on the right side 109, behind the middle structural support member 146-2. The middle structural support members 146-2 and 146-3 are adjacent to each other and in contact with each other along substantially all of their lengths, except that a lower portion of the middle structural support member 146-2 and a lower portion of the middle structural support member 146-3 are spaced apart from each other by a reinforcing seal 127. In various embodiments, the middle structural support members 146-2 and 146-3 can be in contact with each other at one or more relatively smaller locations and/or at one or more relatively larger locations, along part, or parts, or about all, or approximately all, or substantially all, or nearly all, or all of their overall lengths. The middle structural support members 146-2 and 146-3 are not directly connected to each other. However, in various alternative embodiments, the middle structural support members 146-2 and 146-3 can be directly connected and/or joined together along part, or parts, or about all, or approximately all, or substantially all, or nearly all, or all of their overall lengths.

The middle structural support members 146-1, 146-2, 146-3, and 146-4 are disposed substantially laterally outboard from the product space 150. Overall, each of the middle structural support members 146-1, 146-2, 146-3, and 146-4 is oriented about vertically, but angled slightly, with its lower end straight and angled laterally outward, its middle gradually curved, and its upper end straight and angled laterally inward; however, these particular orientations and shapes are not required, and in various alternative embodiments can vary in any way described herein, for structural support members. In particular, for any or all of the middle structural support members, part, parts, or all of its lower end and/or its middle and/or its upper end can be about straight, approximately straight, substantially straight, nearly straight, completely straight, or curved, can be angled laterally inward or angled laterally outward and/or angled forward or angled backward and/or not angled such that the middle structural support volume is oriented about vertically, approximately vertically, substantially vertically, nearly vertically, or completely vertically. Each of the middle structural support members 146-1, 146-2, 146-3, and 146-4 has a cross-sectional area that varies along its length; however, in various alternative embodiments their cross-sections can be configured in any way described herein, for structural support members.

The bottom structural support members 148-1 and 148-2 are disposed on the bottom 108 of the container 100, each formed in a folded leg of a bottom gusset. The bottom structural support member 148-1 is disposed in the front 102-1 and the bottom structural support member 148-2 is disposed in the back 102-2, behind the bottom structural support member 148-1. The bottom structural support members 148-1 and 148-2 are substantially parallel to each other but are offset from each other and not in contact with each other.

The bottom structural support members 148-1 and 148-2 are disposed below substantially all of the product space 150, and are part of the base structure 190. Overall, each of the bottom structural support members 148-1 and 148-2 is oriented horizontally and substantially laterally, with its outward facing ends curved slightly upward; however, these particular orientations and shapes are not required, and in various alternative embodiments can vary in any way described herein, for structural support members. In particular, for a bottom structural support member, part, parts, or all of either of its ends and/or its middle can be straight or curved, can be angled longitudinally upward or angled longitudinally downward and/or angled forward or angled backward and/or not angled such that the bottom structural support member is oriented about horizontally, approximately horizontally, substantially horizontally, nearly horizontally, or completely horizontally. In various embodiments, a base structure in a flexible container can be configured according to any of the embodiments for base structures disclosed in U.S. patent application Ser. No. 13/888,679 filed May 7, 2013, entitled "Flexible Containers."

Each of the bottom structural support members 148-1 and 148-2 has a cross-sectional area that is substantially uniform along its length; however, in various alternative embodiments their cross-sections can be configured in any way described herein, for structural support members. For each of the bottom structural support members 148-1 and 148-2, substantially all of the overall length of the bottom structural support member is in contact with the horizontal support surface 101, when the container is standing up on the horizontal support surface 101. However, in various embodiments, about all, or approximately all, or substantially all, or nearly all, or all of a bottom structural support member may contact a horizontal support surface.

The bottom structural support members 148-1 and 148-2 are connected to each other by bottom middle structural support members 149-1 and 149-2, which are also part of the base structure 190. Overall, each of the bottom middle structural support members 149-1 and 149-2 is oriented horizontally and substantially parallel to a third centerline of a container; however, these particular orientations are not required, and in various alternative embodiments can vary in any way described herein, for structural support members. In particular, for a bottom middle structural support member, part, parts, or all of either of its ends and/or its middle can be straight or curved, can be angled longitudinally upward or angled longitudinally downward and/or angled laterally inward or angled laterally outward and/or not angled such that the middle structural support volume is oriented about horizontally, approximately horizontally, substantially horizontally, nearly horizontally, or completely horizontally. Each of the bottom middle structural support members 149-1 and 149-2 has a cross-sectional area that is smaller in its middle and larger at its ends; however, in various alternative embodiments their cross-sections can be configured in any way described herein, for structural support members. Each of the bottom middle structural support members 149-1 and 149-2 is in contact with the horizontal support 101 surface at its ends, but not at its middle, when the container is standing up on the horizontal support surface 101. However, in various embodiments, about all, or approximately all, or substantially all, or nearly all, or all of a bottom middle structural support member may contact a horizontal support surface. In various embodiments, where bottom structural support members are connected at a seam, the intersection of the folding and sealing that forms such connections can be configured to create puckered corners as disclosed in U.S. patent application Ser. No. 15/094,319, filed on Apr. 8, 2016, entitled "Flexible Containers with Puckered Corners," published as US20160297590.

In the base structure 190, the right end of the bottom structural support member 148-1 is joined to the front end of the bottom middle structural support member 149-2; the back end of the bottom middle structural support member 149-2 is joined to the right end of the bottom structural support member 148-2; the left end of the bottom structural support member 148-2 is joined to the back end of the bottom middle structural support member 149-1; and the front end of the bottom middle structural support member 149-1 is joined to the left end of the bottom structural support member 148-1. In an alternate embodiment, a base structure of a flexible container can be configured as disclosed in U.S. patent application Ser. No. 15/094,243, filed on Apr. 8, 2016, entitled "Flexible Container with Intermediate Bottom Member," published as US20160297591.

The structural support members 148-1, 149-2, 148-2, and 149-1, are joined together around a bottom panel seal 122, which fully surrounds and defines a bottom panel 191. The bottom panel 191 has an overall shape that is substantially rectangular, with rounded corners. In various embodiments, structural support members in a base structure may surround about all, or approximately all, or substantially all, or nearly all of a bottom panel. In alternative embodiments, any number of structural support members can be used to partially or fully surround a bottom panel having any shape. The bottom panel is made of a film laminate and is disposed below and adjacent to a bottom portion of the product space 150. In the embodiment of FIGS. 1A-1G, no part of the bottom panel 191 contacts the horizontal support surface 101 but all of the bottom panel 191 is raised off of the horizontal support surface 101; however, in various embodiments, approximately all, or substantially all, or nearly all, of a bottom panel may be raised off of a horizontal support surface while part, parts, or all of a bottom panel may contact a horizontal support surface. In various embodiments, a bottom panel can be constructed as disclosed in U.S. provisional patent application 62/327,625, filed on 16 May 2016, entitled "Flexible Containers with Bottom Support Structure." In some embodiments, part, parts, or all of a bottom panel may be transparent, such that the product space can be viewed through the bottom panel. In various embodiments, a bottom panel of a flexible container can be modified to include any of the embodiments of bottom faces disclosed in: U.S. patent application Ser. No. 15/094,118 filed Apr. 8, 2016, entitled "Flexible Containers and Methods of Forming the Same."

Each of the reinforcing seals 127 is formed by sealed portions that are bounded by edges that are shared with the bottom portions of middle structural support members and a middle portion of a bottom middle structural support member, on each side, such that each reinforcing seal 127 has an overall shape that is substantially triangular. On the left side 109 of the container 100, the reinforcing seal 127 is formed by sealed portions that are bounded by edges that are shared with the bottom portion of middle structural support members 146-1 and 146-4 and a middle portion of a bottom middle structural support member 149-1. On the right side 109 of the container 100, the reinforcing seal 127 is formed by sealed portions that are bounded by edges that are shared with the bottom portion of middle structural support members 146-2 and 146-3 and a middle portion of a bottom middle structural support member 149-2. In various embodiments, a reinforcing seal can be constructed as disclosed in U.S. patent application Ser. No. 15/094,262, filed on Apr. 8, 2016, entitled "Flexible Container with Reinforcing Seals," published as US20160297589.

In the front portion of the structural support frame 140, the upper end of the middle structural support member 146-1 is a free end (not connected to another structural support member) disposed toward one side 109 of the container 100, curving laterally inward; the lower end of the middle structural support member 146-1 is joined to the left end of the bottom structural support member 148-1; the right end of the bottom structural support member 148-1 is joined to the lower end of the middle structural support member 146-2; and the upper end of the middle structural support member 146-2 is a free end (not connected to another structural support member) disposed toward another side 109 of the container 100, curving laterally inward. The structural support members 146-1, 148-1, and 146-2, together surround substantially all of the panel 180-1, except for a gap between the upper end of the middle structural support member 146-1 and the upper end of the middle structural support member 146-2, which are not connected by a structural support member, to provide an unobstructed pathway for the flow channel 159. In various embodiments, about all, approximately all, nearly all, or all of a front panel of a flexible container can be surrounded by a plurality of structural support members.

Similarly, in the back portion of the structural support frame 140, the left end of the top structural support member 144-2 is joined to the upper end of the middle structural support member 146-4; the lower end of the middle structural support member 146-4 is joined to the left end of the bottom structural support member 148-2; the right end of the bottom structural support member 148-2 is joined to the lower end of the middle structural support member 146-3; and the upper end of the middle structural support member 146-3 is joined to the right end of the top structural support member 144-2. The structural support members 144-2, 146-2, 148-2, and 146-2, together surround all of the panel 180-2. In various embodiments, about all, approximately all, substantially all, or nearly all, of a back panel of a flexible container can be surrounded by a plurality of structural support members.

In the structural support frame 140, the ends of the structural support members, which are joined together, are directly connected, around the periphery of their walls, such that their expanded structural support volumes are in fluid communication. However, in various alternative embodiments, any of the structural support members 144-2, 146-1, 146-2, 146-3, 146-4, 148-1, 148-2, 149-1, and 149-2 can be joined together in any way described herein or known in the art.

In alternative embodiments of the structural support frame 140, adjacent structural support members can be combined into a single structural support member, wherein the combined structural support member can effectively substitute for the adjacent structural support members, as their functions and connections are described herein. In other alternative embodiments of the structural support frame 140, one or more additional structural support members can be added to the structural support members in the structural support frame 140, wherein the expanded structural support frame can effectively substitute for the structural support frame 140, as its functions and connections are described herein. Also, in some alternative embodiments, a flexible container may not include a base structure made of structural support members, but may include an attached (or detachable) base structure made from one or more rigid elements, as known in the art.

Figure 1B:
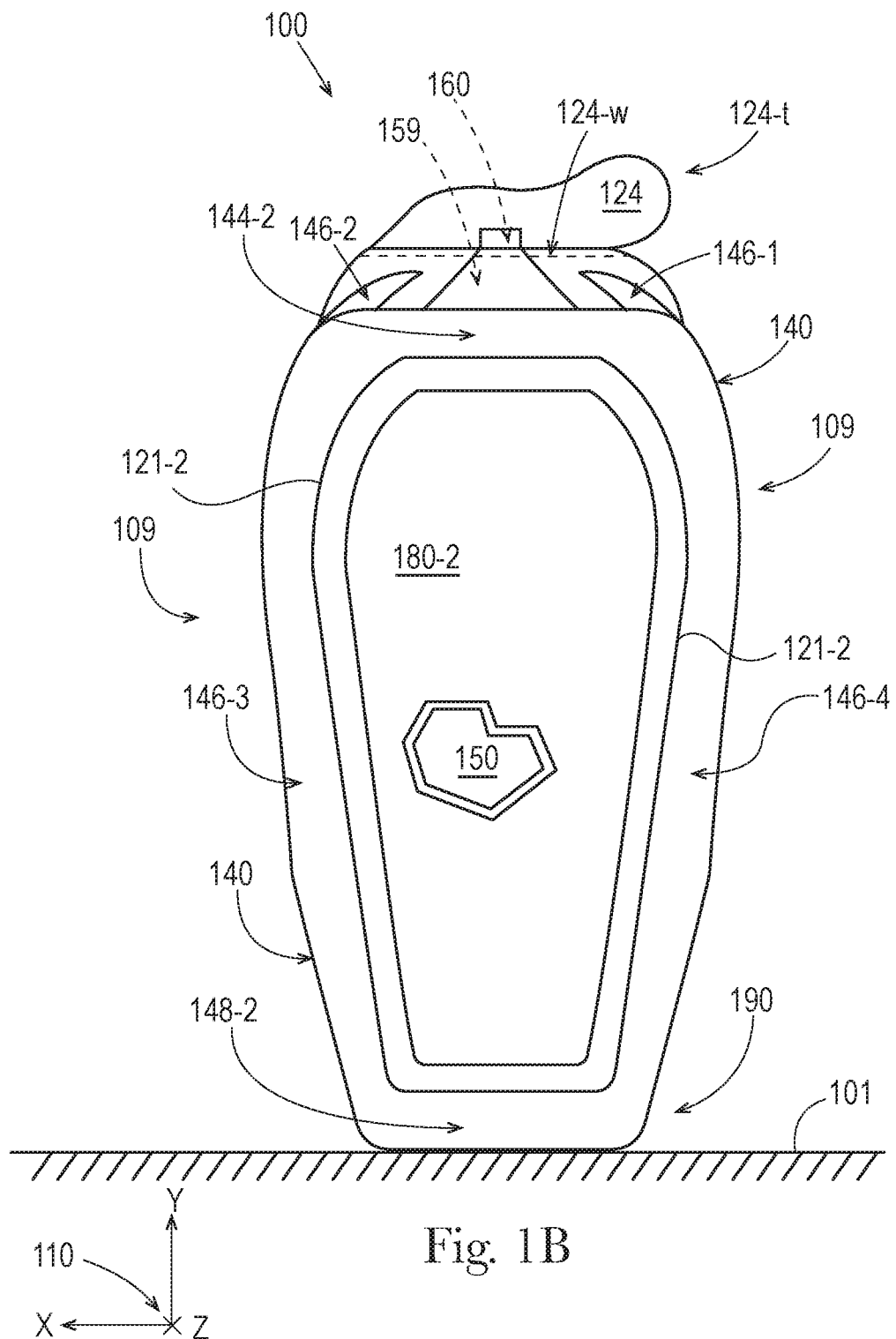
FIG. 1B illustrates a back view of the stand up flexible container of FIG. 1A.

FIG. 1B illustrates a back view of the stand up flexible container of FIG. 1A.

Figure 1C:
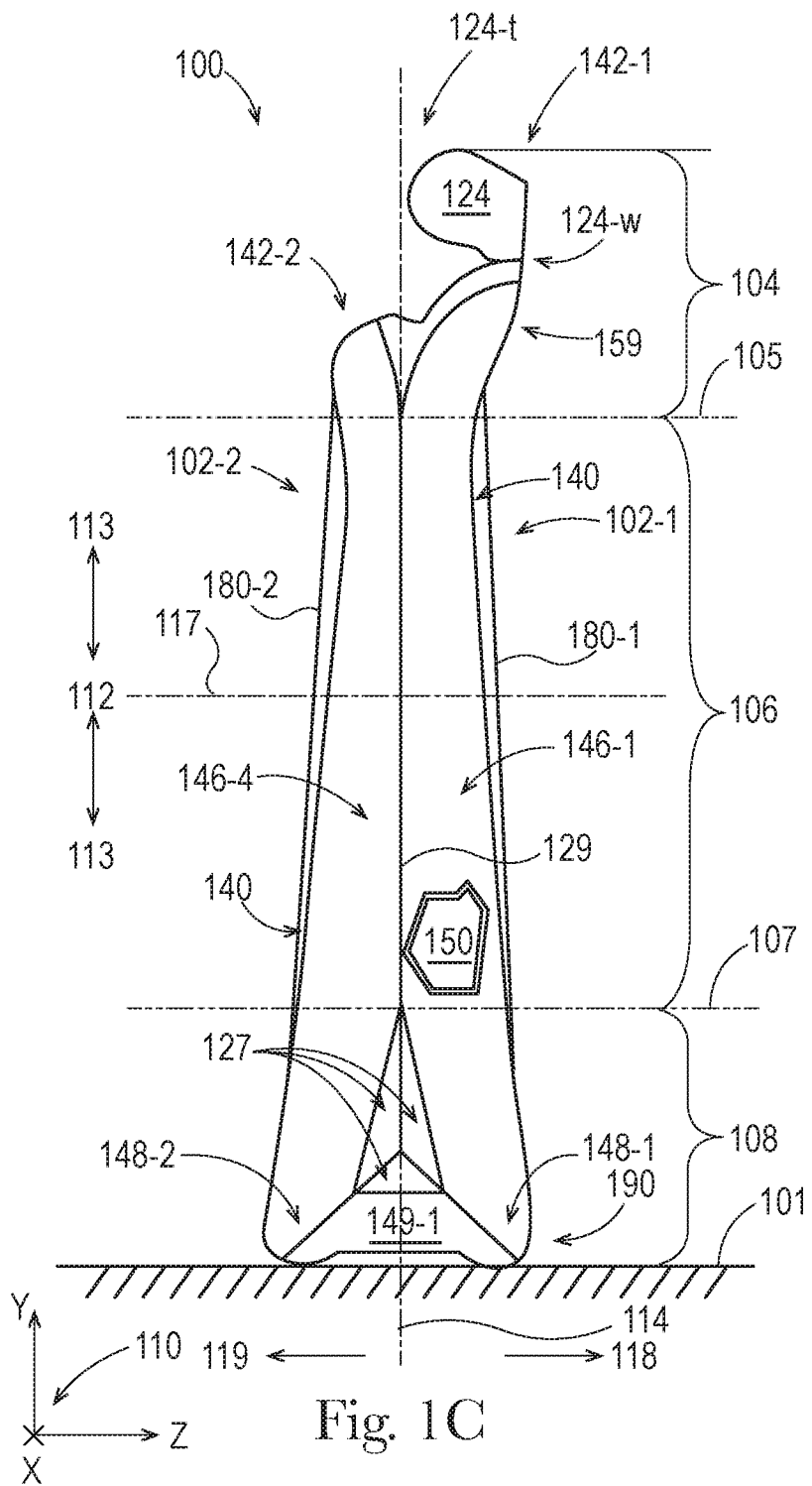
FIG. 1C illustrates a left side view of the stand up flexible container of FIG. 1A.

FIG. 1C illustrates a left side view of the stand up flexible container of FIG. 1A.

Figure 1D:
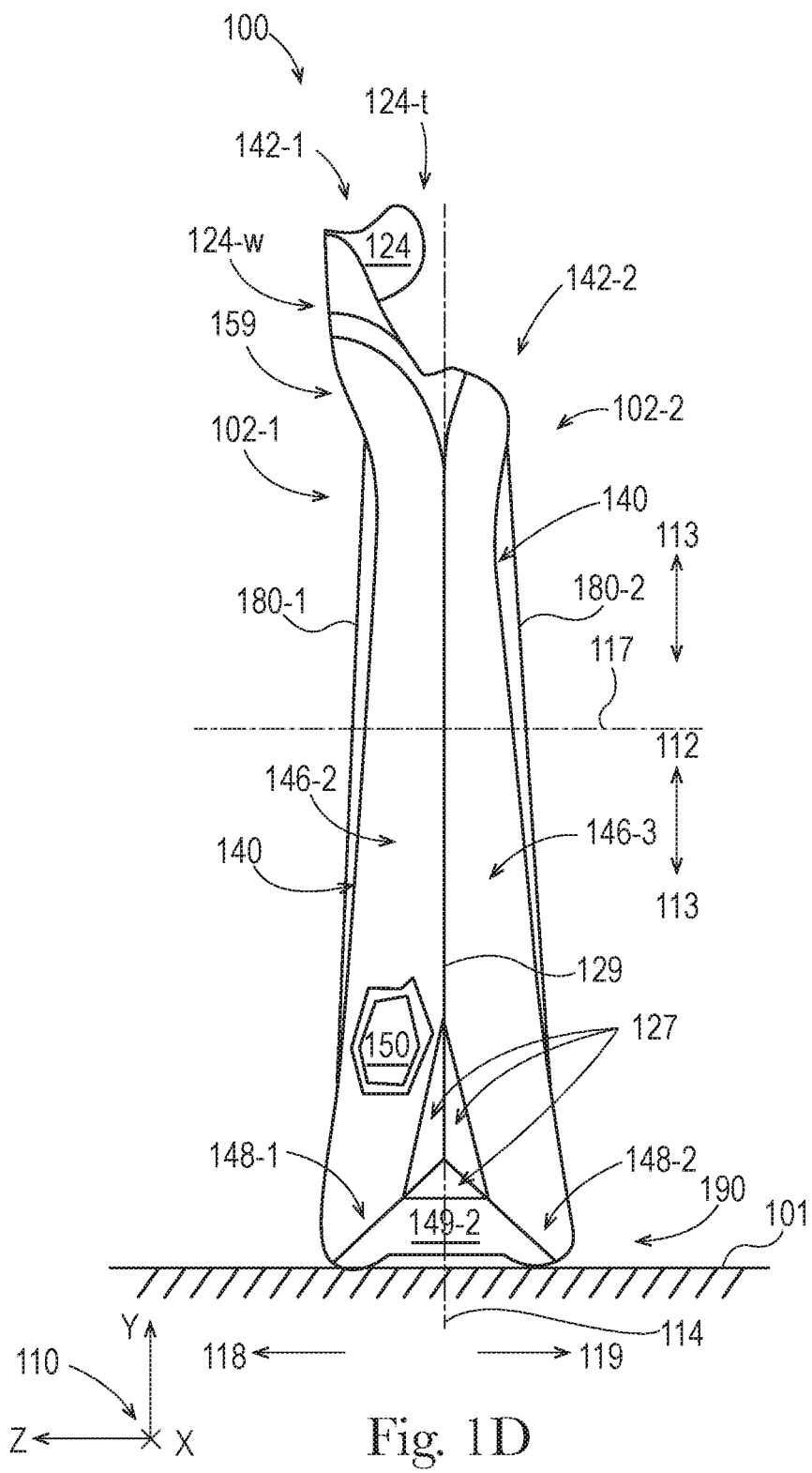
FIG. 1D illustrates a right side view of the stand up flexible container of FIG. 1A.

FIG. 1D illustrates a right side view of the stand up flexible container of FIG. 1A.

Figure 1E:
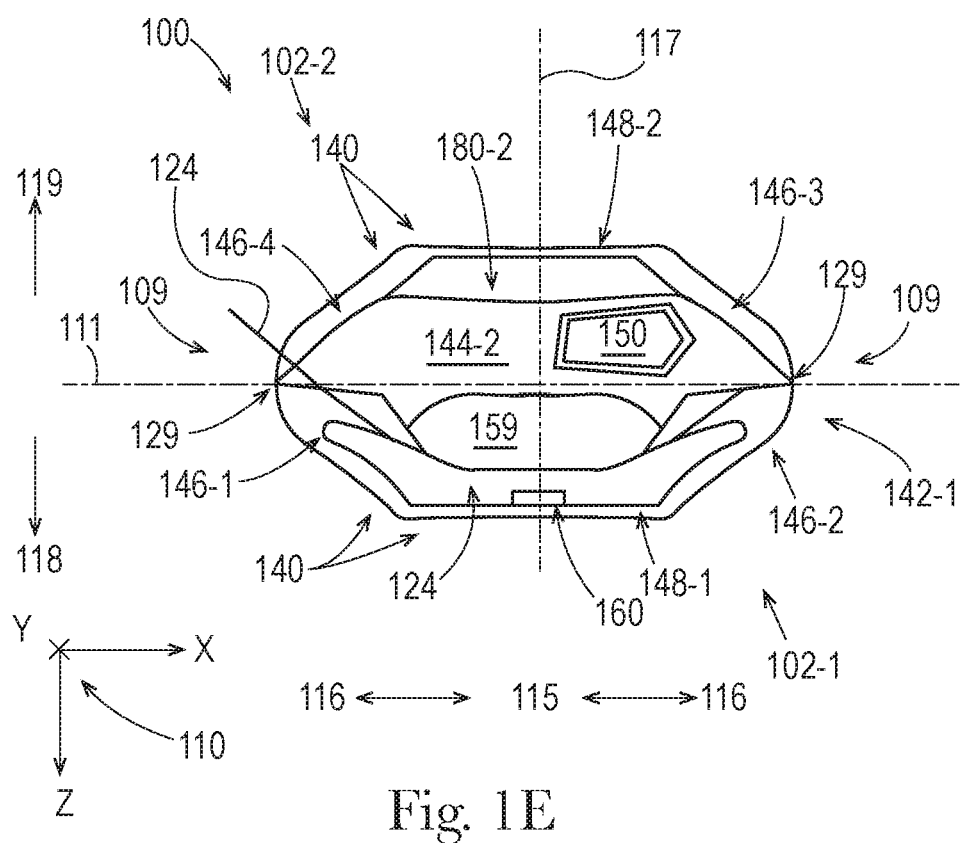
FIG. 1E illustrates a top view of the stand up flexible container of FIG. 1A.

FIG. 1E illustrates a top view of the stand up flexible container of FIG. 1A.

Figure 1F:
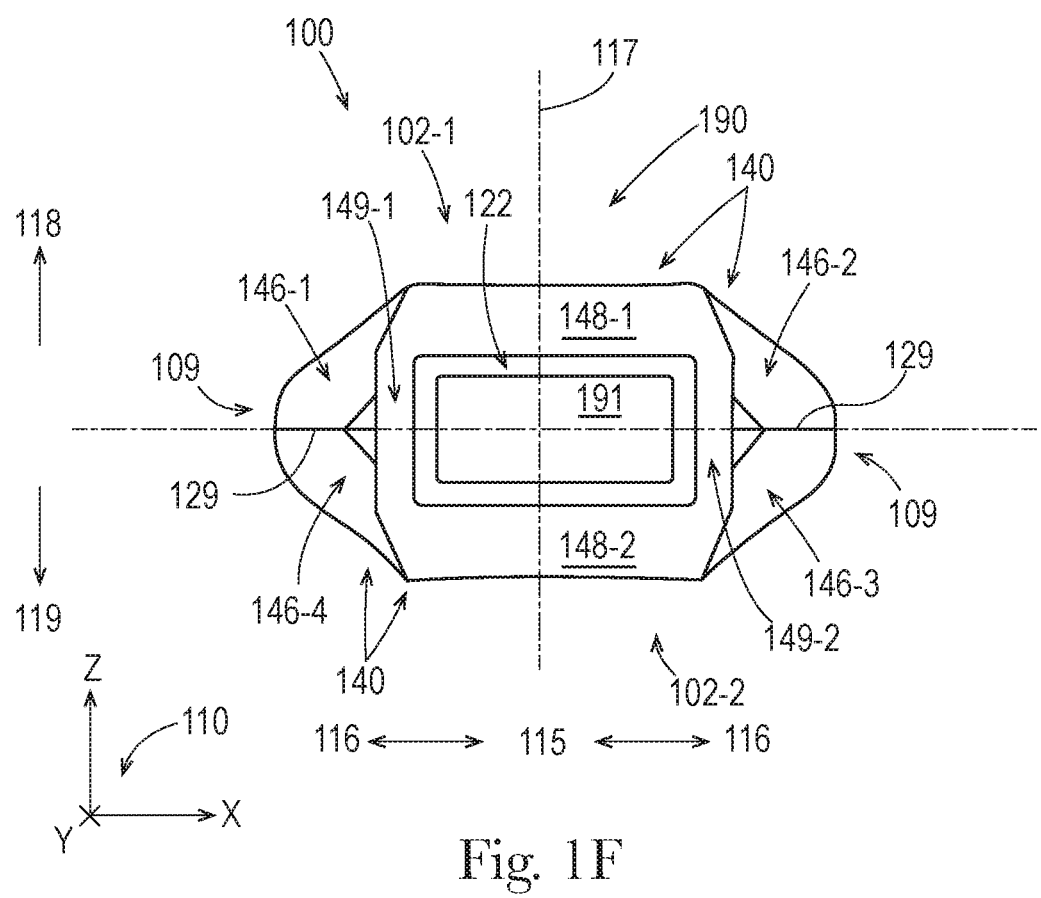
FIG. 1F illustrates a bottom view of the stand up flexible container of FIG. 1A.

FIG. 1F illustrates a bottom view of the stand up flexible container of FIG. 1A.

Figure 1G:
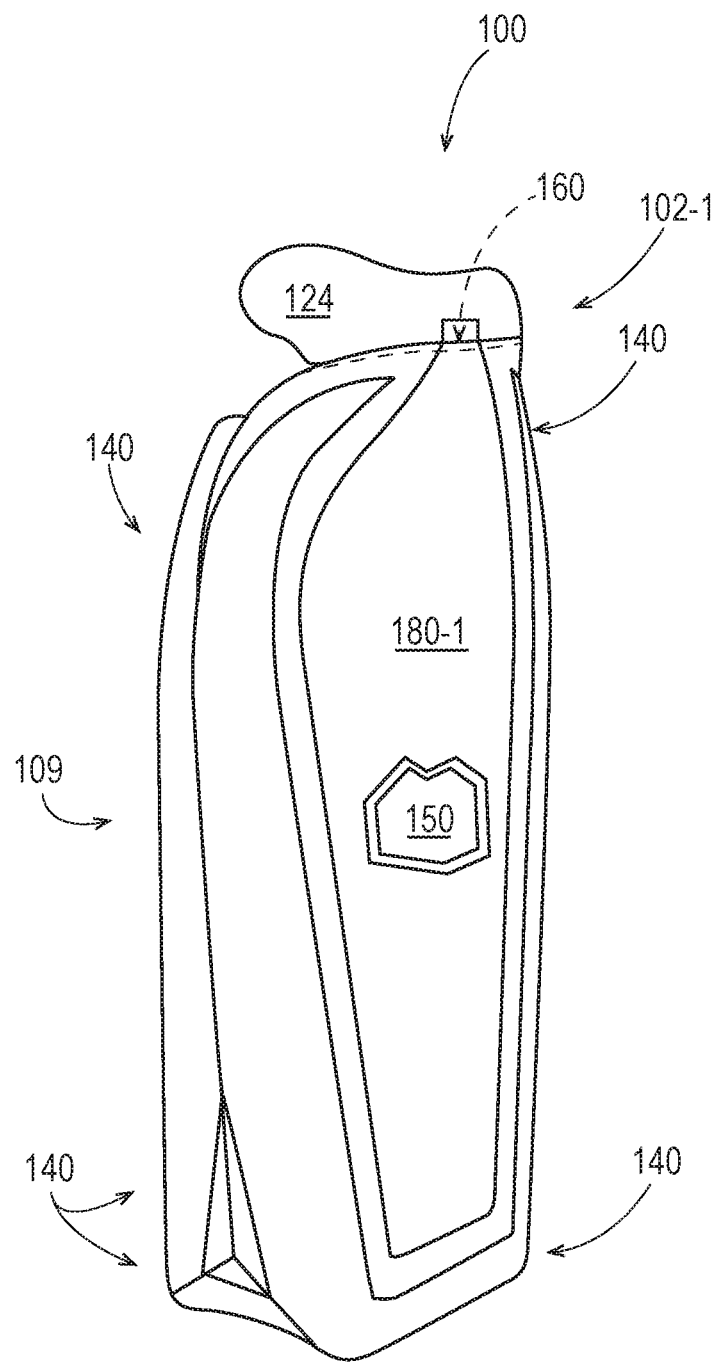
FIG. 1G illustrates a perspective view of the stand up flexible container of FIG. 1A.

FIG. 1G illustrates a perspective view of the stand up flexible container of FIG. 1A.

The embodiment of FIGS. 1A-1G, including any of its alternative embodiments, can be modified according to any variations disclosed herein, including any variations and/or alternative embodiments disclosed in the Definitions section of the present disclosure. Further, while the embodiment of FIG. 1A-1B is described and illustrated with a symmetrical, integral structural support frame, any of the embodiments of flexible containers described herein can alternatively be configured with an asymmetrical structural support frame, and/or with an internal structural support frame or an external structural support frame, all as disclosed in U.S. patent application Ser. No. 14/534,197 filed Nov. 6, 2014, entitled "Flexible Containers and Methods of Making the Same," published as US20150126349.

Figure 2A:
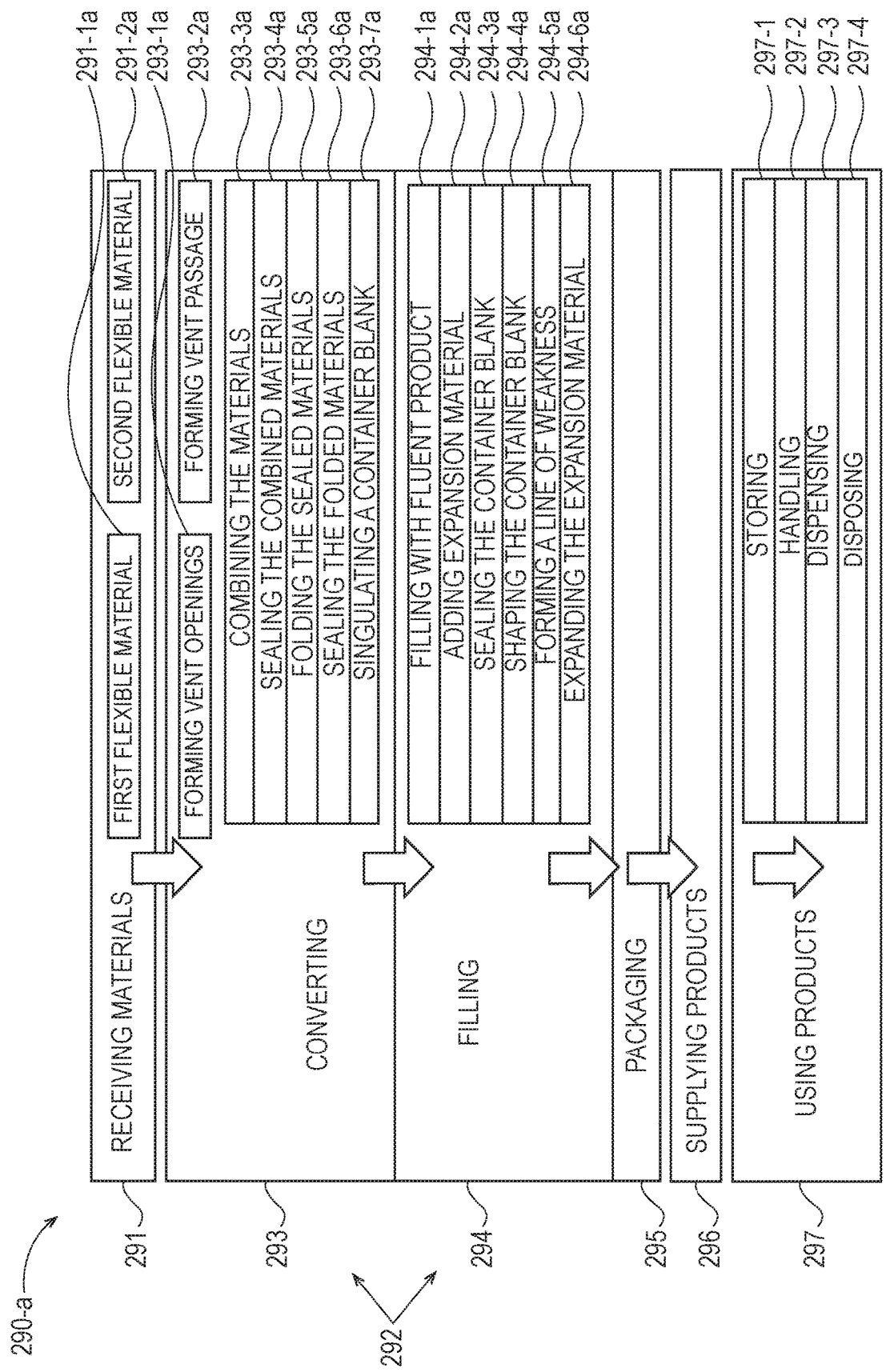
FIG. 2A is a flowchart illustrating a process of how a flexible container is made, supplied, and used.

FIG. 2A is a flowchart illustrating a process 290-*a* of how a product in a flexible container is made, supplied, and used. The process 290 begins with receiving materials 291, then continues with the making 292 of the flexible container filled with fluent product, followed by supplying 296 the finished flexible container filled with the fluent product, and finally ends with one or more end users using 297 the product. In FIG. 2A, the processes are performed from top to bottom in the order listed and/or with arrows illustrating the flow from one process to another.

The receiving 291 of materials includes receiving a first flexible material 291-1*a* and a second flexible material 291-2*a*, which are used in the making 292 of the flexible container; however, in various embodiments, any number of flexible materials may be received, for use in making a flexible container. The first flexible material 291-1*a* and/or the second flexible material 291-2*a* can be any kind of suitable flexible material, as disclosed herein or as known in the art of flexible containers. The first flexible material 291-1*a* can be received from feed unit one 291-1*b*, and the second flexible material 291-2*a* can be received from feed unit two 291-2*b*, as described in connection with the embodiment of FIG. 2B. In alternative embodiments, the receiving 291 of materials can also include receiving one or more rigid materials (e.g. reinforcing elements) and/or components (e.g. a dispenser), which can also be added to the flexible materials in the process of making 292 the flexible container. The receiving 291 of materials also includes receiving one or more fluent products with which product space(s) of the flexible container can be filled. The receiving 291 of materials further includes receiving one or more expansion materials with which structural support volume(s) of the flexible container can be expanded, as disclosed herein.

In various alternate embodiments, in place of the receiving described above, either or both of the first flexible material and the second flexible material can be provided directly from one or more processes of making the flexible material(s); for example, in-line extrusion equipment can make the film laminates and feed those laminates directly to equipment for making the flexible container.

The making 292 includes the processes of converting 293, filling 294, and (optionally) packaging 295. The converting 293 process is the process of transforming one or more flexible materials and/or components into one or more (partially or fully completed) container blanks, as described herein. In the embodiment of FIG. 2A, the converting 293 includes the following processes performed in order: forming 293-1*a* vent openings, forming 293-2*a* a vent passage, combining 293-3*a* the flexible materials, sealing 293-4*a* the combined flexible materials, folding 293-5*a* the sealed flexible materials, further sealing 293-6*a* the folded flexible materials, and singulating 293-7*a* the flexible materials to form a partially complete container blank.

In various alternative embodiments: part, parts, or all of one or more of the processes within the converting 292 can be performed in various orders, at separate times, at overlapping times, or at the same time, in any workable way; part, parts, or all of one or more of the processes within the converting 292 can be can be performed as a continuous process, or as intermittent processes, or as a combination of continuous and intermittent processes; part, parts, or all of one or more of the processes within the converting 292 can be can be performed in multiple steps; part, parts, or all of one or more of the processes within the converting 292 can be omitted; part, parts, or all of one or more of the processes within the converting 292 can be modified according to any process known in the art of processing flexible materials; and additional and/or alternative converting processes known in the art of processing flexible materials can be added to the converting 292.

For any or all of the converting 293 processes described below, if the flexible materials are discrete sheets, then before or while the process is performed, the process may include aligning the flexible materials in the lateral direction (X-axis) and/or the longitudinal direction (Y-axis) and/or Z-axis direction of the flexible container being made. For any or all of the converting 293 processes described below, if the flexible materials are continuous webs, then before or while the process is performed, the process may include aligning the flexible materials in the machine direction (MD) and/or the cross direction (CD) and/or the face direction (FD) of the converting processes. For any or all of the filling 294 processes described below, before or while the process is performed, the process may include aligning the flexible materials in the machine direction (MD) and/or the cross direction (CD) and/or the face direction (FD) of the filling process. Such aligning (e.g. registration) may be performed any number of times, intermittently and/or continuously with respect to absolute or relative references on the flexible material(s), on the (partially or fully completed) container blank(s), and/or on the equipment performing the process (es), in any workable way known in the art. As examples, references on flexible materials and/or container blanks may be in any of the following forms: part, parts, or all of any artwork (e.g. graphics, branding, and/or visual elements), reference marks, or physical features such as cuts and seals, disposed on one or more portions of the flexible material(s) that form the flexible container or disposed on one or more portions of the flexible material(s) that are trimmed away during the making 292 of the flexible container.

The converting 293 process also includes the process of forming 293-1*a* one or more vent openings in the first flexible material 291-1*a*, for use with a vent passage in the flexible container. In the embodiment of FIG. 2A, the forming 293-1*a* of the one or more vent openings includes forming a plurality of holes through a portion of the first flexible material 291-1*a* at a location in between a vent passage and a product space in the flexible container being made. The vent openings can at least assist in providing fluid communication between a headspace in the flexible container and an environment outside of the flexible container. The forming 293-1*a* of the vent openings can be performed by using forming unit one 293-1*b* as described in connection with the embodiment of FIG. 2B. Additionally or alternatively, but for the same purpose, the converting 293 process can include the process of forming one or more other vent openings that create direct or indirect venting passages for fluid communication between the headspace and the environment for the flexible container being made; in various embodiments, such venting passages may be normally open or normally closed before and/or after the flexible container is opened, unsealed, and/or put into use. Vent openings can be configured according to any of the embodiments of pin holes for venting disclosed in U.S. provisional patent application 62/327,633 filed Apr. 26, 2016, entitled "Flexible Containers with Venting Structure." In an alternative embodiment, a first flexible material may be supplied to the converting 293 process, with one or more vent openings already formed in the first flexible material, so long as the holes or other openings can be located and aligned to subsequent processing. In another alternative embodiment, a process of forming vent openings may be omitted from the converting 293; for example, such forming may not be required for a flexible container that does not include a flexible dispenser with a vent passage, as described herein.

The converting 293 process includes the process of forming 293-2*a* a vent passage on the second flexible material 291-2*a*, for use with a flexible dispenser in the flexible container. In the embodiment of FIG. 2A, the forming 293-2*a* of the vent passage includes forming one or more stand-offs on one or more portions of the second flexible material 291-2*a* at one or more locations that correspond with an interior of a vent passage in the flexible container being made. The stand-offs can at least assist in providing (continuous or intermittent) separation between the flexible materials and thus can improve the flow of air through the vent passage. The forming 293-2*a* of the vent passage can be performed by using forming unit two 293-2*b* as described in connection with the embodiment of FIG. 2B. Additionally or alternatively, but for the same purpose, the converting 293 process can include the process of forming stand-offs on the first flexible material, at one or more locations that correspond with the interior of the vent passage in the flexible container being made. The stand-offs made from forming a vent passage can be configured according to any of the embodiments of vent stand-offs disclosed in U.S. provisional patent application 62/327,633 filed Apr. 26, 2016, entitled "Flexible Containers with Venting Structure." In an alternative embodiment, a flexible material may be supplied to the converting 293 process with a vent passage already formed on the flexible material, so long as the stand-offs or other formations can be located and aligned to subsequent processing. In another alternative embodiment, a vent can be provided in a flexible container according to any of the embodiments disclosed in U.S. patent application Ser. No. 14/534,206 filed Nov. 6, 2014, entitled "Flexible Containers with Vent Systems," published as US20150122846. In another alternative embodiment, a process of forming a vent passage may be omitted from the converting 293; for example, such forming may not be required for a flexible container that does not include a flexible dispenser with a vent passage, as described herein.

In various embodiments, the process of forming 293-1a one or more vent openings and the process of forming 293-2a a vent passage may be performed in order, or in reverse order, or at the same time, or at overlapping times.

The converting 293 process further includes the process of combining 293-3a the first flexible material 291-1a with the second flexible material 291-2a to form combined flexible materials in preparation for subsequent processing. In the embodiment of FIG. 2A, the process of combining 293-3a is performed after the process of forming 293-1a the vent opening(s) and after the process of forming 293-2a the vent passage with one or more vent stand-offs. In the embodiment of FIG. 2A, the combining 293-3a of the flexible materials includes bringing the first flexible material 291-1a and the second flexible material 291-2a into direct, face-to-face contact with each other, by positioning/moving/directing either or both of the materials. The combining 293-3a includes bringing the flexible materials together so they are aligned with each other, in particular, so that the formed vent passage (with the vent stand-offs) and the formed vent openings are appropriately aligned with each other in fixed relation and the vent openings create fluid communication between the vent passage and the headspace of the flexible container being made, as described in connection with the embodiments of FIGS. 4A, 4B, and 5. Aligning the vent stand-offs and the vent openings in fixed relation, ensures that the vent stand-offs and the vent openings are set in their correct positions (relative to each other and relative to other structures) when the flexible materials are permanently connected (e.g. sealed together) by downstream processing, such that the vent works properly in the finished flexible container. The combining 293-3a can be performed by using a combining unit 293-3b, as described in connection with the embodiment of FIG. 2B. Alternatively, if a single flexible material is used in place of the first and second flexible materials, then a combining process may be replaced by a process of folding the single material onto itself, to bring its portions into contact with each other in preparation for subsequent processing.

The converting 293 process includes the process of locally sealing 293-4a the combined flexible materials by sealing portions of the first flexible material 291-1a to portions of the second flexible material 291-2a to form sealed flexible materials. In the embodiment of FIG. 2A, the local sealing 293-4a of the combined flexible materials includes creating seals that are permanent connections between the first flexible material 291-1a and the second flexible material 291-2a, while the materials are in aligned contact with each other, such as the alignment provided as part of the combining 293-3a, as described above. The local sealing 293-4a is performed before the combined flexible materials are folded, so the local sealing 293-4a is used to form the seals that connect a single layer of the first flexible material 291-1a to a single layer of the second flexible material 291-2a. In the embodiment of FIG. 2A, the local sealing 293-4a creates at least the following seals for the flexible container being made: first, in the front of the flexible container being made, a front panel seal in a closed shape that defines the periphery of a front panel of the flexible container as well as at least parts of the inside edges of structural support volumes around the front panel; second, on the bottom of the flexible container being made, a bottom panel seal in a closed shape that defines the periphery of a bottom panel of the flexible container as well as at least parts of the inside edges of structural support volumes around the bottom panel; third, in the back of the flexible container being made, a back panel seal in a closed shape that defines the periphery of a back panel of the flexible container as well as at least parts of the inside edges of structural support volumes around the back panel; and fourth, in parts of the bottom of the flexible container being made, portions of a reinforcing seal that defines at least parts of the edges of structural support volumes in the bottom. In various embodiments, the size, shape, number, and location of seals created can be adjusted, according to the design of the flexible container being made; for example, the design can be any embodiment of the flexible container 100 of FIGS. 1A-1G (including any alternative embodiment disclosed herein).

The local sealing 293-4a can be performed by using sealing unit one 293-4b, as described in connection with the embodiment of FIG. 2B. Additionally or alternatively, but for the same purpose, the converting process 293 can include the process of joining portions of the first flexible material to portions of the second flexible material using adhesive and/or other joining chemistries. Alternatively, if a single flexible material is used in place of the first and second flexible materials, then a local sealing process may be replaced by a process of sealing portions of the single material to itself in preparation for subsequent processing.

The converting 293 process also includes the process of folding 293-5a the locally sealed flexible materials after the local sealing 293-4a to form folded flexible materials. In the embodiment of FIG. 2A, the folding 293-5a of the locally sealed flexible materials includes creating a gusseted structure from the combined flexible materials, while these materials are locally sealed to each other. The folding 293-5a is performed before the combined flexible materials are further sealed, so the folding 293-5a is used to arrange the combined first flexible material 291-1a and second flexible material 291-2a into a gusseted structure with portions that are four or eight layers thick. In the embodiment of FIG. 2A, the folding 293-5a creates at least the following gussets in the flexible container being made: first, in the bottom of the flexible container being made, a bottom gusset having a front bottom folded gusset leg and a back bottom folded gusset leg; second, in the top of the flexible container being made, a top gusset having a front top open gusset leg and a back top folded gusset leg. Alternatively, the size, number (e.g. one, two, three, etc.), type (e.g. sealed or folded, closed or open), and location (e.g. top or bottom, front or back) of gusset legs can be adjusted, according to the design of the flexible container being made; for example, the design can be any embodiment of the flexible container of FIGS. 1A-1G (including any alternative embodiment disclosed herein). Any of these gusseted structures can be made according to any of the embodiments disclosed in: U.S. patent application Ser. No. 14/534,210 filed Nov. 6, 2014, entitled "Flexible Containers and Methods of Forming the Same," published as US20150125099, and U.S. patent application Ser. No. 15/148,395 filed May 6, 2015, entitled "Methods of Forming Flexible Containers with Gussets." The folding 293-5a can be performed by using folding unit 293-5b, as described in connection with the embodiment of FIG. 2B. Additionally, the converting process 293 can include the process of making additional folds, gussets, creases, tucks, pleats, and the like and/or a process of creasing the folded structure (e.g. by applying heat, pressure, and/or tension) to at least assist in maintaining the folded shape. Alternatively, if a single flexible material is used in place of the first and second flexible materials, then a folding process may be replaced by a process of folding portions of the single material to itself in preparation for subsequent processing.

The converting 293 process further includes the process of locally sealing 293-6a the folded flexible materials by sealing portions of the first flexible material 291-1a to portions of the second flexible material 291-2a to form further sealed flexible materials. In the embodiment of FIG. 2A, the local sealing 293-6a of the folded flexible materials includes creating seals that are permanent connections between adjacent layers of the first flexible material 291-1a and/or the second flexible material 291-2a, while the materials are in folded condition (e.g. forming a gusseted structure), having portions with four layers or eight layers. The local sealing 293-6a is performed before the combined flexible materials are singulated; however, in various alternative embodiments this local sealing can be performed after the combined flexible materials are singulated. In the embodiment of FIG. 2A, the local sealing 293-6a creates at least the following seals for the flexible container being made: first, in parts of the bottom of the flexible container being made, bottom portions of an outside seal (through eight layers) that define at least parts of the outside edges of structural support volumes in the bottom parts; second, in parts of the middle of the flexible container being made, middle portions of an outside seal (through four layers) that define at least parts of the outside edges of structural support volumes in the middle parts; third, in parts of the top of the flexible container being made, top portions of an outside seal (through four layers and eight layers) that define at least parts of the outside edges of structural support volumes in the top parts; and fourth, in parts above the top of the flexible container being made, portions of trim seal (through four layers) that connect portions of the flexible materials that are subsequently trimmed away. In various embodiments, the size, shape, number, and location of seals created can be adjusted, according to the design of the flexible container being made; for example, the design can be any embodiment of the flexible container of FIGS. 1A-1G (including any alternative embodiment disclosed herein). The local sealing 293-6a can be performed by using sealing unit one 293-6b, as described in connection with the embodiment of FIG. 2B. Additionally or alternatively, but for the same purpose, the converting process 293 can include the process of joining portions of adjacent layers of flexible material using adhesive and/or other joining chemistries. Alternatively, if a single flexible material is used in place of the first and second flexible materials, then a local sealing process may be replaced by a process of sealing portions of the single material to itself in preparation for subsequent processing.

The converting 293 process further includes the process of singulating 293-7a the folded and sealed flexible materials by separating portions of the flexible materials to form partially complete container blanks. In the embodiment of FIG. 2A, the singulating 293-7a of the flexible materials includes cutting away a single, partially complete container blank to separate the blank from surrounding portions of the flexible materials and to prepare the container blank for the filling process 294. In various alternative embodiments this singulating can be replaced my cutting away two, three, four, or more partially complete container blanks, which are subsequently separated into single container blanks. In the embodiment of FIG. 2A, the singulating 293-7a results in partially complete container blanks that are complete except for the further changes made in the filling process 294. In various embodiments, singulating can result in a container blank having various degrees of completeness. The singulating 293-7a includes cutting away the blank with precision cutting that also effectively trims away portions of the excess flexible materials; however, this is not required and, in various embodiments, the singulating may be a rough cut process with trimming performed as a separate, subsequent process. The singulating 293-7a can be performed by using a singulating unit 293-7b, as described in connection with the embodiment of FIG. 2B. In various embodiments, converting can include further processing one or more partially complete container blanks, in preparation for filling; for example, a plurality of container blanks can be accumulated into organized sets (e.g. into stacks, onto rolls, onto wickets, etc.), which can then be provided to a filling process, as described below.

In some embodiments of making a flexible container, the converting process and the filling process may not be performed as part of a continuous sequence; for example, partially complete container blanks from the converting can be accumulated in any number and for any length of time before being filled. And, in some embodiments, the converting process and the filling process may not be performed at the same location; for example, partially complete container blanks can be converted at one location and then shipped to another location for filling. Further, any of the processes for making flexible containers, as described herein, can be performed using any kind of manufacturing set-up known in the art.

In addition to the converting 293, the making 292 includes the process of filling 294. The filling 294 process is the process of transforming one or more (partially or fully completed) container blanks into filled flexible containers, which are ready for packaging, supply, and use, as described herein. In the embodiment of FIG. 2A, the filling 294 includes the following processes performed in order: filling 294-1a the container blank with fluent product(s), adding 294-2a expansion material(s) to the container blank, sealing 294-3a the container blank, shaping 294-4a the container blank, forming 294-5a a line of weakness in the container blank, and expanding 294-6a the expansion material(s) in the container blank.

In various alternative embodiments: part, parts, or all of one or more of the processes within the filling 294 can be performed in various orders, at separate times, at overlapping times, or at the same time, in any workable way; part, parts, or all of one or more of the processes within the filling 294 can be can be performed as a continuous process, or as intermittent processes, or as a combination of continuous and intermittent processes; part, parts, or all of one or more of the processes within the filling 294 can be can be performed in multiple steps; part, parts, or all of one or more of the processes within the filling 294 can be omitted; part, parts, or all of one or more of the processes within the filling 294 can be modified according to any process known in the art of processing flexible materials; and additional and/or alternative filling processes known in the art of processing flexible containers can be added to the filling 294.

The filling 294 process includes the process of filling 294-1a the partially complete container blank from the converting 293 with one or more fluent products for the filled flexible container. In the embodiment of FIG. 2A, the filling 294-1a of the container blank includes dispensing a particular amount of the fluent product(s) into a space that becomes the product space within the flexible container being made. The filling 294-1a of the container blank can be performed by using filling unit 294-1b as described in connection with the embodiment of FIG. 2B. In an alternative embodiment, wherein a flexible container is designed to have multiple product spaces, filling may include separately filling each product space with one or more fluent products. In another alternative embodiment, a process of filling a container blank with fluent product(s) may be omitted from the making 292; for example, such filling may not be required for making empty flexible containers intended for filling by subsequent manufacturers, suppliers, merchants, or end users, as described herein. In various alternate embodiments, a flexible container can be filled with a fluent product according to any of the embodiments for filling disclosed in U.S. patent application Ser. No. 14/448,491 filed Jul. 31, 2014, entitled "Methods of Forming a Flexible Container," published as US20150033671. In various alternate embodiments, after filling, a flexible container can be processed by a headspace reduction operation as disclosed in U.S. patent application Ser. No. 14/534,213, filed Nov. 6, 2014, entitled "Flexible Containers and Methods of Making the Same," published as US20150122373.

The filling 294 process also includes the process of adding 294-2a to the filled container blank one or more expansion materials to be used in the flexible container being made. In the embodiment of FIG. 2A, the process of adding 294-2a the expansion material(s) is performed after the process of filling 294-1a with the fluent product(s). In the embodiment of FIG. 2A, the adding 294-2a of the expansion material(s) includes dispensing a particular amount of liquid nitrogen into a space that becomes one or more structural support volumes of a structural support frame within the flexible container being made. The space that becomes the structural support volume(s) is separate from the space that becomes the product space. The adding 294-2a of the expansion material(s) can be performed by using dosing unit 294-2b as described in connection with the embodiment of FIG. 2B. In an alternative embodiment, wherein a flexible container is designed to have structural support volumes that are not in fluid communication with each other, adding expansion material(s) may include separately adding expansion material(s) to each structural support volume (or to each set of structural support volumes in fluid communication with each other). In another alternative embodiment, one or more of various kinds of expansion materials may be added in addition to or instead of the liquid nitrogen; any kind of expansion material disclosed herein may be added as part of the process of adding 294-2a. In yet another alternative embodiment, an adding process may be omitted from the making 292; for example, such adding may not be required for making (partially or fully completed) container blanks intended for expansion by subsequent manufacturers, suppliers, merchants, or end users, as described herein. In various alternate embodiments, an expansion material that is liquid nitrogen can be added to a flexible container as disclosed in U.S. patent application Ser. No. 14/534,214, filed Nov. 6, 2014, entitled "Flexible Containers and Methods of Making the Same," published as US20150121810. In an alternate embodiment, wherein the expansion material is a compressed gas, the process of adding the expansion material may include dispensing the compressed gas through a one-way valve and into a space that becomes one or more structural support volumes.

In various embodiments, the process of filling 294-1a one or more fluent products and the process of adding 294-2a one or more expansion materials may be performed in order, or in reverse order, or at the same time, or at overlapping times.

The filling 294 process further includes the process of locally sealing 294-3a the filled container blank by sealing portions of the first flexible material 291-1a to portions of the second flexible material 291-2a to finish sealing the filled container blank. In the embodiment of FIG. 2A, the local sealing 294-3a of the filled container blank includes creating seals that are permanent connections between adjacent layers of the first flexible material 291-1a and/or the second flexible material 291-2a, while the materials are in the form of a folded and sealed gusseted structure. The local sealing 294-3a is performed before the combined flexible materials are shaped; however, in various alternative embodiments this local sealing can be performed after the combined flexible materials are shaped. In the embodiment of FIG. 2A, the local sealing 294-3a creates at least the following seals for the flexible container being made: first, in parts of the top of the flexible container being made, top portions of an outside seal (through four layers) that define at least parts of the edges of structural support volumes in the top parts; second, in parts of the top of the flexible container being made, a cap seal (through four layers) that seals off the product space by enclosing a dispenser opening; and third, in parts of the top of the flexible container being made, a tab seal (through four layers) that joins together the layers of flexible materials, to create a sealed-through structure of films that is suitable for use as a tear tab with portion(s) to be torn off by an end user. In various embodiments, the size, shape, number, and location of seals created can be adjusted, according to the design of the flexible container being made; for example, the design can be any embodiment of the flexible container of FIGS. 1A-1G (including any alternative embodiment disclosed herein). The local sealing 294-3a can be performed by using sealing unit three 294-3b, as described in connection with the embodiment of FIG. 2B. Additionally or alternatively, but for the same purpose, the filling process 294 can include the process of joining portions of adjacent layers of flexible material using adhesive and/or other joining chemistries. In an alternative embodiment, part or parts of the local sealing may be omitted from the filling 294; as an example, local sealing to form a cap seal may not be required for a flexible container that does not require hermetic sealing; as another example, local sealing to form a tab seal may not be required for a flexible container that does not include a tear tab for opening the container.

The filling 294 process includes the process of shaping 294-4a the filled container blank by cutting away portions of the flexible material(s) to finish forming the overall shape of the flexible materials of the filled container blank. In the embodiment of FIG. 2A, the shaping 294-4a of the filled container blank includes precision cutting that trims away portions of the excess flexible materials. The shaping 294-4a is performed after the container blank is finally sealed;

however, in various alternative embodiments this shaping can be performed before the container blank is finally sealed. In the embodiment of FIG. 2A, the shaping 294-4a creates parts of the top of the flexible container being made, including the shape of the top and sides of the tear tab and its tear off portion(s). The shaping 294-4a can be performed by using shaping unit three 294-4b, as described in connection with the embodiment of FIG. 2B. In an alternative embodiment, the shaping may be combined with the local sealing 294-3a, by performing a combined cut-sealing process instead, such as any of the cut-sealing processes described in U.S. patent application Ser. No. 14/534,197 filed Nov. 6, 2014, entitled "Flexible Containers and Methods of Making the Same," published as US20150126349. In another alternative embodiment, shaping may be omitted from the filling 294; as an example, shaping may not be required if the flexible materials already have their desired final shape (either in the form supplied or as applied by other upstream processing); as another example, shaping may not be required for a flexible container that does not require a particular final shape; as yet another example, shaping may not be required for a flexible container that is designed to include another kind of dispenser (such as a rigid fitment).

The filling 294 process also includes the process of forming 294-5a a line of weakness in the filled container blank by scoring and/or partially cutting part, parts, or all of (either or both sides of) the flexible material(s) to at least assist in enabling the tear tab and its tear off portion(s) to be torn off by an end user. The forming 294-5a is performed after the container blank is shaped; however, in various alternative embodiments this forming can be performed before the container blank is shaped or at the same time that the container blank is being shaped. The forming 294-5a of the line of weakness can be performed by using scoring unit 294-5b, as described in connection with the embodiment of FIG. 2B. In an alternative embodiment, the forming of the line of weakness may be combined with the local sealing 294-3a, by forming a weakening seal along the line of weakness. In another alternative embodiment, forming of the line of weakness may be omitted from the filling 294; as an example, a line weakness may not be required if the flexible materials can be easily torn off without scoring or partially cutting; as another example, a line of weakness may not be required for a flexible container that is designed to be opened in another way.

The filling 294 process also includes the process of expanding 294-6a the one or more expansion materials in the filled container blank, such that the structural support volume(s) are expanded and the flexible container takes its final overall shape. The expanding 294-6a can begin at any time after the adding 294-2a of the expansion material(s) has begun and the expanding can end any time at or after the sealing 294-4a has finally sealed the structural support volume(s) and the flexible container is unconstrained from taking its final overall shape. In the embodiment of FIG. 2A, the process of expanding 294-6a occurs automatically since the (refrigerated) liquid nitrogen naturally evaporates at ambient temperature and expands into gaseous form; thus, no separate equipment is required to cause this expansion. However, in alternative embodiments, the expanding may be partly or fully caused (or at least induced) by an activation process, such as the application of heat and/or pressure, which can cause a chemical reaction within the expansion materials, leading to their expansion.

The packaging 295 process includes placing the filled flexible container (i.e. the product), from the filling 294, into one or more packages (e.g. cartons, cases, shippers, etc.) as known in the art of packaging. In various embodiments of the process 290-a, the packaging 295 process may be omitted.

The process 290-a includes supplying 296 the product, which includes transferring the product from the making 292 through one or more distribution channel(s) to product purchasers and/or end users. The using 297 of the product can include the processes of storing 297-1 the filled flexible container, handling 297-2 the filled flexible container, dispensing 297-3 fluent product(s) from the flexible container, and disposing 297-4 of the used flexible container, as described herein and as known in the art.

In various embodiments, any part or parts of one or more of any of the making 292 processes can be performed according to any of the embodiments for making flexible containers disclosed in: U.S. patent application Ser. No. 13/957,158 filed Aug. 1, 2013, entitled "Methods of Making Flexible Containers," published as US20140033654; and/or U.S. patent application Ser. No. 13/957,187 filed Aug. 1, 2013, entitled "Methods of Making Flexible Containers," published as US20140033654; in any workable combination.

Thus, part, parts, or all of the process 290-a can be used to make filled flexible containers according to embodiments of the present disclosure.

Figure 2B:
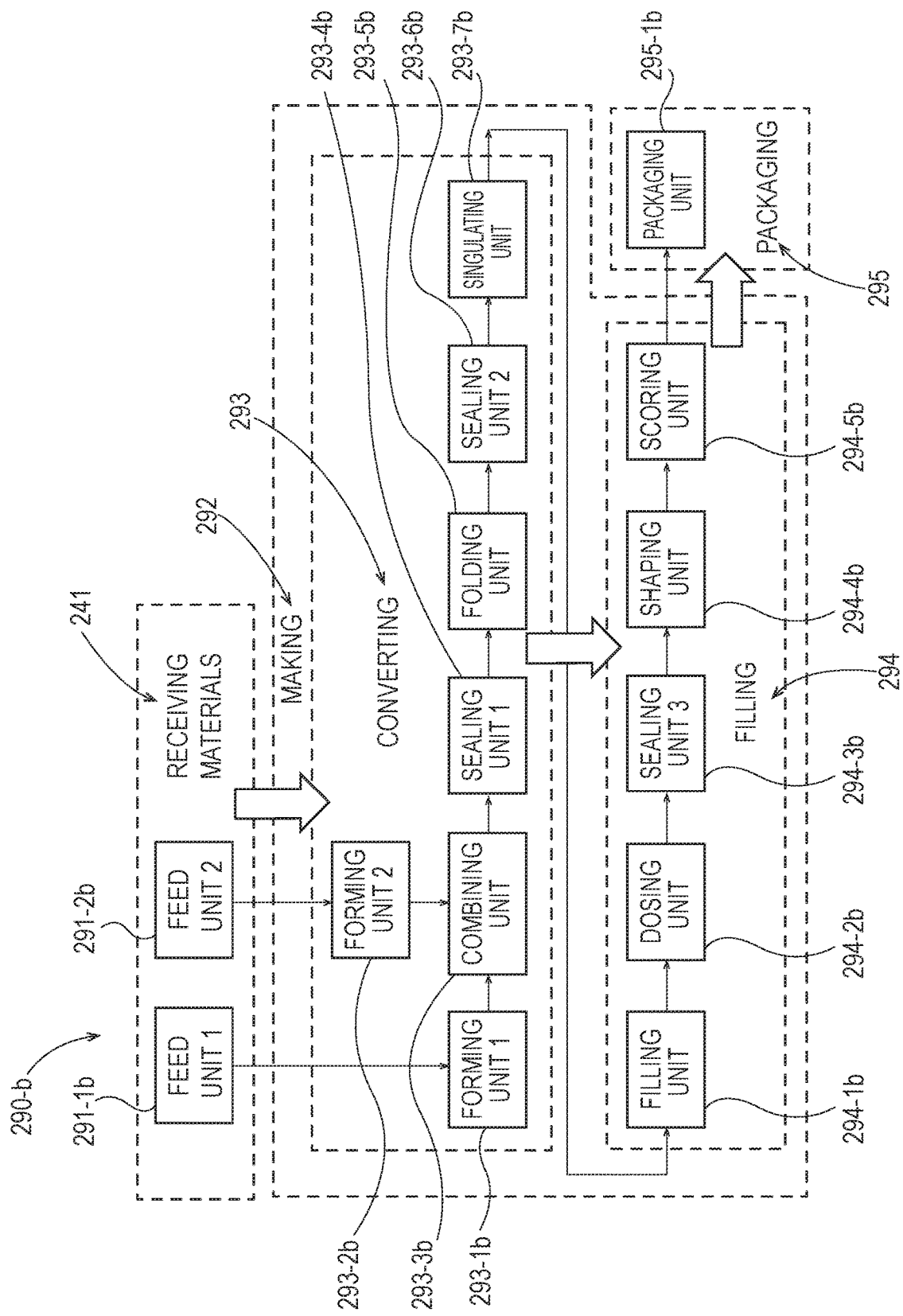
FIG. 2B is a block diagram illustrating equipment used to make a flexible container.

FIG. 2B is a block diagram illustrating equipment used to make a flexible container. The equipment of FIG. 2B is grouped according to processes described and illustrated in connection with the embodiment of FIG. 2A, including the processes of receiving 291 flexible materials, making 292 the flexible container (by converting 293 and filling 294), and packaging 295 the filled flexible container. In FIG. 2B, the flexible materials used to form the flexible container move through the equipment units according to the arrows in the figure.

In various embodiments, any of the equipment units in FIG. 2B can be manually operated equipment units, or semi-automatic equipment units, or fully automatic equipment units; alternatively, any of the equipment units in FIG. 2B can be replaced by a hand-making station, where processing is performed by one or more people using hand-operated tools. In various embodiments: any of the equipment units in FIG. 2B can be configured to make flexible containers from discrete sheets of flexible material or from continuous webs of flexible material; any of the equipment units in FIG. 2B can be configured to manually, or semi-automatically, or automatically transfer their output to one or more subsequent equipment units (e.g. by using one or more holders, clamps, trays, pucks, etc.); any of the equipment units can be configured to process a stationary flexible material (e.g. using a reciprocating action on a stationary sheet) and any of the equipment units can be configured to process a moving flexible material (e.g. using a repeating/recirculating/rotating motion on a moving web); any of the equipment units can be a stand-alone unit or connected directly or indirectly to one or more of the other equipment units, with each connected equipment unit becoming a unit operation within a larger machine. Any of these embodiments can be combined together in any workable combination.

In various alternative embodiments, the flow of flexible material(s) through some or all of the equipment units in FIG. 2B can be changed in any of the following ways: the flexible material(s) can flow through the equipment units in a different order (in series and/or in parallel), including any order that corresponds with an alternative order of processing mentioned in connection with the embodiment of FIG.

2A; one or more of the equipment units can be combined, including any combinations that correspond with a combination of processing mentioned in connection with the embodiment of FIG. 2A; one or more of the equipment units can be modified, including any modifications that correspond with a modification of processing mentioned in connection with the embodiment of FIG. 2A; and one or more of the equipment units can be omitted, including any omissions that correspond with an omission of processing mentioned in connection with the embodiment of FIG. 2A.

In FIG. 2B, feed unit one 291-1b and feed unit two 291-1b correspond with the process of receiving 291, as described in connection with the embodiment of FIG. 2A. The first flexible material 291-1a is received from feed unit one 291-1b and the second flexible material 291-2a is received from feed unit two 291-2b. Either or both of these feed units can take any of the following forms: an unwind stand (for continuous webs of flexible material), a sheet feeder (for discrete sheets of flexible material), or any other kind of equipment known for providing/feeding flexible materials.

In FIG. 2B, forming unit one 293-1b, forming unit two 293-2b, a combining unit 293-3b, sealing unit one 293-4b, a folding unit 293-5b, sealing unit two 293-6b, and a singulating unit 293-7b all correspond with the process of converting 293, as described in connection with the embodiment of FIG. 2A. The first flexible material 291-1a from feed unit one 291-1b is provided to forming unit one 293-1b, which can take any of the following forms: mechanical equipment for cutting, piercing, and/or punching, laser cutting equipment, water jet cutting equipment, or any other kind of equipment known in the art for forming openings through a flexible material, as described herein. The second flexible material 291-2a from feed unit two 291-2b is provided to forming unit two 293-2b, which can take any of the following forms: embossing equipment, stamping equipment, laser etching equipment, printing equipment, or any other kind of equipment known in the art for forming stand-off structures on a flexible material, as described herein. The formed first flexible material from forming unit one 293-1b and the formed second flexible material from forming unit two 293-2b are provided to the combining unit 293-3b, which can take any of the following forms: a web guide (active or passive, with rollers and/or boards), a jig, or any other kind of equipment known in the art for bringing flexible materials into aligned, direct, face-to-face contact, as described herein. The combined flexible materials from the combining unit 293-3b are provided to sealing unit one 293-4b, which can take any of the following forms: a conductive sealer (e.g. hot bar), an impulse sealer, an ultrasonic sealer, a laser sealer, or any other kind of equipment known in the art for forming permanent connections between flexible materials, as described herein. The sealed flexible materials from sealing unit one 293-4b are provided to the folding unit 293-5b, which can take any of the following forms: folding boards, folding surfaces, folding fingers, folding bars, rollers, etc. or any other kind of equipment known in the art for forming folds in flexible materials, as described herein, including any folding equipment described in: U.S. patent application Ser. No. 14/534,210 filed Nov. 6, 2014, entitled "Flexible Containers and Methods of Forming the Same," published as US20150125099; and U.S. patent application Ser. No. 15/148,395 filed May 6, 2015, entitled "Methods of Forming Flexible Containers with Gussets." The folded flexible materials from the folding unit 293-5b are provided to sealing unit two 293-6b, which can take any of the forms suitable for sealing unit one 293-4b. The further sealed flexible materials from sealing unit two 293-6b are provided to the singulating unit 293-7b, which can take any of the following forms: mechanical equipment for cutting (e.g. die-cutting), and/or shearing, laser cutting equipment, water jet cutting equipment, or any other kind of equipment known in the art for cutting away flexible material, as described herein.

In FIG. 2B, a filling unit 294-1b, a dosing unit 294-2b, sealing unit three 294-3b, a shaping unit 294-4b, and a scoring unit 294-5b all correspond with the process of filling 294, as described in connection with the embodiment of FIG. 2A. The partially complete container blank from the converting 293 is provided to the filling unit 294-1b, which, when the fluent product to be filled is a liquid, can take the form of any kind of liquid filling equipment (gravity fed and/or pressurized), such as a benchtop filler, an inline filler, a monoblock filler, a turret-based filler, an integrated filling system, or any other kind of equipment known in the art for filling containers with liquid, as described herein. In alternative embodiments wherein the fluent product to be filled is a pourable solid, a filling unit can take any of the following forms: a vibratory filler, a weigh filler, a volumetric filler, an auger filler, a piston filler, a tablet dispenser, a granules dispenser, or any other kind of equipment known in the art for filling containers with pourable solid material, as described herein. The filled container blank from the filling unit 294-1b is provided to the dosing unit 294-2b, which can take any of the forms suitable for the filling unit 294-1b, so long as the equipment includes an appropriate dispenser (e.g. for liquids, an elongated fill needle), which can dispense to a precise location within a container blank (e.g. an opening that leads to one or more structural support volumes). The filled and dosed container blank from the dosing unit 294-2b is provided to sealing unit three 294-3b, which can take any of the forms suitable for sealing unit one 293-4b. The sealed container blank from sealing unit three 294-2b is provided to the shaping unit 294-4b, which can take any of the forms suitable for the singulating unit 293-7b. The shaped container blank from the shaping unit 294-4b is provided to the scoring unit 294-5b, which can take any of the following forms: scoring equipment, perforating equipment, or cutting equipment, or any other kind of equipment known in the art for creating a line of weakness in flexible material.

In FIG. 2B, a packaging unit 295-1b corresponds with the process of packaging 295, as described in connection with the embodiment of FIG. 2A. The filled and finished flexible container (i.e. the product), from the filling 294 portion of the making 292 is provided to the packaging unit 295-1b, which can take any of the following forms: a cartoning system, a case packer (e.g. side-loading or top-loading), a robotic case packing system, a tray packer, a wrapper, a sleever, a palletizer, or any other kind of equipment for packaging flexible containers.

Thus, some or all of the equipment units in block diagram 290-b can be used to make filled flexible containers according to embodiments of the present disclosure.

FIGS. 3-8B illustrate flexible materials in various states of processing as they are being made into a filled and finished flexible container, as described herein. In the embodiments of FIGS. 3-8B, the flexible materials are described and illustrated in the form of continuous webs although this is not required and the flexible materials may be processed in the same or similar manner, when either or both are provided as discrete sheets. In the embodiment of FIGS. 3-8B, the flexible materials are illustrated with exaggerated thicknesses for the purpose of clearly showing different layers in relation to each other.

In the embodiments of FIGS. 3-8B, a coordinate system 310, provides lines of reference for referring to directions in each of these figures. The coordinate system 310 is a three-dimensional Cartesian coordinate system with an MD-axis, a CD-axis, and a FD-axis, wherein each axis is perpendicular to the other axes, and any two of the axes define a plane. The MD-axis corresponds with an overall machine direction for equipment that is processing the flexible materials, if the flexible materials are provided in the form of a continuous web; a positive direction along the MD-axis points toward downstream processing and a negative direction along the MD-axis points toward upstream processing. The CD-axis corresponds with a cross-machine direction for equipment that is processing the flexible materials. The FD-axis corresponds with a face-direction that is typically about normal to one or more major surfaces of the flexible material during processing. In the embodiments of FIGS. 3-8B, a disposition or direction toward the environment outside of the flexible container is generally referred to as outer or outward while a disposition or direction away from the outside environment is generally referred to as inner or inward.

In the embodiments of FIGS. 3-8B, the MD-axis is about horizontal; however, this is not required, and, for each process, the coordinate system 310 can have any convenient orientation with respect to external references, such as horizontal and vertical directions. In the embodiments of FIGS. 3-8B, the flexible materials are processed "side-saddle" such that, for the container being made, its lateral direction is about aligned with the MD-axis during processing; however this is not required, and for each process, either or both of the flexible materials may be processed in one or more of any convenient orientations. For example, in an alternative embodiment, the flexible materials may be processed "end-to-end" such that, for the container being made, its longitudinal direction is about aligned with the MD-axis during processing.

Figure 3:
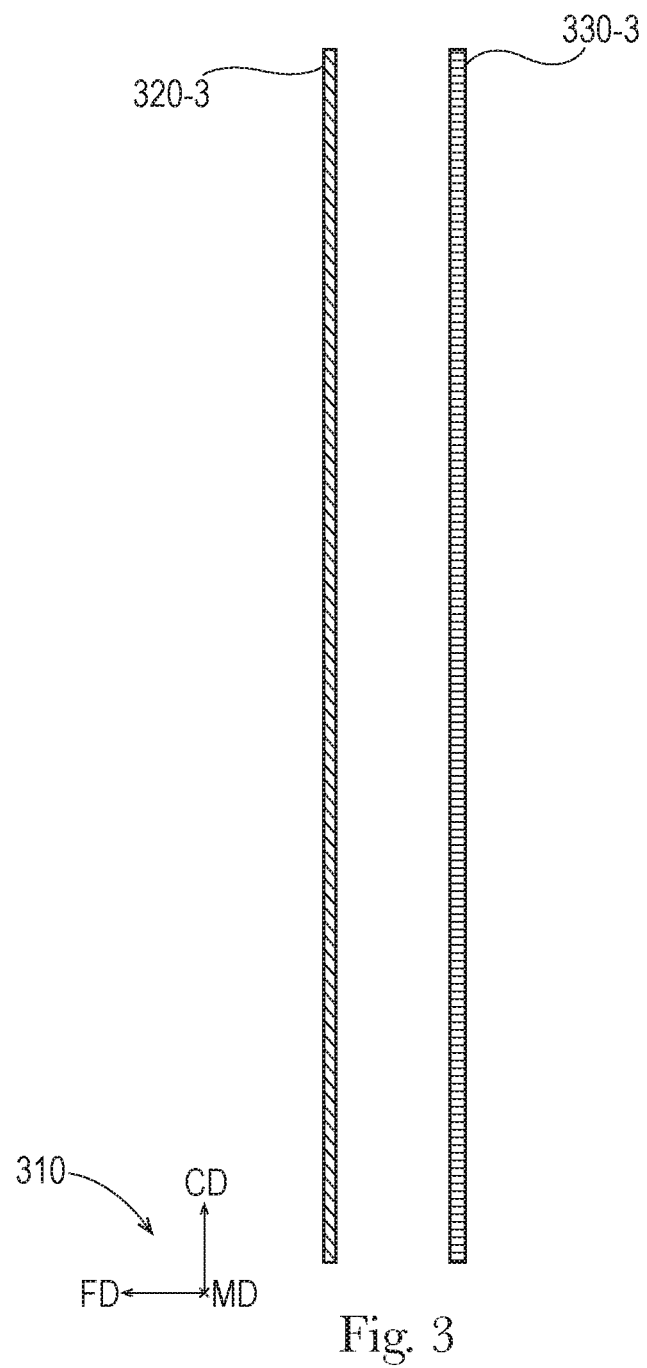
FIG. 3 illustrates a cross-sectional side view of a first flexible material and a second flexible material for use in making a flexible container.
Figure 4A:
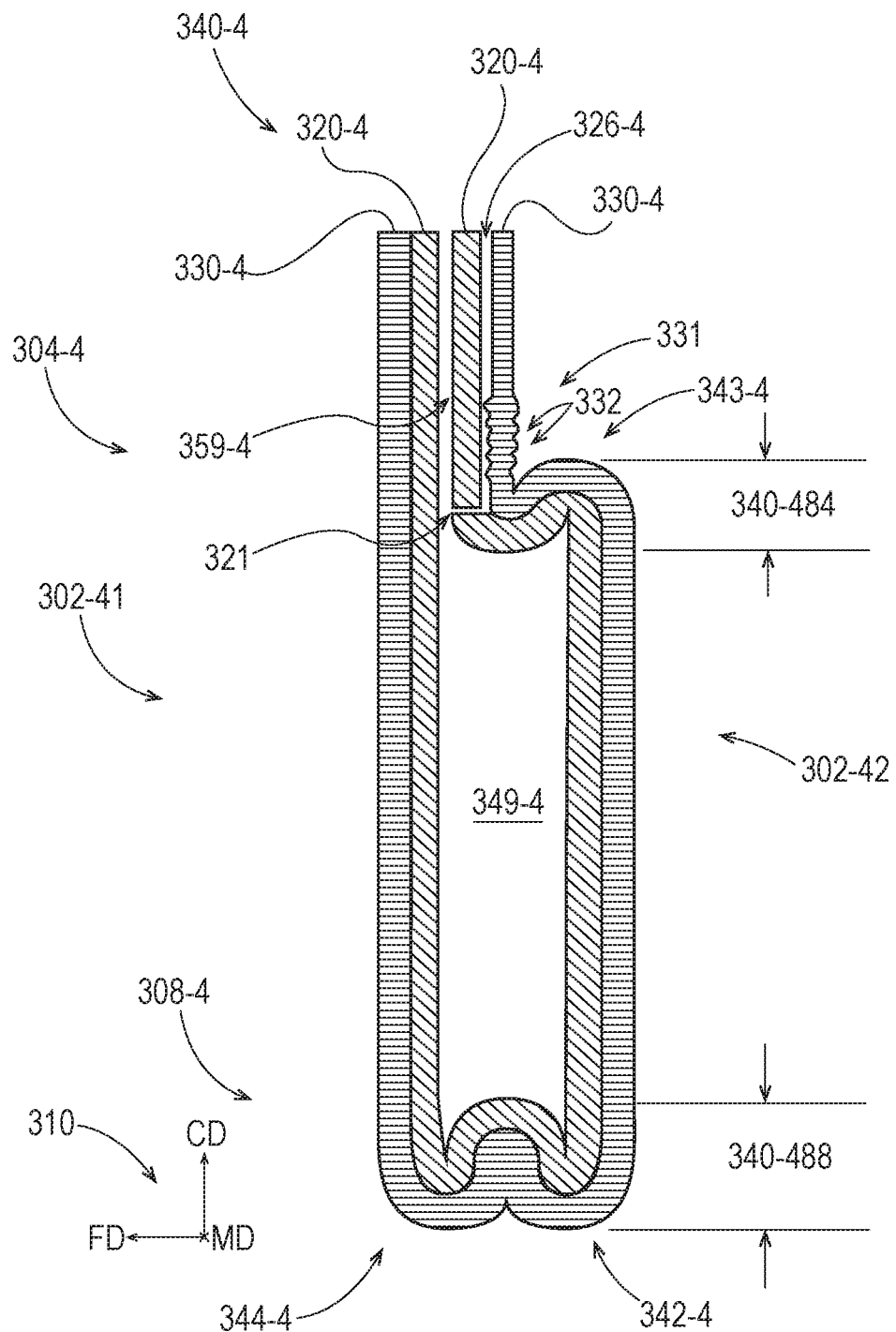
FIG. 4A illustrates a cross-sectional side view of a gusseted structure made from the combined, locally sealed, and folded flexible materials from FIG. 3.
Figure 4B:
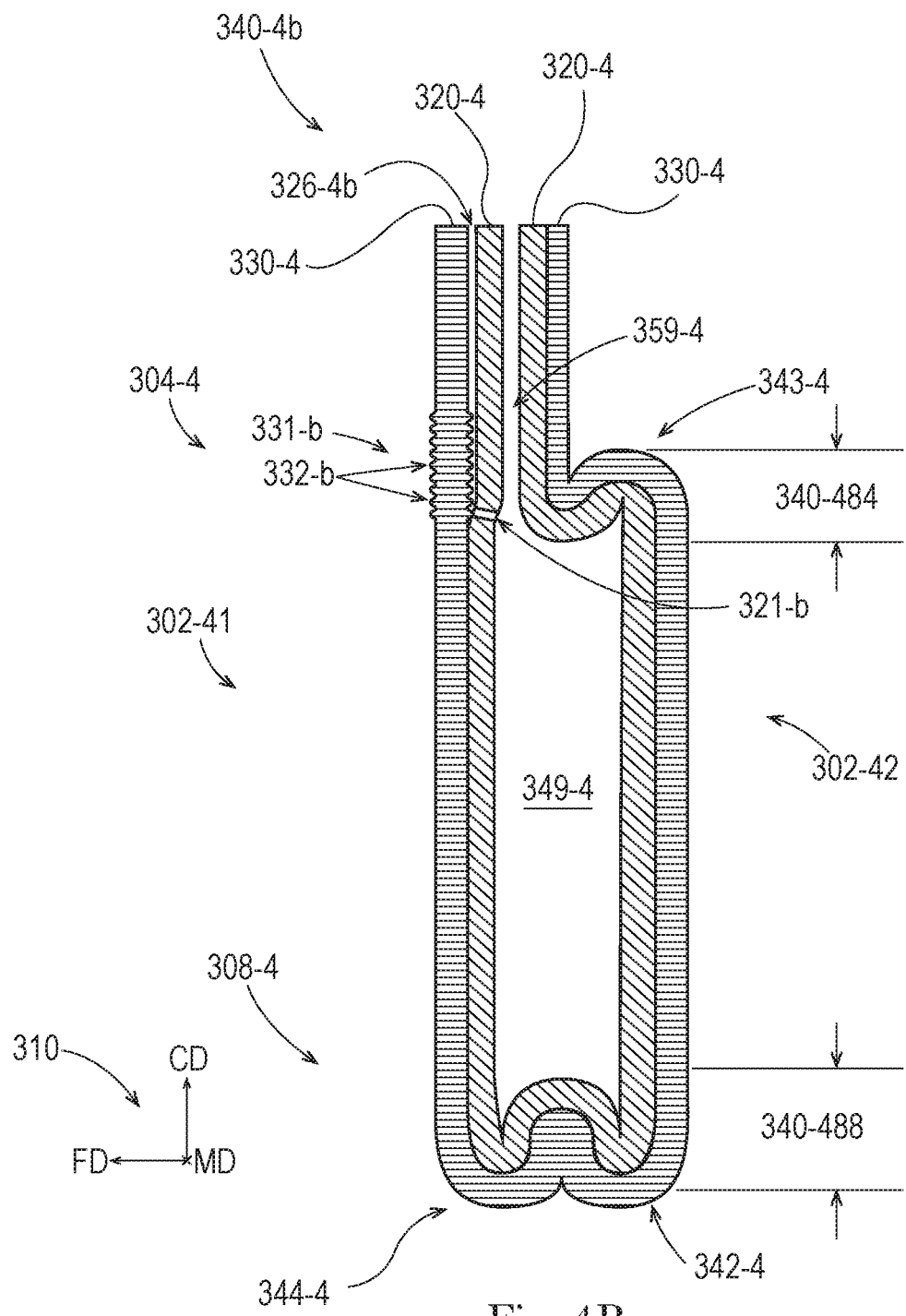
FIG. 4B illustrates an alternative embodiment of FIG. 4A.
Figure 5:
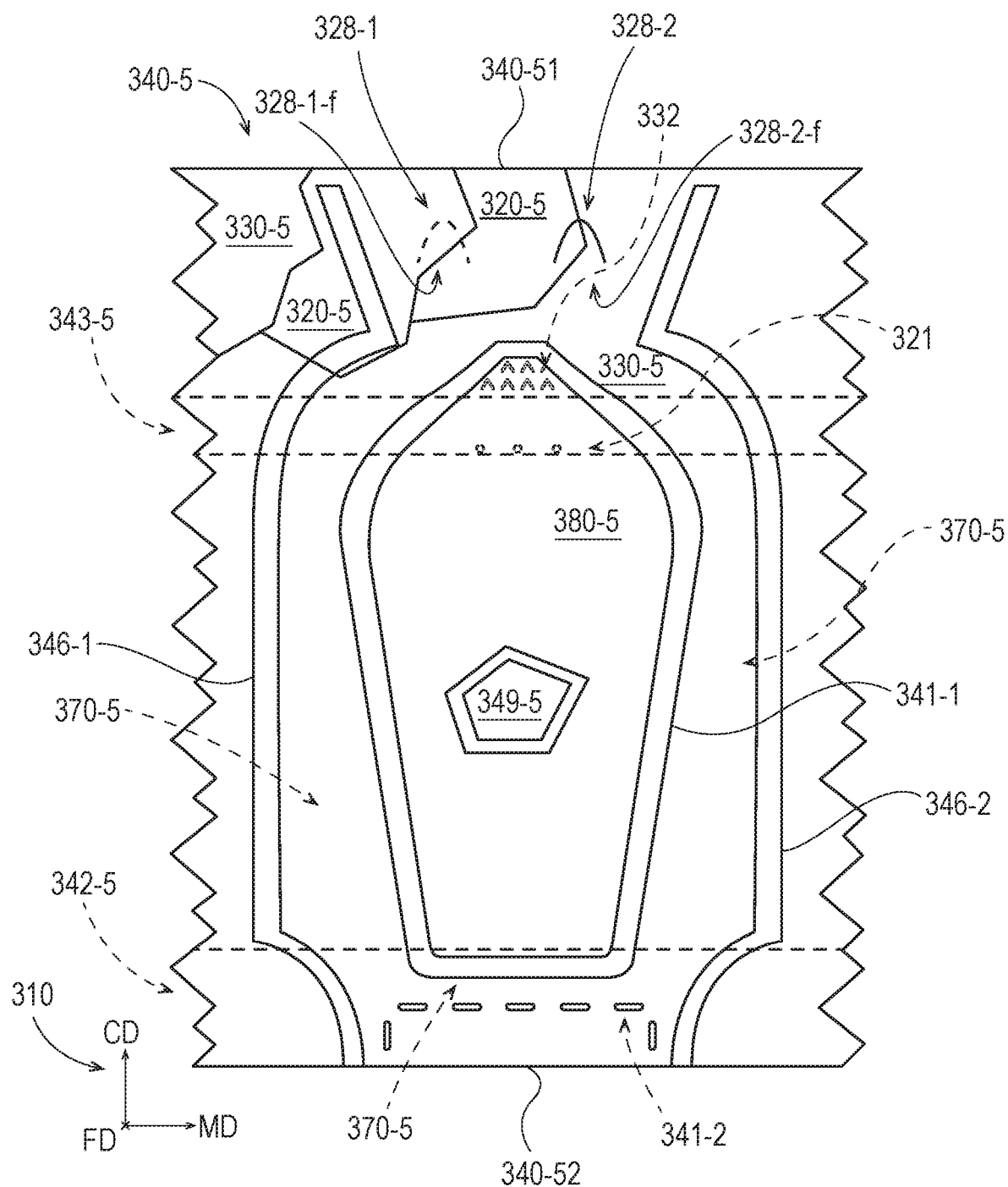
FIG. 5 illustrates a broken, front view of the gusseted structure from FIG. 4A, which is further sealed.

FIGS. 3-5 illustrate flexible materials being processed into a container blank by the converting 293 process of the making 292, as described in connection with the embodiment of FIG. 2A.

FIG. 3 illustrates a cross-sectional side view of a first flexible material 320-3 and a second flexible material 330-3 for use in making a flexible container, as described herein. The first flexible material 320-3 can be used as the first flexible material 291-1a of the embodiments of FIGS. 2A and 2B; the second flexible material 330-3 can be used as the second flexible material 291-2a of the embodiments of FIGS. 2A and 2B. The first flexible material 320-3 and the second flexible material 330-3 can be any kind of suitable flexible material, as disclosed herein, as known in the art of flexible containers, or as disclosed in any of the following: U.S. patent application Ser. No. 13/889,061 filed May 7, 2013, entitled "Flexible Materials for Flexible Containers" published as US20130337244; U.S. patent application Ser. No. 13/889,090 filed May 7, 2013, entitled "Flexible Materials for Flexible Containers" published as US20130294711; U.S. patent application Ser. No. 14/534,209 filed Nov. 6, 2015, entitled "Flexible Containers for use with Short Shelf-Life Products and Methods for Accelerating Distribution of Flexible Containers" published as US2015012557; and/or U.S. patent application Ser. No. 15/198,472 filed Jun. 30, 2016 entitled "Flexible Containers with Removable Portions;" in any workable combination. As an example, a flexible material that is a film laminate can have at least the following: one or more sealable layers (such as linear low-density polyethylene) forming one or more exterior layers, one or more reinforcing layers (such as nylon), and one or more gas barrier layers (such as ethyl vinyl alcohol). In any flexible container disclosed herein, a first flexible material and a second flexible material can have any combination of materials, structures, and/or construction, as described herein.

In the embodiment of FIGS. 3-8B, the first flexible material 320-3 becomes a flexible inner sheet, which defines an inside surface for at least portions of the following parts of a flexible container: a product space, one or more structural support volumes, a flow channel, a dispenser, and a vent passage. Since the first flexible material 320-3 becomes an inside surface of the flexible container being made, in various embodiments, part, parts, or all of a first flexible material can be a web of transparent and/or translucent film, although this is not required, and in various embodiments, part, parts, or all of a first flexible material can be decorated to display characters, graphics, branding, and/or other visual elements. In the embodiment of FIGS. 3-8B, the second flexible material 330-3 becomes a flexible outer sheet, which defines an outside surface for at least portions of the following parts of a flexible container: a product space, a nonstructural panel such as a squeeze panel, one or more structural support volumes, a flow channel, and a dispenser; the second flexible material 330-3 also defines an outside surface for at least portions of a vent passage. The one or more structural support volumes are formed between adjacent portions of the first flexible material 320-3 (the flexible inner sheet) and the second flexible material 330-3 (the flexible outer sheet). Since the second flexible material 330-3 becomes an outside surface of the flexible container being made, in various embodiments, part, parts, or all of a second flexible material can be decorated to display characters, graphics, branding, and/or other visual elements, although this is not required, and in various embodiments, part, parts, or all of a second flexible material can be a web of transparent and/or translucent film. The first flexible material 320-3 and/or the second flexible material 330-3 can be provided to the making process as a decorated (e.g. pre-printed) film, and/or can be decorated as part of the making (e.g. with the addition of one or more printing processes). In any flexible container disclosed herein, a flexible inner sheet and a flexible outer sheet can have any combination of decoration, translucence, and/or transparency, as described herein.

The first flexible material 320-3 and the second flexible material 330-3 can each have any convenient size and shape. In the embodiment of FIGS. 3-8B, for the first flexible material 320-3 and the second flexible material 330-3, each has the same overall dimension (in the direction of the CD-axis) and each has straight side edges that are parallel to the MD-axis, although these sizes and shapes are not required. In any flexible container disclosed herein, a flexible inner sheet and a flexible outer sheet can have any combination of size and shape, as described herein.

The first flexible material 320-3 and the second flexible material 330-3 can be the same, similar, or different. The first flexible material 320-3 and the second flexible material 330-3 can have the same structure, similar structures, or different structures (such as a different construction of layers). The first flexible material 320-3 and the second flexible material 330-3 can have the same decoration, similar decorations, or different decorations (such as a different graphics, branding, and/or visual elements).

In the embodiment of FIGS. 4A, 4B, and 5, gusseted structures 340-4 and 340-5 represent portions of a continuous web of the combined flexible materials being processed (i.e. the flexible materials continuously extend in the MD direction); however, in embodiments wherein the flexible materials are discrete sheets, the same gusseted structures can be formed, but with the flexible materials extending for discrete lengths in the MD direction.

FIG. 4A illustrates a cross-sectional side view of the gusseted structure 340-4 made from the flexible materials from FIG. 3, which are formed, combined, locally sealed, and folded, as described below. The gusseted structure 340-4 includes a first flexible material 320-4 (i.e. the flexible inner sheet), which is a further processed version of the first flexible material 320-3 from the embodiment of FIG. 3. The gusseted structure 340-4 also includes a second flexible material 330-4 (i.e. the flexible outer sheet), which is a further processed version of the second flexible material 330-3 from the embodiment of FIG. 3.

In the first flexible material 320-4 of FIG. 4A: a portion of the first flexible material 320-3 (from FIG. 3) that is disposed on an inner side of the open gusset leg, toward the back 302-42 is formed with vent openings 321, which are through holes, as described in connection with the forming 293-1*a* process of the embodiment of FIG. 2A; the first flexible material 320-3 is combined with the second flexible material 330-3 (from FIG. 3) in aligned, direct, face-to-face contact, as described in connection with the combining 293-3*a* process of the embodiment of FIG. 2A; and the first flexible material 320-3 is locally sealed to the second flexible material 330-3, as described in connection with the sealing 293-4*a* process of the embodiment of FIG. 2A, and as shown with a first seal described in connection with the embodiment of FIG. 5.

In the second flexible material 330-4 of FIG. 4A: a portion 331 of the second flexible material 330-3 (from FIG. 3) that is disposed on an inner side of the open gusset leg, toward the back 302-42 is formed with stand-offs 332, which are surface formations, for a vent passageway 326-4, as described in connection with the forming 293-2*a* process of the embodiment of FIG. 2A; the second flexible material 330-3 is combined with the first flexible material 320-3 in aligned, direct, face-to-face contact, as described in connection with the combining 293-3*a* process of the embodiment of FIG. 2A; and the second flexible material 330-3 from FIG. 3 is locally sealed to the first flexible material 320-3, as described in connection with the sealing 293-4*a* process of the embodiment of FIG. 2A, and as shown with a first seal described in connection with the embodiment of FIG. 5.

The gusseted structure 340-4 of FIG. 4A includes the first flexible material 320-4 and the second flexible material 320-4, as described above, wherein these formed, combined, and sealed flexible materials are folded with the folding 293-5*a* process of the embodiment of FIG. 2A, which results in the gusseted structure 340-4, which includes: a top 304-4 (toward the CD positive portion of the gusseted structure 340-4), which includes the top of the flexible container being made; a bottom 308-4 (toward the CD negative portion of the gusseted structure 340-4), which becomes the bottom of the flexible container being made; a Z-fold 342-4 in the bottom 308-4; a reverse Z-fold 343-4 in the top; a V-fold 344-4 in the bottom 308-4; and an open portion 359-4 (disposed in the top 304-4, between portions of the first flexible material 320-4 that are not directly connected to each other), wherein parts of the open portion 359-4 become the flow-channel and the dispenser of the flexible container being made. The gusseted structure 340-4 includes a front 302-41 (toward the FD positive side of the gusseted structure 340-4) that corresponds with a front of the flexible container being made as well as a back 302-42 (toward the FD negative side of the gusseted structure 340-4) that corresponds with a back of the flexible container being made.

The opening and the folds in the gusseted structure 340-4 form the gusset legs in the flexible container being made. The Z-fold 342-4, which is disposed in the back 302-42 and the bottom 308-4 becomes a back bottom folded gusset leg in the flexible container being made. The reverse Z-fold 343-4, which is disposed in the back 302-42 and the top 304-4 becomes a back top folded gusset leg in the flexible container being made. The V-fold, which is disposed in the front 302-41 and the bottom 308-4 becomes a front bottom folded gusset leg in the flexible container being made. The open portion 359-4, which is disposed toward the front 302-41 and in the top 304-4 becomes a front top open gusset leg in the flexible container being made.

In the top 304-4 and the front 302-41 of the gusseted structure 340-4 (the open gusset leg), the upper edges of the first flexible material 320-4 and the second flexible material 330-4 are aligned in the positive CD direction, however this is not required; the upper edge of one or more of the layers of these materials may be offset from one or more of the other upper edges. In the top 304-4 and the back 302-42 of the gusseted structure 340-4 (the back top folded gusset leg), the upper extent of the reverse Z-fold is disposed below (in the negative CD direction) the upper edges of the layers in the open gusset leg, however this is not required. In the bottom 308-4, in the front 302-41 and the back 302-42 of the gusseted structure 340-4, the lower extents of the second flexible material 330-4 for the Z-fold 342-4 and the V-fold 344-4 are aligned in the negative CD direction, however this is also not required; either the Z-fold 342-4 (the back bottom folded gusset leg) or the V-fold 344-4 (the front bottom folded gusset leg) may extend farther in the negative CD direction, than the other.

The opening and the folds in the gusseted structure 340-4 also form portions with four or eight layers of thickness, with respect to the FD direction. Due to the Z-fold 342-4 and the V-fold 344-4, the gusseted structure 340-4 has a bottom portion 340-488 with eight layers (with respect to the FD direction). Due to the reverse Z-fold 343-4 and the layers of flexible material forming the open portion 359-4, the gusseted structure has a top portion 340-484 with eight layers (with respect to the FD direction). In a middle portion of the gusseted structure 340-4, between the top portion 340-484 and the bottom portion 340-488, the gusseted structure 340-4 has four layers; two connected layers in the front 302-41 and two connected layers in the back 302-42 (with respect to the FD direction). In an uppermost portion of the gusseted structure 340-4, above the top portion 340-484, the gusseted structure 340-4 also has four layers; two connected layers in the front 302-41 and two connected layers in the back 302-42 (with respect to the FD direction).

The gusseted structure 340-4 includes an interior space 349-4, the extent of which is defined by the first flexible material 320-4, which is considered the flexible inner sheet. In FIG. 4A, for clarity, the interior space 349-4 is illustrated with an exaggerated gap (in the FD direction) between portions of the flexible material 320-4 disposed in the front 302-41 and in the back 302-42; however, this gap is not required during processing, and in various embodiments, part, parts, or all of these portions of the flexible material 320-4 may be in contact with each other. For each flexible container being made, the interior space 349-4 is subsequently divided into one or more separate structures (e.g. one or more product spaces) when the gusseted structure 340-4 is further sealed (and thus divided in the MD direction), as described in connection with the embodiment of FIG. 5. The outside of the gusseted structure 340-4 is formed by the second flexible material 330-4, which is considered the flexible outer sheet.

FIG. 4B illustrates a gusseted structure 340-4b, which is the same as the gusseted structure 340-4 of FIG. 4A, except as described below. In the gusseted structure 340-4 of FIG. 4A, the vent passage 326-4 is disposed in the open gusset leg, toward the back 302-42, on the side proximate to the reverse Z-fold 343-4, while in the gusseted structure 340-4b of FIG. 4B, a vent passage 326-4b is disposed in the open gusset leg, toward the front 302-41, on the side opposite from the reverse Z-fold 343-4. In FIG. 4B, vent openings 321-b are configured in the same way as the vent openings 321 of FIG. 4A, except that the vent openings 321-b are disposed on a portion of the first flexible material 320-4 that is on the outer side of the open gusset leg. In FIG. 4B, a portion 331-b of the second flexible material 330-4 is formed with stand-offs 332-b, which are the same as the stand-offs 332 of FIG. 4A, except that the portion 331-b with the stand-offs 332-b is disposed on a portion of the first flexible material 320-3 that is on the outer side of the open gusset leg.

FIG. 5 illustrates a broken, front view of a gusseted structure 340-5 made from the gusseted structure 340-4 from FIG. 4A, which is further sealed, as described below. The gusseted structure 340-5 includes a first flexible material 320-5, which is a further processed version of the first flexible material 320-4 in the gusseted structure 340-4 from the embodiment of FIG. 4A. The gusseted structure 340-5 also includes a second flexible material 330-5, which is a further processed version of the second flexible material 330-4 in the gusseted structure 340-4 from the embodiment of FIG. 4A. The layers of these flexible materials are shown as partially broken, to illustrate their relative positions within the gusseted structure 340-5. In the top, the gusseted structure 340-5 has an open gusset leg with a layered structure that includes, from front to back: a layer of the second flexible material 330-5 (i.e. the flexible outer sheet), two layers of the first flexible material 320-5 (i.e. the flexible inner sheet), and another layer of the second flexible material 330-5 (i.e. the flexible outer sheet).

The open gusset leg also includes two cuts through portions of the layer of the second flexible material 330-5 in the front of the gusseted structure 340-5. The cuts include a first cut 328-1 and a second cut 328-2, each of which has an overall shape like an inverted English letter U. Each of the cuts 328-1 and 328-2 is completely through the second flexible material 330-5, but neither cut separates away any portion of the second flexible material 330-5. Each of the cuts 328-1 and 328-2 creates a flap that can be pushed down to form an opening within the second flexible material 330-5. The first cut 328-1 creates a first flap 328-1-f and the second cut 328-2 creates a second flap 328-2-f. The first cut 328-1 is shown with a phantom line to indicate where the first cut 328-1 would be located, if the front layer of the second flexible material 330-5 were not broken away. In various embodiments, such cuts can be made in any number, any size(s), any shape(s), any pattern, and can be disposed in any convenient arrangement; as examples, each cut can be a single slit, or each cut can be a double, overlapping slit (e.g. cut in the shape of the English letter X); any of these cuts can be made to allow a mechanical projection to pass through, as described in connection with the embodiment of FIG. 7B. For example, in some embodiments, the cuts can be in the form of a plurality of parallel cuts that are in the location of the U-cuts shown in FIG. 5. The parallel cuts can extend vertically, and there can be a horizontal cut at the bottom of the vertical cuts. This will form a plurality of vertically-oriented strips that are attached to the layer of the second flexible material 330-5 along the top portions of the strips. The bottoms of the strips can be free to move to create flaps. In alternative embodiments, one or more through holes can be made instead of the cuts, although cutting a hole usually creates scrap pieces, which must be removed from the making process.

The gusseted structure 340-5 includes a top edge 340-51, which is formed by the aligned upper edges of the flexible materials, and is oriented in the MD direction. The gusseted structure 340-5 also includes a bottom edge 340-52, which is formed by the lower extent of the bottom folds of the flexible materials, and is parallel to the top edge 340-51. The sides of the gusseted structure 340-5 are shown as broken, since the flexible materials are shown as a portion of a continuous web of indefinite length, extending in both the positive MD direction and the negative MD direction; the portion shown corresponds with flexible materials that become a container blank.

FIG. 5 shows that the gusseted structure 340-5 includes a top gusset 343-5, which is a further processed version of the reverse Z-fold 343-4 of FIG. 4A. In FIG. 5, the top gusset 343-5 is an inward fold illustrated by two parallel hidden lines, each extending continuously in the MD direction, separated from each other by a uniform distance in the CD direction. FIG. 5 also shows that the gusseted structure 340-5 includes a bottom gusset 342-5, which is a further processed version of the Z-fold 342-4 and the V-fold 344-4 of FIG. 4A. In FIG. 5, the bottom gusset 342-5 is an inward fold illustrated by a hidden line extending continuously in the MD direction, separated from the bottom edge 340-52 by a uniform distance in the CD direction.

FIG. 5 also shows that the gusseted structure 340-5 includes the vent openings 321, as described in connection with the embodiment of FIG. 4A. The vent openings 321 are three small, round holes, aligned in the MD direction, and laterally centered on the partially formed container blank; however, in various embodiments, vent openings can have any number, any size(s), any shape(s), any pattern, and can be disposed in any convenient arrangement. The vent openings 321 are shown as hidden since they are disposed on a layer of the first flexible material 320-5 in the flexible container being made. The vent openings 321 are disposed on a portion of the top gusset 343-5, at or proximate to a bottom extent (in the negative CD direction) of the reverse Z-fold of the top gusset 343-5, such that (when the container stands upright) any fluent product that enters the vent passage can drain (by gravity) to the bottom of the vent passage, through the vent openings 321, and back into the product space of the flexible container; however, in various embodiments, vent openings can be disposed in any convenient location that provides fluid communication between the vent passage and the product space of the flexible container being made.

FIG. 5 further shows that the gusseted structure 340-5 includes the vent stand-offs 332, as described in connection with the embodiment of FIG. 4A. The vent stand-offs 332 are shown as a pattern of small, inverted V-shaped formations, aligned in two rows, with each row of formations linearly arrayed in the MD direction, the overall pattern laterally centered on the partially formed container blank, and the pattern having an overall shape that is trapezoidal, having a top in the positive CD direction and a bottom in the negative CD direction; however, in various embodiments, vent stand-offs can have any number, any size(s), any shape(s), any pattern, and can be disposed in any convenient arrangement. The vent stand-offs 332 are shown as hidden since they are disposed on a layer of the second flexible material 330-5 in the flexible container being made. The vent stand-offs 332 are disposed above (in the positive CD direction) the reverse Z-fold of the top gusset 343-5 and on a portion of the second flexible material 330-5 that overlays the vent passage. The shapes formed by the vent stand-offs 332 extend through the second flexible material 330-5 (in the FD direction), such that the shapes of the stand-offs can at least assist in providing separation between the adjacent flexible materials (i.e. the layer of the flexible inner sheet and the layer of the flexible outer sheet); however, in various alternate embodiments, part or parts of some or all of the vent stand-offs 332 can be disposed on only the inward facing side of the second flexible material 330-5.

In the gusseted structure 340-5 of FIG. 5, portions of layers of the first flexible material 320-5 and portions of layers of the second flexible material 330-5 are sealed together, as described in connection with the local sealing 293-4a process of the embodiment of FIG. 2A (performed before the folding 293-5a), and as shown with a first seal, described below. The gusseted structure 340-5 includes a first portion 341-1 of a first seal, a second portion 341-2 of the first seal (shown as hidden), as well as third and fourth portions of the first seal (not shown), wherein all portions of the first seal are made by the local sealing 293-4a. The first portion 341-1 of the first seal is a front panel seal in a closed shape that defines the periphery of a front panel 380-5 of the flexible container being made as well as at least parts of the inside edges of structural support volumes around the front panel 380-5; the first portion 341-1 of the first seal has an overall shape like a top part of an hourglass and is laterally centered on the flexible container being made. The second portion 341-2 of the first seal (shown as hidden), is a bottom panel seal in one or more closed shapes that define the periphery of a bottom panel of the flexible container being made as well as at least parts of the inside edges of structural support volumes around the bottom panel; the second portion 341-2 of the first seal has an overall shape that is rectilinear and is laterally centered on the flexible container being made. The third portion of the first seal (not shown) is a back panel seal in a closed shape that defines the periphery of a back panel of the flexible container being made as well as at least parts of the inside edges of structural support volumes around the back panel; the third portion of the first seal has an overall shape that is same as the overall shape of the first portion and is also laterally centered on the flexible container being made. The fourth portion of the first seal (not shown) includes portions of a reinforcing seal that is a continuously sealed area that defines at least parts of the edges of structural support volumes in the bottom of the flexible container being made. In various alternate embodiments, the size, shape, number, and location of each portion of a first seal can be adjusted, according to the design of the flexible container being made; for example, the design can be any embodiment of the flexible container of FIGS. 1A-1G (including any alternative embodiment disclosed herein). Together, the portions of the first seal and portions of the bottom edge 340-52 form edges of part of a structural support space 370-5 that becomes part of a structural support frame formed by a plurality of structural support volumes in the flexible container being made, wherein the structural support space 370-5 is disposed between adjacent layers of the first flexible material 320-5 and the second flexible material 330-5.

In the gusseted structure 340-5 of FIG. 5, portions of layers of the first flexible material 320-5 and portions of the layers of the second flexible material 330-5 are sealed together, as described in connection with the local sealing 293-6a process of the embodiment of FIG. 2A (performed after the folding 293-5a), and as shown with a second seal, described below. The gusseted structure 340-5 includes a first portion 346-1 of the second seal and a second portion 346-2 of the second seal, wherein both portions of the second seal are made by the local sealing 293-6a.

The first portion 346-1 of the second seal is shown on a left side of FIG. 5 and is part of a front frame seal that is a shaped line with multiple parts connected end-to-end, wherein the first seal includes: first, in part of the bottom of the flexible container being made, a curved part that curves laterally outward (in the negative MD direction) from its bottom to its top, wherein about all of the curved part is sealed through eight layers of the flexible materials in the bottom gusset 342-5, and the curved part defines at least parts of the outside edges of structural support volumes in the bottom parts; second, in part of the bottom and middle of the flexible container being made, a straight part, oriented in about the CD direction from its bottom to its top, wherein about all of the straight part is sealed through four layers of the flexible materials, and the straight part defines at least parts of the outside edges of structural support volumes in the bottom and middle parts; third, in part of the middle and top of the flexible container being made, another curved part that curves laterally inward (in the positive MD direction) from its bottom to its top, wherein part of this curved part is sealed through four layers of the flexible materials and part of this curved part is sealed through eight layers of the flexible materials (in the top gusset 343-5), and this curved part defines at least parts of the outside edges of structural support volumes in the middle and top parts; and fourth, in part of the top of the flexible container being made, another straight part, oriented at an angle between the positive CD direction and the negative MD direction, angled laterally outward (in the negative MD direction) from its bottom to its top, wherein all of this straight part is sealed through four layers of the flexible materials, and this straight part defines a connection between top portions of the flexible materials that are subsequently trimmed away. Together, the parts of the first portion 346-1 of the second seal form a continuous outside edge on a left side of part of the structural support space 370-5 that becomes a structural support frame formed by a plurality of structural support volumes in the flexible container being made, wherein this part of the structural support space 370-5 is disposed: first, in the front, in the space between the first portion 346-1 of the second seal and the left side of the first portion 341-1 of the first seal (i.e. the front panel seal) and also between the first flexible material 320-5 and the second flexible material 330-5; and second, in the back, in the space between the first portion 346-1 of the second seal and the left side of the third portion of the first seal (i.e. the back panel seal) and also between the first flexible material 320-5 and the second flexible material 330-5.

The second portion 346-2 of the second seal is shown on a right side of FIG. 5 and is part of a front frame seal that is a shaped line with multiple parts connected end-to-end, wherein the first seal includes parts that are the same as the parts on the first portion 346-1 of the second seal, but mirrored by a mirror line (not shown) that is oriented in the CD direction and disposed laterally (in the MD direction) at the center of the flexible container being made. Together, the parts of the second portion 346-2 of the second seal form a continuous outside edge on a right side of part of the structural support space 370-5 that becomes a structural support frame formed by a plurality of structural support volumes in the flexible container being made, wherein this part of the structural support space 370-5 is disposed: first, in the front, in the space between the second portion 346-2 of the second seal and the right side of the first portion 341-1 of the first seal (i.e. the front panel seal) and also between the first flexible material 320-5 and the second flexible material 330-5; and second, in the back, in the space between the second portion 346-2 of the second seal and the right side of the third portion of the first seal (i.e. the back panel seal) and also between the first flexible material 320-5 and the second flexible material 330-5.

In various alternate embodiments, the size, shape, number, and location of each portion of a first seal and/or a second seal, as described above, can be adjusted, according to the design of the flexible container being made; for example, the design can be any embodiment of the flexible container of FIGS. 1A-1G (including any alternative embodiment disclosed herein).

The gusseted structure 340-5 includes a partially complete product space 349-5 (shown in broken portion), which is a further processed version of the interior space 349-4 from the embodiment of FIG. 4A, but bounded on the left (negative MD direction) by the first portion 346-1 of the second seal and bounded on the right (positive MD direction) by the second portion 346-2 of the second seal.

For the flexible container being made, the gusseted structure 340-5 of FIG. 5 is subsequently separated from surrounding portions of the flexible materials by precision cutting that also effectively trims away excess portions, as described in connection with the singulating 293-7a process of the embodiment of FIG. 2A, thus forming a partially complete container blank, as described in connection with the embodiment of FIG. 6.

FIGS. 6-8B illustrate a container blank being processed into a filled flexible container by the filling 294 process of the making 292, as described in connection with the embodiment of FIG. 2A.

Figure 6:
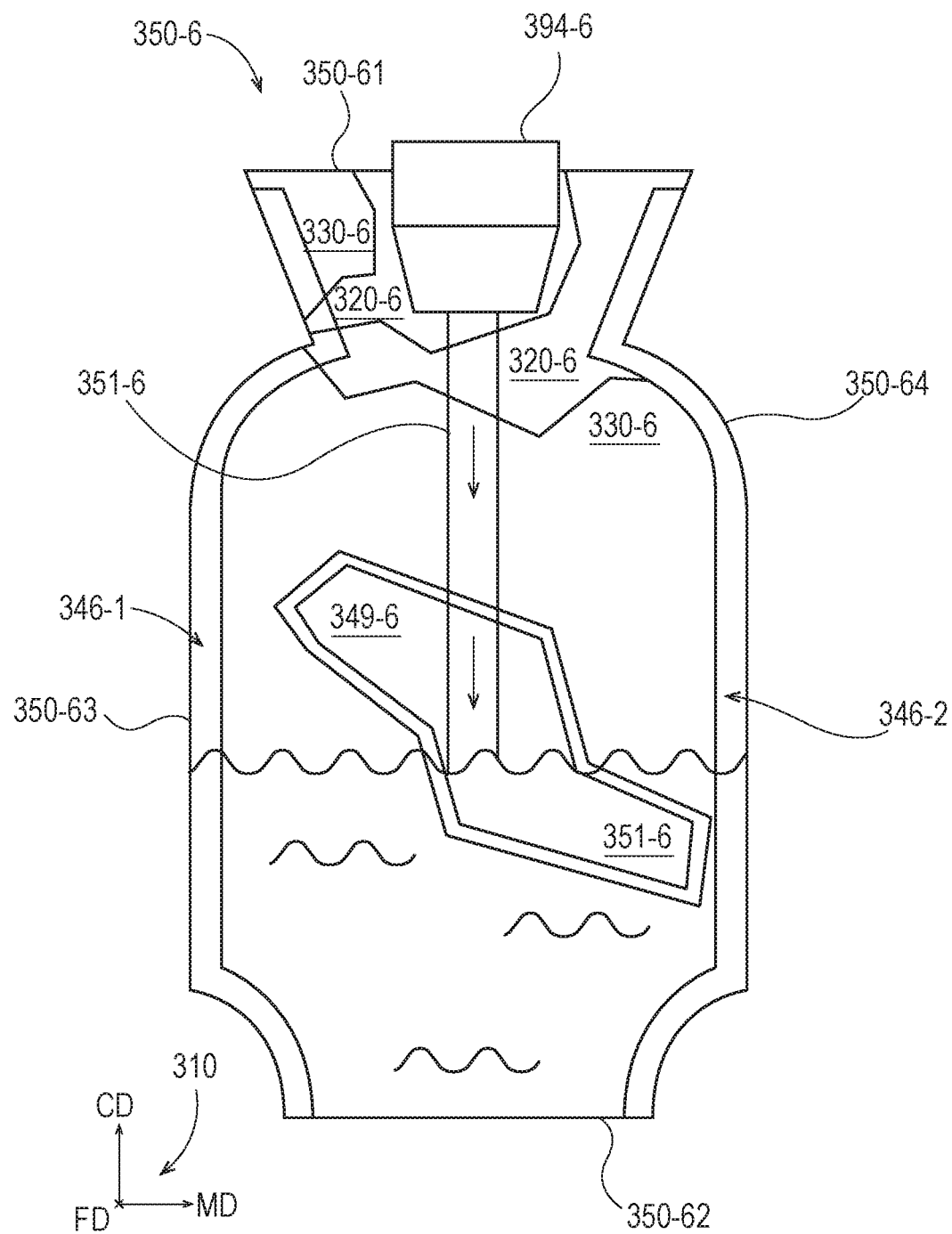
FIG. 6 illustrates a front view of the gusseted structure from FIG. 5 singulated into a partially complete container blank and being filled with a fluent product.

FIG. 6 illustrates a broken, front view of a partially complete container blank 350-6 made from the gusseted structure 340-5 from FIG. 5, which is singulated and being filled with a fluent product 351-6, as described below. For the purpose of clarity, FIG. 6 does not show the vent openings, the vent stand-offs, or portions of the first seal; also, the flexible materials are illustrated as transparent. However, FIG. 6 does show the first portion 346-1 of the second seal and the second portion 346-2 of the second seal, which are the same as in the embodiment of FIG. 5.

The partially complete container blank 350-6 includes a first flexible material 320-6, which is a further processed version of the first flexible material 320-5 in the gusseted structure 340-5 from the embodiment of FIG. 5. The partially complete container blank 350-6 also includes a second flexible material 330-6, which is a further processed version of the second flexible material 330-5 in the gusseted structure 340-5 from the embodiment of FIG. 5. The layers of these flexible materials are shown as partially broken, to illustrate their relative positions within the partially complete container blank 350-6. In the top, the gusseted structure 350-6 has an open gusset leg with a layered structure that includes, from front to back: a layer of the second flexible material 330-6 (i.e. the flexible outer sheet), two layers of the first flexible material 320-6 (i.e. the flexible inner sheet), and another layer of the second flexible material 330-6 (i.e. the flexible outer sheet).

The partially complete container blank 350-6 includes a bottom edge 350-62, which is a further processed version of the bottom edge 340-52 from the embodiment of FIG. 5, wherein the flexible materials along the bottom edge 350-62 are cut through on both sides, as part of the singulating, to a final width (in the MD direction) for the flexible container blank. The partially complete container blank 350-6 also includes a top edge 350-61, which is a further processed version of the top edge 340-51 from the embodiment of FIG. 5, wherein the flexible materials along the top edge 350-61 are cut through on both sides, as part of the singulating (with portions of the flexible materials proximate to the top edge 350-61 subsequently trimmed away). The partially complete container blank 350-6 includes a left side edge 350-63, which is a further processed version of the gusseted structure 340-5 of FIG. 5, wherein the flexible materials are cut through, as part of the singulating, at a distance that is proximate to but offset outward (generally in the negative MD direction) from the first portion 346-1 of the second seal, all along the first portion 346-1, from the bottom edge 350-62 to the top edge 350-61. The partially complete container blank 350-6 also includes a right side edge 350-64, which is a further processed version of the gusseted structure 340-5 of FIG. 5, wherein the flexible materials are cut through, as part of the singulating, at a distance that is proximate to but offset outward (generally in the positive MD direction) from the second portion 346-2 of the second seal, all along the second portion 346-2, from the bottom edge 350-62 to the top edge 350-61. Together, the top edge 350-61, the left side edge 350-63, the bottom edge 350-62, and the right side edge 350-64 define an outer extent of the partially complete container blank 350-6.

In the embodiment of FIG. 6, a dispenser 394-6 is dispensing the fluent product 351-6 into a partially complete product space 349-6, such that the fluent product 351-6 is filling 294-1a the partially complete container blank 350-6, as described in connection with the embodiment of FIG. 2A. The partially complete product space 349-6 is the same as the partially complete product space 349-5 of the embodiment of FIG. 5, except that the flexible materials are changing shape as the partially complete product space 350-6 is filled.

The dispenser 394-6 is part of a filling unit, such as the filling unit 294-1b, as described in connection with the embodiment of FIG. 2B. The dispenser 394-6 may be in any suitable configuration. In some cases, particularly when the expansion material is a phase change material in liquid form, the dispenser 394-6 may be an insulated tubular nozzle. In the embodiment of FIG. 6, the dispenser 394-6 extends downward (in the negative CD direction) as shown, past the top edge 350-61 and into a top portion of the partially complete container blank 350-6, between the adjacent layers of the first flexible material 320-6 (i.e. the flexible inner sheet), to a position that is above (in the positive CD direction) the partially complete product space 349-5; however, in alternate embodiments, one or more dispensers can be used with each dispenser positioned at various orientations, locations, and/or distances, with respect to one or more product spaces within a flexible container blank. The fluent product 351-6 travels in a stream out from the dispenser, downward (in the negative CD direction) as indicated by the arrows, and fills the partially complete product space 349-5 from its bottom up (in the positive CD direction).

FIGS. 7A-7D illustrate a partially complete container blank being opened and an expansion material being added.

For the purpose of clarity, in FIGS. 7A-7D portions of the flexible materials are illustrated as transparent and/or partially broken.

Figure 7A:
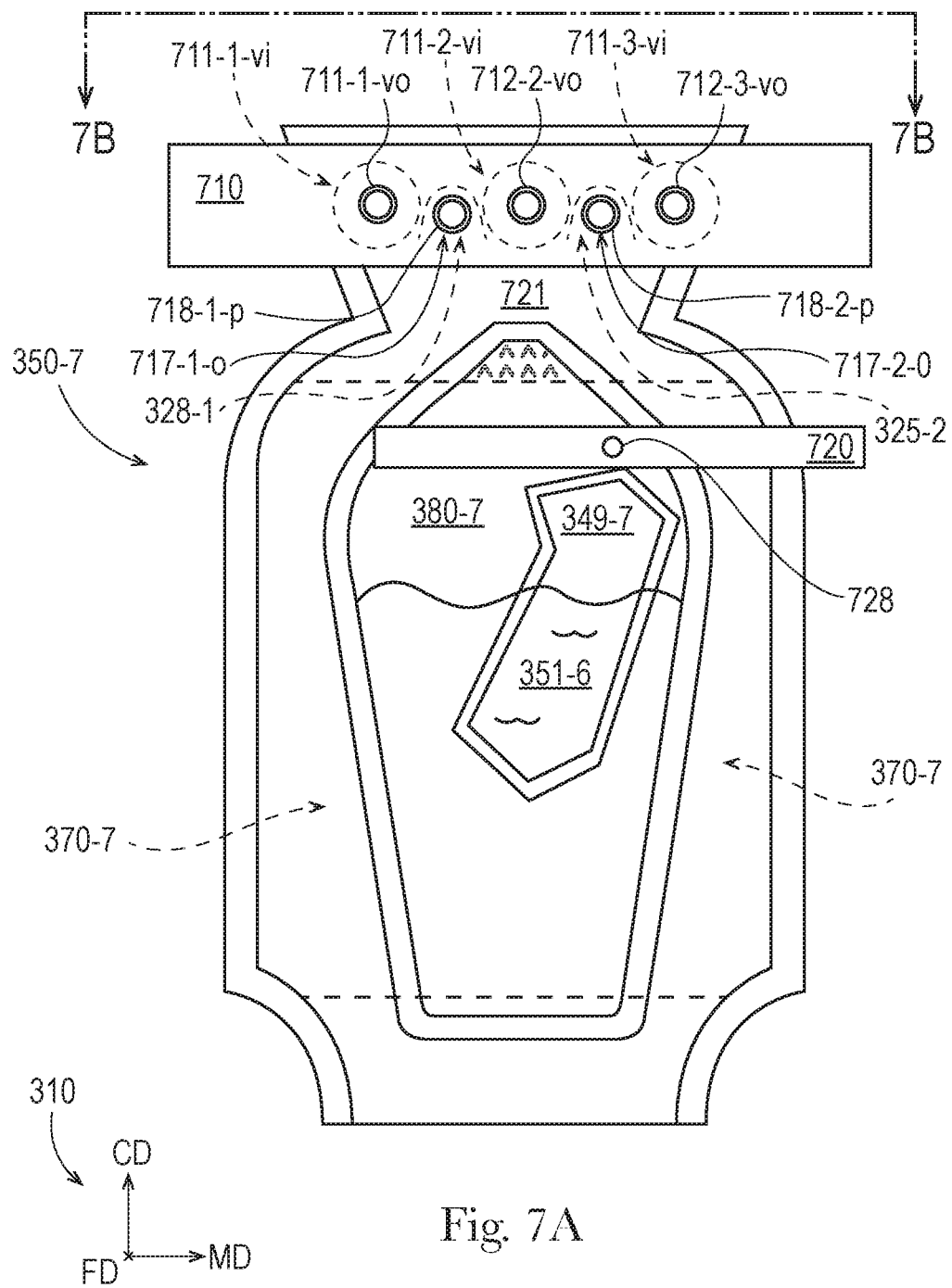
FIG. 7A illustrates a front view of the filled container blank from FIG. 6, partially closed off by a pinch gripper, and partially held by a vacuum block.

FIG. 7A illustrates a front view of a partially complete container blank 350-7, partially closed off by a pinch gripper 720 and partially held by a vacuum block 710. The partially complete container blank 350-7 is the same as the partially complete container blank 350-6 from FIG. 6, which is filled with the fluent product 351-6 from FIG. 6, and is being prepared for dosing with an expansion material, as described below. The partially complete container blank 350-7 includes a front panel 380-7, which overlays a partially complete product space 349-7, and which is at least partially surrounded by a structural support space 370-7. The partially complete product space 349-7 is the same as the partially complete product space 349-6 of the embodiment of FIG. 6, except that the flexible materials have a changed shape from the product space 349-7 being filled with the fluent product 351-6. The structural support space 370-7 is about the same as the structural support space 370-5 of FIG. 5. The top edge 350-71 is the uppermost (furthest in the CD direction) part of the container blank 350-7 and is configured in the same way as the top edge 350-61 of FIG. 6.

For portions of the partially completed container blank 350-7 with four layers, the layered structure includes, from front to back: a first layer 721, which is an outer layer of the second flexible material 330-6 of FIG. 6 (i.e. formed by a portion of the flexible outer sheet); a second layer 722 (shown in FIG. 7B), which is adjacent to the first layer 721, and which is a layer of the first flexible material 320-6 of FIG. 6 (i.e. formed by a portion of the flexible inner sheet); a third layer 723 (shown in FIG. 7B), which is adjacent to the second layer 722, and which is another layer of the first flexible material 320-6; and a fourth layer 724 (shown in FIG. 7B), which is adjacent to the third layer 723, and which is another layer of the second flexible material 330-6. However, in various alternative embodiments, a partially completed container blank may include one or more intermediate layers added in between part, parts, or all of the layers described above.

In FIG. 7A, parts of the container blank 350-7 are closed off by the pinch gripper 720. The pinch gripper 720 pinches and holds the right side and the middle of an upper portion of the partially complete container blank 350-7, by contacting and pressing (in the negative FD direction) on a portion of a front of the container blank 350-7, while a corresponding portion on a back of the container blank 350-7 is supported by an opposing surface and/or by an opposing pinch gripper (not shown). The pinching by the pinch gripper 720 presses together all of the layers of the flexible material(s) that form the container blank 350-7, such that liquid(s) and/or vapor(s) cannot pass between the portions of the layers that are in contact with each other from the pressing.

When the pinch gripper 720 pinches and holds the partially complete container blank 350-7, the pinch gripper 720 presses together the first and second layers as well as the third and fourth layers. This effectively closes off a top part of the right side of the structural support space 370-7. Thus, the pinching can prevent the escape of a vaporous expansion material through that closed off part. As a result, during the subsequent addition of expansion material, less vaporous expansion material is lost, before the structural support space 370-7 can be permanently sealed.

And, when the pinch gripper 720 pinches and holds the partially complete container blank 350-7, the pinch gripper 720 presses together the second and third layers. This effectively closes off a top part of the product space 349-7. Thus, the pinching can prevent the fluent product 351-6 from splashing upward and/or sloshing out of the product space 349-7 through that closed off part. As a result, the fluent product 351-6 is retained within the product space 349-7 and the top portion of the container blank 350-7 is kept clean, so the product space 349-7 can subsequently be permanently sealed (without fluent product creating contamination between the sealed layers).

The pinch gripper 720 has an overall shape that is similar to an elongated rectangle. The pinch gripper 720 includes a continuous plate-like front, oriented in the CD-MD plane, and configured for contacting part of a front of the partially complete container blank 350-7. The long sides of the pinch gripper 720 are horizontally oriented in the MD direction. The pinch gripper 720 is supported by a support rod 728 that is rigidly connected to a back of the pinch gripper 720.

In various embodiments, the pinch gripper 720 can be configured in alternate ways. A pinch gripper can be configured with a different size, shape, and/or orientation. A pinch gripper can have a plurality of contact surfaces, which make discontinuous contact with a partially complete container blank. A pinch gripper can be replaced by a plurality of pinch grippers. A pinch gripper can have any configuration that allows the gripper to pinch and hold at least part of a partially complete container blank, so layers of the blank can be pressed together to prevent liquid(s) and/or vapor(s) from passing between portions of the layers that are in contact. In various alternative embodiments, any other kind of equipment component known in the art for pinching/holding flexible material can be used in place of a pinch gripper.

As the pinch gripper 720 pinches and holds, the pinch gripper 720 is aligned with certain structural features of the partially complete container blank 350-7 as described below. The pinch gripper 720 overlaps at least a right side of an upper portion of the structural support space 370-7, to close off the unsealed layers (on that side) from the environment outside of the partially complete container blank 350-7. In the embodiment of FIG. 7A, the pinch gripper 720 continuously overlays (when viewed from the FD direction) the right side of the upper portion of the structural support space 370-7 over its entire width (in the MD direction), although in various embodiments, a pinch gripper may overlap only part (or parts) of a structural support space. In alternative embodiments, one side of an upper portion of a structural support space may be permanently sealed (for example, further sealing together the first through fourth layers as part of the sealing 293-6a process of the embodiment of FIG. 2A), such that a pinch gripper is not needed to pinch and hold that side of the structural support space. The pinch gripper 720 does not overlap any of the left right side of the structural support space 370-7, so that the unsealed layers (on that side) are not closed off from the environment outside of the partially complete container blank 350-7, although in various embodiments, a pinch gripper may overlap part (or parts) of a side of a structural support space. The pinch gripper 720 also overlaps a top part of the product space 349-7, to close off the unsealed layers (in the middle) from the environment outside of the partially complete container blank 350-7. In the embodiment of FIG. 7A, the pinch gripper 720 continuously overlays (when viewed from the FD direction) the top of the product space 349-7 over its entire width (in the MD direction), although in various embodiments, a pinch gripper may overlap only part (or parts) of a product space.

Figure 7B:
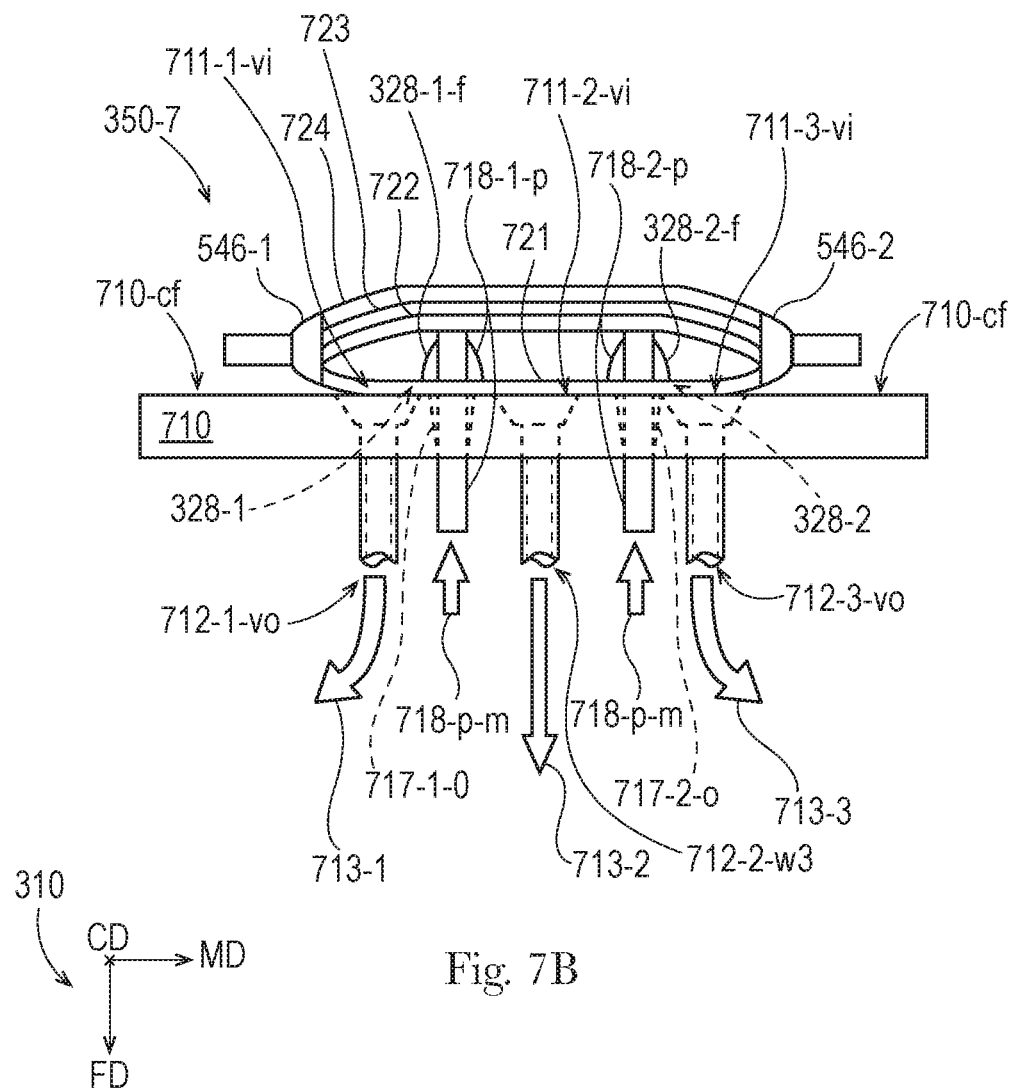
FIG. 7B illustrates a top view of the container blank from FIG. 7A, partially held by a vacuum block, and being pushed open by mechanical projections.

The pinch gripper 720 (and the pinch gripper 730 described below) can be vertically disposed at any suitable location between the top and bottom of the partially complete container blank 350-7 that allows it to close off the desired portions of the container blank 350-7 described in the preceding paragraph. For example, the pinch gripper 720 can be disposed (in the direction of arrow CD in FIG. 7D) in any of the following locations: above the parallel hidden lines representing the top gusset 343-5; between the hidden lines representing the top gusset 343-5; partially above and partially between the hidden lines representing the top gusset 343-5; or, as shown in FIG. 7D, partially below and partially between the hidden lines representing the top gusset 343-5.

The pinch gripper 720 along with the opposing gripper or surface can be incorporated into a filling unit such as the filling unit 294-1*b* of FIG. 2B, used in a filling process such as the filling 294-1*a* of FIG. 2A, or into a dosing unit such as the dosing unit 294-2*b* of FIG. 2B, used in a dosing process such as the process of adding 294-2*a* expansion material of FIG. 2B. Alternatively, some or all of these equipment components can be incorporated into one or more other unit operations after the filling unit 294-1*b* of FIG. 2B and before the dosing unit 294-2*b* of FIG. 2B.

In FIG. 7A, parts of the container blank 350-7 are held in place by the vacuum block 710. The vacuum block 710 creates a vacuum on part of an uppermost portion of the partially complete container blank 350-7. The vacuum block 710 contacts and pulls (in the positive FD direction) on the first layer 721, such that the first layer 721 is held against a contact face 710-*cf* of the vacuum block 710, as shown in FIG. 7B. The contact face 710-*cf* of the vacuum block 710 (facing in the negative FD direction) has a plurality of vacuum intakes (shown by hidden lines), including a first vacuum intake 711-1-*vi*, a second vacuum intake 711-2-*vi*, and a third vacuum intake 711-3-*vi*, disposed in a linear array in the MD direction across the contact face 710-*cf*. Each of the vacuum intakes has a corresponding vacuum outlet, which is a tube through which a negative pressure is pulled (toward a vacuum source not shown, in the positive FD direction). The first vacuum intake 711-2-*vi* is connected to a first vacuum outlet 711-1-*vo*, the second vacuum intake 711-2-*vi* is connected to a second vacuum outlet 711-2-*vo*, and the third vacuum intake 711-3-*vi* is connected to a third vacuum outlet 711-3-*vo*. As the vacuum block 710 holds the first layer 721, the vacuum block 710 continuously overlays (when viewed from the FD direction) the front top open gusset leg of the container blank 350-7 over its entire width (in the MD direction), although in various embodiments, the vacuum block 710 may overlap only part (or parts) of a front top open gusset leg. Thus, the vacuum block 710 is positioned above the structural support space 370-7 of the container blank 350-7, and also above the pinch gripper 720.

The vacuum block 710 also includes a plurality of movable mechanical projections disposed within the body of the vacuum block 710. These mechanical projections include a first reciprocating pin 718-1-*p* and a second reciprocating pin 718-2-*p*. Each of these pins reciprocates by moving out from an opening in the contact face 710-*cf* that holds one of the pins; a first pin opening 717-1-*o* is oriented in the FD direction and holds the first reciprocating pin 718-1-*p* and a second pin opening 717-2-*o* is oriented in the FD direction and holds the second reciprocating pin 718-2-*p*. The first pin opening 717-1-*o* is disposed between the first vacuum intake 711-1-*vi* and the second vacuum intake 711-2-*vi*. The second pin opening 717-2-*o* is disposed between the second vacuum intake 711-2-*vi* and the third vacuum intake 711-3-*vi*. When the container blank 350-7 is aligned with the vacuum block 710 (e.g. by registration), the reciprocating pins are aligned (in the CD and MD directions) with the cuts through the first layer 721 (formed as described in connection with the embodiment of FIG. 5); the first reciprocating pin 718-1-*p* is aligned with the first cut 328-1 (shown as hidden) and the second reciprocating pin 718-2-*p* is aligned with the second cut 328-2 (shown as hidden), as further described and illustrated in connection with FIGS. 7B and 7C.

In various embodiments, the vacuum block 710 (and/or its components) can be configured in alternate ways. A vacuum block can be configured with a different size, shape, and/or orientation. A vacuum block can have any number of vacuum intakes and any number of vacuum outlets, which may cover any part, parts, or all of a contact face of the vacuum block. A vacuum block can be replaced by one or more vacuum cups. A vacuum block can have any configuration that allows the vacuum block to pull on and hold in place at least part of an outermost layer of a partially complete container blank. In various alternative embodiments, any other kind of equipment component known in the art for pulling/holding flexible material can be used in place of a vacuum block. In various embodiments, the reciprocating pins of the vacuum block 710 can be configured in alternate ways. A vacuum block can include any number of pins, configured with different sizes, shapes, locations, and/or orientations. A reciprocating pin can be replaced by another type of mechanical projection. A mechanical projection can have any configuration that allows the projection to insert through an opening in an outermost layer of a partially complete container blank. In various alternative embodiments, any other kind of equipment component known in the art for opening/pushing through a flexible material can be used in place of a reciprocating pin.

FIG. 7B illustrates a top view of the container blank 350-7 from FIG. 7A, partially held by the vacuum block 710 and also being pushed open by the first reciprocating pin 718-1-*p* and the second reciprocating pin 718-2-*p*. The vacuum block 710 contacts and pulls (in the positive FD direction) on the first layer 721. The first vacuum intake 711-1-*vi* pulls against a left side portion of the first layer 721, with a first vacuum force 713-1 pulling through the first vacuum outlet 712-1-*vo*. The second vacuum intake 711-2-*vi* pulls against a laterally central portion of the first layer 721, with a second vacuum force 713-2 pulling through the second vacuum outlet 712-2-*vo*. The third vacuum intake 711-3-*vi* pulls against a right side portion of the first layer 721, with a third vacuum force 713-3 pulling through the third vacuum outlet 712-3-*vo*. As a result, the first layer 721 is held against a contact face 710-*cf* of the vacuum block 710.

On the left side of the partially formed container blank 350-7, the first reciprocating pin 718-1-*p* starts in a retracted position within the contact face 710-*cf* of the vacuum block 710, then moves 718-1-*p-m* in the negative FD direction outward from the first pin opening 717-1-*o*, pushes down the U-shaped first flap 328-1-*f*, inserts through the opening formed by the first cut 328-1 in the first layer 721 of flexible material, and contacts the second layer 722 of flexible material with a pushing force. Similarly, on the right side of the partially formed container blank 350-7, the second reciprocating pin 718-2-*p* starts in a retracted position within the contact face 710-*cf* of the vacuum block 710, then moves 718-2-*p-m* in the negative FD direction outward from the second pin opening 717-2-*o*, pushes down the U-shaped first flap 328-2-*f*, inserts through the opening formed by the second cut 328-2 in the first layer 721 of flexible material, and contacts the second layer 722 of flexible material with a pushing force.

As the second layer 722 is pushed by the pins, the second layer 522 pushes on the third layer 723, which pushes on the fourth layer 724, such that all three of these layers are bending outward in the negative FD direction. Since the first layer 721 is being held against the contact face 710-*cf* of the vacuum block 710 while the second, third, and fourth layers 722, 723, and 724 are being pushed away from the contact face 710-*cf*, the first layer 721 becomes separated from a portion of the second layer 722, opening the top, front gusset leg, so that a dosing unit can add expansion material(s) into the structural support space 370-7 disposed below (in the negative CD direction), as described in connection with the embodiment of FIG. 7C.

In the embodiment of FIG. 7B, the first layer 721 is being held toward the contact face 710-*cf* (in the positive FD direction), which is orthogonal to the overall orientation of the layers of the flexible materials (in the CD-MD plane) and opposite to the direction in which the other layers (722, 723, and 724) are being bent; however in various embodiments, the first layer 721 can be held toward a direction that is angled and/or curved and is not exactly orthogonal to the overall orientation of the layers and/or not entirely opposite to the direction in which the other layers are being bent. As examples, a first layer can be held toward a direction that is: within 0°-30° of the positive FD direction, within 0°-25° of the positive FD direction, within 0°-20° of the positive FD direction, within 0°-15° of the positive FD direction, within 0°-10° of the positive FD direction, or within 0°-5° of the positive FD direction. As other examples, a second, third and fourth layer can be bent toward a direction (which may be referred to as a first direction) that is: within 0°-30° of the negative FD direction, within 0°-25° of the negative FD direction, within 0°-20° of the negative FD direction, within 0°-15° of the negative FD direction, within 0°-10° of the negative FD direction, or within 0°-5° of the negative FD direction. As further examples, a first layer can be held a toward a direction that is: within 0°-30° of opposite to the direction (first direction) in which the other layers are bent, within 0°-25° of opposite to the direction in which the other layers are bent, within 0°-20° of opposite to the direction in which the other layers are bent, within 0°-15° of opposite to the direction in which the other layers are bent, within 0°-10° of opposite to the direction in which the other layers are bent, or within 0°-5° of opposite to the direction in which the other layers are bent.

In various alternative embodiments, the layers 721, 722, 723, and 724 can be separated in additional and/or alternate ways, so that a dosing unit can add expansion materials. As an example, if cuts extend through the first, second, and third layers 721, 722, and 723, then mechanical projections can insert through those layers and push against the fourth layer 724, thus separating the third layer 723 from the fourth layer. Such separation can provide an additional or alternate location for adding expansion materials.

Figure 7C:
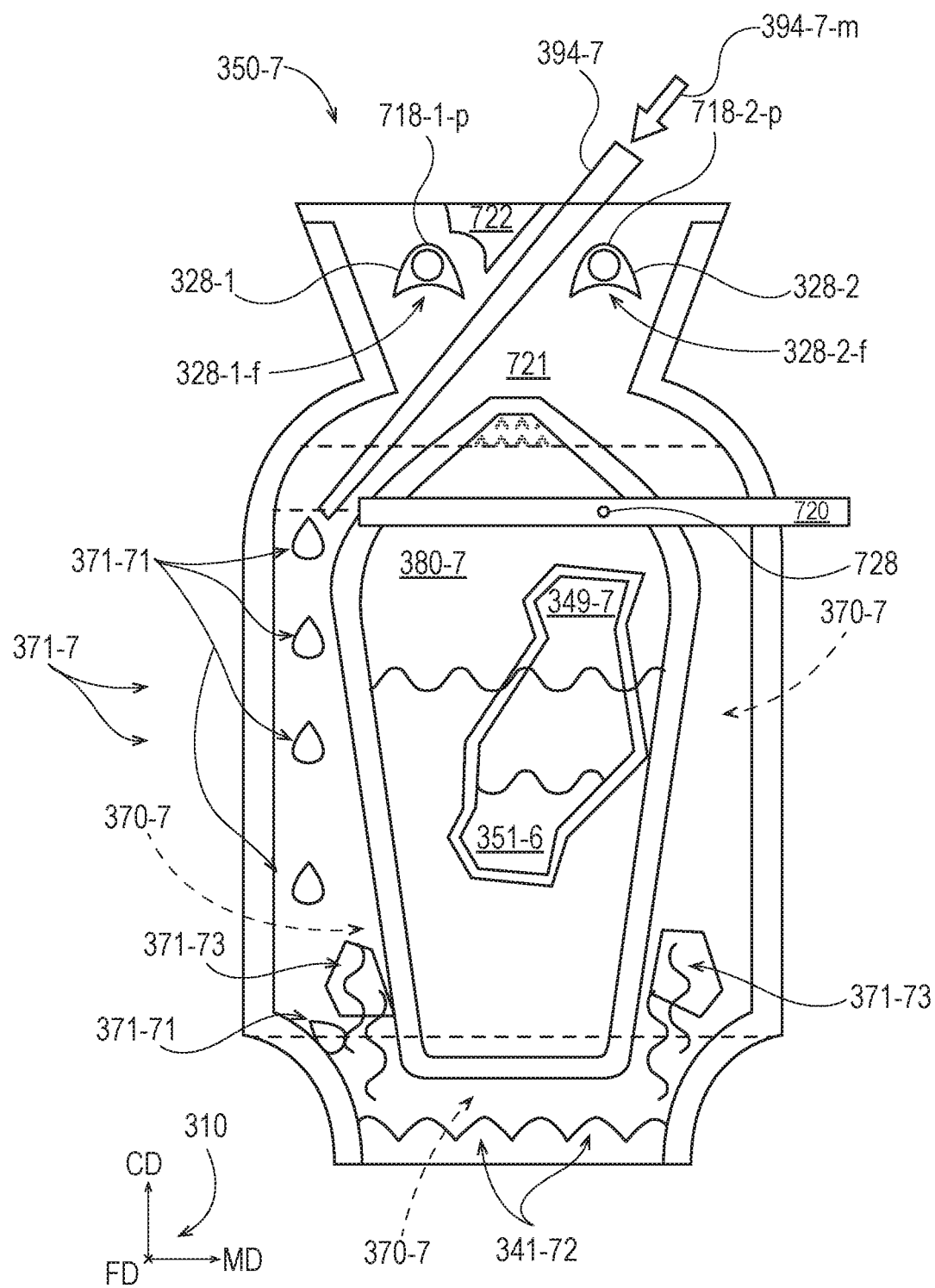
FIG. 7C illustrates a front view of the container blank from FIG. 7B, with an expansion material being added by a dispenser.
Figure 7D:
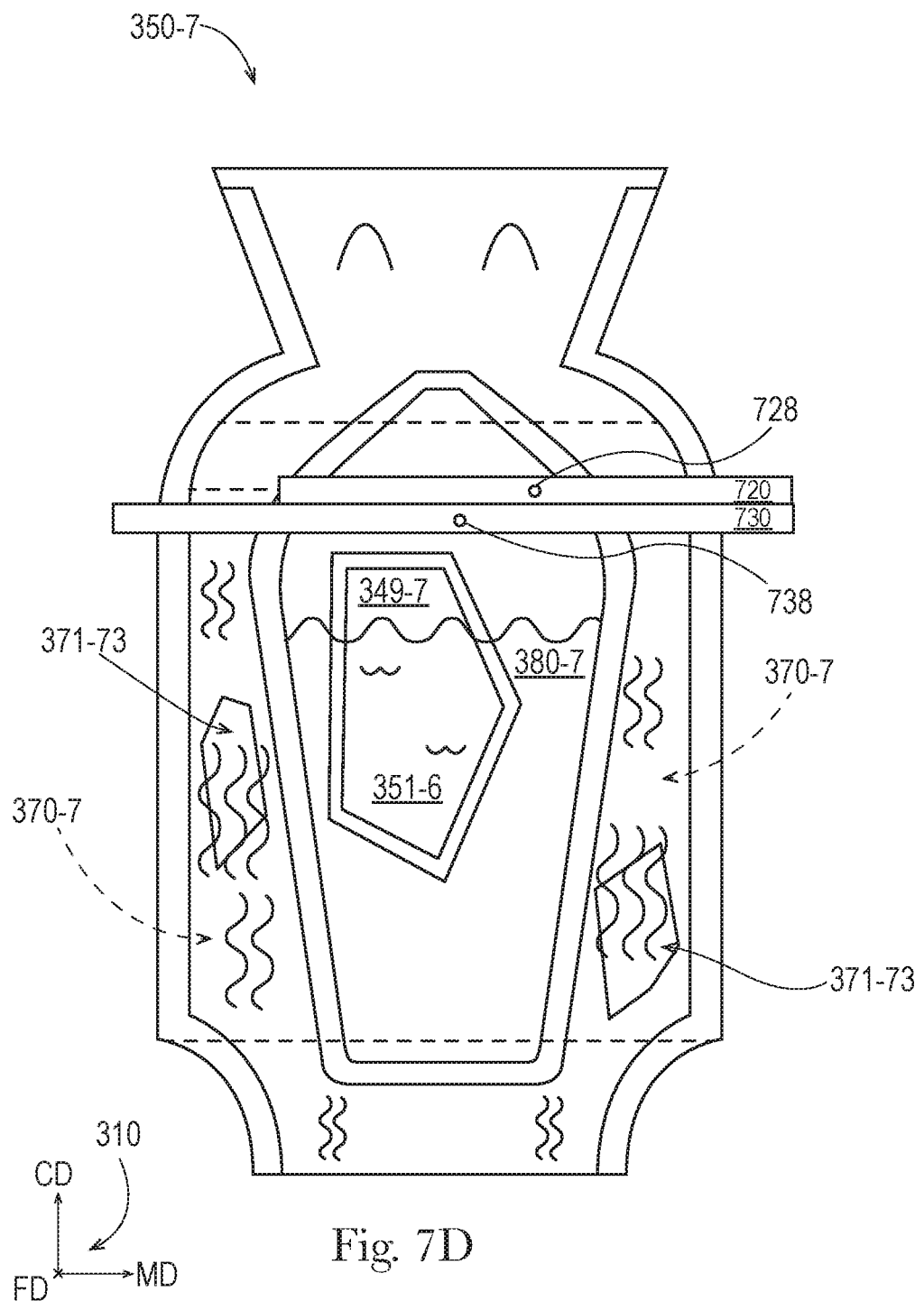
FIG. 7D illustrates a front view of the filled container blank from FIG. 7C, fully closed off by pinch grippers.

FIG. 7C illustrates a front view of the container blank 350-7 from FIG. 7B, with an expansion material being added by a dispenser 394-7. In FIG. 7C, the container blank 350-7 is the same as the container blank 350-7 of FIG. 7B, with the vacuum block 710 and the reciprocating pins 718-1-*p* and 718-2-*p* together opening the layers of flexible material in the top, front gusset leg; however, in FIG. 7C, for the purpose of clarity, the vacuum block 710 is not shown (except that the pins 718-1-*p* and 718-2-*p* are shown pushing down on the U-shaped flaps 328-1-*f* and 328-2-*f*, and inserted through the openings in the first layer 721 formed by the cuts 328-1 and 328-2).

The dispenser 394-7 has an elongated tubular shape, with an upper end attached to one or more supplies of material(s) to be dispensed (not shown) and a lower end, which is open for dispensing. In FIG. 7C, the dispenser 394-7 moves 394-7-*m* from above (in the positive CD direction) the container blank 350-7, downward at an angle (in the negative CD direction and negative MD direction). As the dispenser 394-7 approaches an upper edge of the top, front gusset leg, the dispenser may optionally dispense (e.g. blow) compressed air (or another gas, such as nitrogen) from its open end, toward the layers, in order to facilitate their further separation from each other. The dispenser 394-7 moves in direction 394-7-*m* during, or after, the bending of the second, third, and fourth layers away from the first layer past the upper edge of the top, front gusset leg, between top portions of the first layer 721 and the second layer 722, adjacent to and between the reciprocating pins 718-1-*p* and 718-2-*p*, to a position that is substantially above (in the positive CD direction) at least a portion of the structural support space 370-5; however, in alternate embodiments, one or more dispensers can be used with each dispenser positioned at various orientations, locations, and/or distances, with respect to one or more structural support spaces within a flexible container blank.

The expansion material 371-7 can be added into the partially complete container blank 350-7 between the first flexible material and the second flexible material of the open gusset leg. In various embodiments, before and/or during the positioning of a dispenser of expansion material, the dosing unit can separate the adjacent layers of the first and second flexible materials, so that the dispenser can move between those layers. The expansion material 371-7 is added as a liquid expansion material 371-71 (shown as drops), which may form a pool 371-72 within a bottom part (in the negative CD direction) of the structural support space 370-7, and which then evaporates into a vaporous expansion material 371-73. As the expansion material 371-7 evaporates, the vaporous expansion material 371-73 begins expanding the structural support volumes of the structural support space 370-7, as described in connection with the expanding 294-6a process of the embodiment of FIG. 2A.

The dosing (i.e. adding the expansion material 371-7) into the partially complete container blank 350-7, can be performed as described in connection with the adding 294-2a process of the embodiment of FIG. 2A. The dispenser 394-7 is part of a dosing unit, such as the dosing unit 294-2b, as described in connection with the embodiment of FIG. 2B.

FIG. 7D illustrates a front view of the filled container blank from FIG. 7C, with the dispenser 394-7 withdrawn after adding the expansion material, and an additional pinch gripper 730 pinching the container blank 350-7 such that the container blank 350-7 is fully closed off by the pinch gripper 730. In other embodiments, the pinch gripper 730 can begin pinching the container blank 350-7 while the expansion material is still being added. In such a case, the pinch gripper 730 can not only close off the container blank 350-7, but it can also sever the stream of expansion material being dosed. In some cases, the pinch gripper 730 can begin pinching the container blank 350-7 within 10 seconds after adding the expansion material, within 5.0 seconds after the adding the expansion material, within 3.0 seconds after the adding the expansion material, within 1.0 second after the adding the expansion material, within 0.5 seconds after the adding the expansion material, or even within 0.1 seconds after the adding the expansion material. In other cases, the pinch gripper 730 can begin pinching the container blank 350-7 significantly longer periods after adding the expansion material. When it is said that the pinch gripper 730 can begin pinching the container blank 350-7 within certain time periods after adding the expansion material, such time periods will typically begin after adding an effective amount of expansion material. An "effective amount" of expansion material is an amount of expansion material that will adequately inflate the structural support frame 140.

In FIG. 7D, the pinch gripper 720 remains in place, as described above, while the pinch gripper 730 pinches and holds all across an upper portion of the partially complete container blank 350-7, by contacting and pressing (in the negative FD direction) on a portion of a front of the container blank 350-7, while a corresponding portion on a back of the container blank 350-7 is supported by an opposing surface and/or by an opposing pinch gripper (not shown). The pinch gripper 730 may be configured in generally the same way as the pinch gripper 720, with a support rod 738 rigidly connected to a back of the pinch gripper 730, except that the pinch gripper 730 is slightly longer (in the MD direction) than the pinch gripper 720, and aligns to a different location on the container blank 350-7. In addition, as shown in FIG. 8C, it may be desirable for the gripping surface 730A of the pinch gripper 730 to have a recess 730R therein. The recess 730R forms a gap G with the surface of partially complete container blank 350-7 with which the gripping surface 730A of the pinch gripper 730 comes into contact. The pinching by the pinch gripper 730 presses together all of the layers of the flexible material(s) that form the container blank 350-7, such that liquid(s) and/or vapor(s) cannot pass between the portions of the layers that are in contact with each other from the pressing, unless allowed to do so by the recess 730R. The pinching effectively closes off a top part of the left side of the structural support space 370-7. Thus, the pinching can prevent the escape of a vaporous expansion material through that closed off part. As a result, after the expansion material is added and the pinching begins, vaporous expansion material is not lost, before the structural support space 370-7 can be permanently sealed, as described in connection with FIGS. 8A and 8B. Providing the recess 730R in the gripping surface 730A of the pinch gripper may be useful in allowing the first space with fluent product therein to vent before the product space 350 is sealed. If the product space 350 has excess air trapped therein when the expansion material is added, this may cause difficulties in sealing the container. Such difficulties include: difficulties in forming the seal, deflation of the container due to improperly formed seals; and/or a tendency for air or product to squirt out of the container in an undesirable or uncontrolled manner. The recess in the gripping surface of the pinch gripper 730 also helps ensure that the filled container has a desired "full" (of fluent product) appearance. In the embodiment of FIG. 7D, the pinch gripper 730 is disposed immediately below the pinch gripper 720, although in various embodiments the pinch gripper 730 may be disposed above the pinch gripper 720, or alternatively be made to a smaller size and disposed immediately adjacent (in the negative MD direction) to the pinch gripper 720. In other embodiments, the pinch gripper 720 may be eliminated, and pinch gripper 730 may be divided into two or more parts. Such parts may have any of the features described herein. Such parts may be in any of the positional relationships described herein for the pinch gripper(s) including, but not limited to immediately adjacent to each other. For example, in the embodiment shown in FIG. 8C, the pinch gripper 730 may be divided into two parts along a line that is perpendicular to the face of the pinch gripper 730 and passes to the right of the recess 730R in the gripping surface 730A. Such a split gripper embodiment may allow the expansion material (e.g., liquid nitrogen) into the expansion chamber on the right half of split (that is, before the right half of the split gripper engages the container blank), while venting (e.g., letting air out of) product chamber though gap G, while minimizing product flow, if any, through gap G, all while holding the container blank with the left side of such a split gripper 730.

Figure 7E:
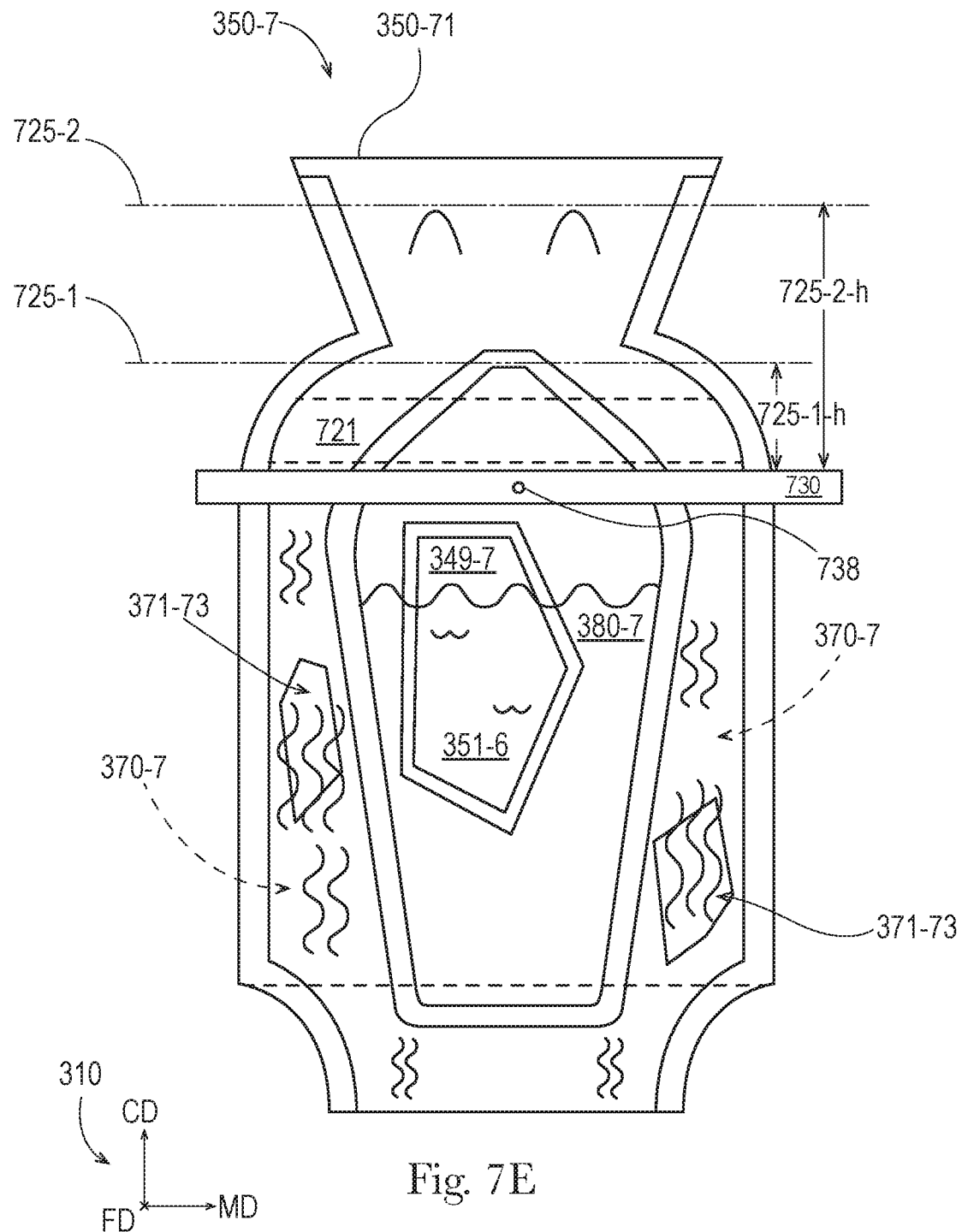
FIG. 7E illustrates a front view of the filled container blank from FIG. 7D, fully closed off by a pinch gripper.

FIG. 7E illustrates a front view of the filled container blank 350-7 in the same condition as in FIG. 7D, except that the pinch gripper 720 has been removed. As the pinch gripper 730 pinches and holds the container blank 350-7, a contact area forms, between the adjacent layers, including between the first layer and the second layer, directly behind (in the negative FD direction) the outer periphery of the portion of the pinch gripper 730 that is contacting the container blank 350-7. In addition to pinching, the pinch gripper 730 also at least assists in holding the flexible materials of the container blank 350-7 in a flat condition, which enables subsequent cutting and sealing, as described in connection with FIGS. 8A and 8B.

FIG. 7E illustrates two reference lines, above (in the positive CD direction) from the pinch gripper 730 (and the contact area beneath the pinch gripper 730). A first reference line 725-1 is oriented in the MD direction and is disposed at a first offset distance 725-1-*h* that is 25 millimeters above the uppermost extent of the contact area. A second reference line 725-2 is also oriented in the MD direction and is disposed at a second offset distance 725-2-*h* that is 50 millimeters above the uppermost extent of the contact area.

In various embodiments, the pinch gripper 730 holds the container blank 350-7 such that a portion of the container blank 350-7 between the uppermost extent of the contact area and the first reference line 725-1 (all across the container blank 350-7 in the MD direction) is about flat, approximately flat, substantially flat, or even nearly flat, as defined herein. In various embodiments, the pinch gripper 730 holds the container blank 350-7 such that a portion of the container blank 350-7 between the uppermost extent of the contact area and the second reference line 725-2 (all across the container blank 350-7 in the MD direction) is about flat, approximately flat, substantially flat, or even nearly flat, as defined herein. In various embodiments, the pinch gripper 730 holds the container blank 350-7 such that a portion of the container blank 350-7 between the uppermost extent of the contact area and the top edge 350-71 of the container blank 350-7 (all across the container blank 350-7 in the MD direction) is about flat, approximately flat, substantially flat, or even nearly flat, as defined herein.

The pinch gripper 730 can press together the layers of flexible materials of the container blank 350-7 while a liquid expansion material is changing phase from a liquid to a gas. In various embodiments, while the pinch gripper 730 is pinching the container blank 350-7 and pressing together the layers of flexible materials, at least 50% of the expansion material can change phase from a liquid to a gas, at least 75% of the expansion material can change phase from a liquid to a gas, or 100% of the expansion material can change phase from a liquid to a gas, during the pressing.

The pinch gripper 730 can, by itself or with other machine components, hold the container blank 350-7 while the container blank is cut, sealed, and/or scored, as described in connection with the embodiments of FIGS. 8A and 8B.

Figure 8A:
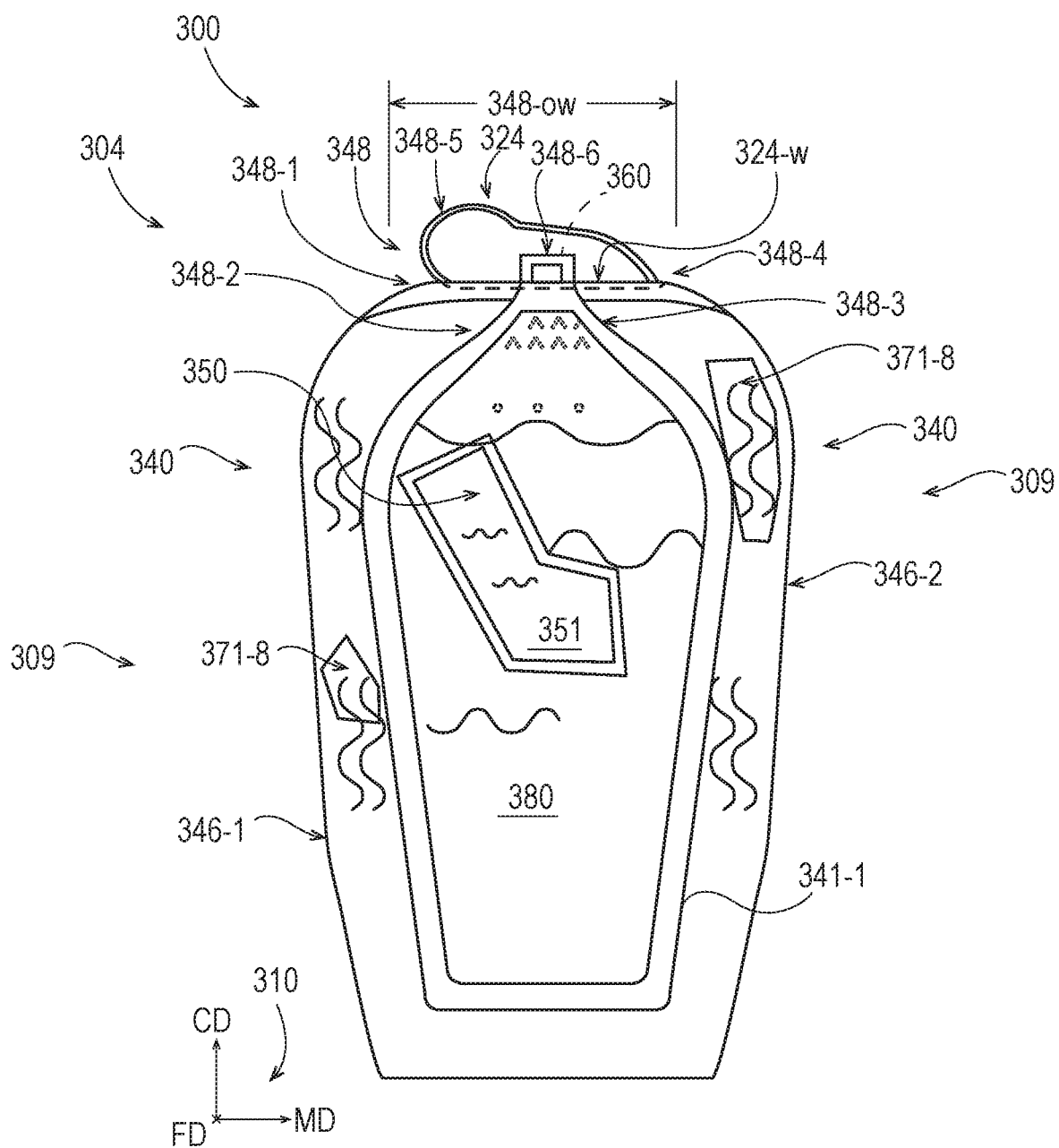
FIG. 8A illustrates a front view of the container blank from FIG. 7, which is further sealed, shaped, scored, and expanded to form a filled flexible container.

FIG. 8A illustrates a partially broken, front view of a further processed version of the partially complete container blank 350-7 from FIG. 7E, which is further sealed, shaped, scored, and optionally further expanded, as described below, to form a filled flexible container 300, with a product space 350 that is filled with a fluent product 351, wherein the filled product space 350 is supported by a structural support frame 340 made from a plurality of structural support volumes that are expanded by an expansion material 371-8, and which at least partially surround a front panel 380. For the purpose of clarity, in FIG. 8A portions of the flexible materials are illustrated as transparent. In various embodiments, the container blank 350-7 can be processed, as described below, using a registration system based on the location of the pinch gripper 730 from the embodiment of FIGS. 7A-7E and/or by using one or more registration marks on the container blank 350-7.

The further sealing includes sealing the partially complete container blank 350-7 with a third seal 348, which is the final seal, as described in connection with the sealing 294-3a process of the embodiment of FIG. 2A. The shaping includes shaping a top 304 (disposed in the positive CD direction) of the finally sealed, partially complete container blank, by removing final excess portions of the flexible materials, as described in connection with the shaping 294-4a process of the embodiment of FIG. 2A. The scoring includes forming a line of weakness 324-w in the top 304 of the finally sealed, partially complete container blank, as described in connection with the forming 294-5a process of the embodiment of FIG. 2A. The expanding includes expanding the expansion material 371-7 that was added into the partially complete container blank 350-7, as described in connection with the expanding 294-6a process of the embodiment of FIG. 2A.

The third seal 348 is primarily disposed in a front (open) gusset leg in the top 304 of the flexible container 300, through four layers of the flexible materials (i.e. one layer of the flexible outer sheet, two layers of the flexible inner sheet, and one layer of the flexible outer sheet), and connecting and/or overlapping with other seals. The third seal 348 includes a first portion 348-1, a second portion 348-2, a third portion 348-3, a fourth portion 348-4, a fifth portion 348-5, and a sixth portion 348-6. The third seal 348 has an overall width 348-ow. Details of the third seal 348 are described in connection with FIG. 8B.

The outer extent of the top 304 of the flexible container 300, including a tear tab 324, is formed by the shaping, which cuts through all of the layers of the flexible materials and connects with the upper portions of the outer extents of sides 309, which were formed by the singulating. The shaping can also include cutting through part, parts, or all of one or more portions of the third seal 348. As an example, the shaping can include cutting through and trimming away outer portions of the fifth portion 348-5 of the third seal 348, such that the outer edge of the tear tab 324 is a clean, sealed edge. The tear tab 324 is configured in the same way as the tear tab 124 in the embodiment of FIGS. 1A-1G. The line of weakness 324-w extends laterally (in the MD direction) across the top 304, below (in the negative CD direction) the tear tab 324, over the dispenser 360, and above (in the positive CD direction) the product space 350; the line of weakness 324-w is configured in the same way as the line of weakness 124-w in the embodiment of FIGS. 1A-1G. The expanded structural support volumes of the structural support frame 340 are fully sealed-off spaces, in which all of the expansion material 371-8 is fully expanded into vapor form at its final pressure; the structural support frame 340 is configured in the same way as the structural support frame 140 in the embodiment of FIGS. 1A-1G.

Figure 8B:
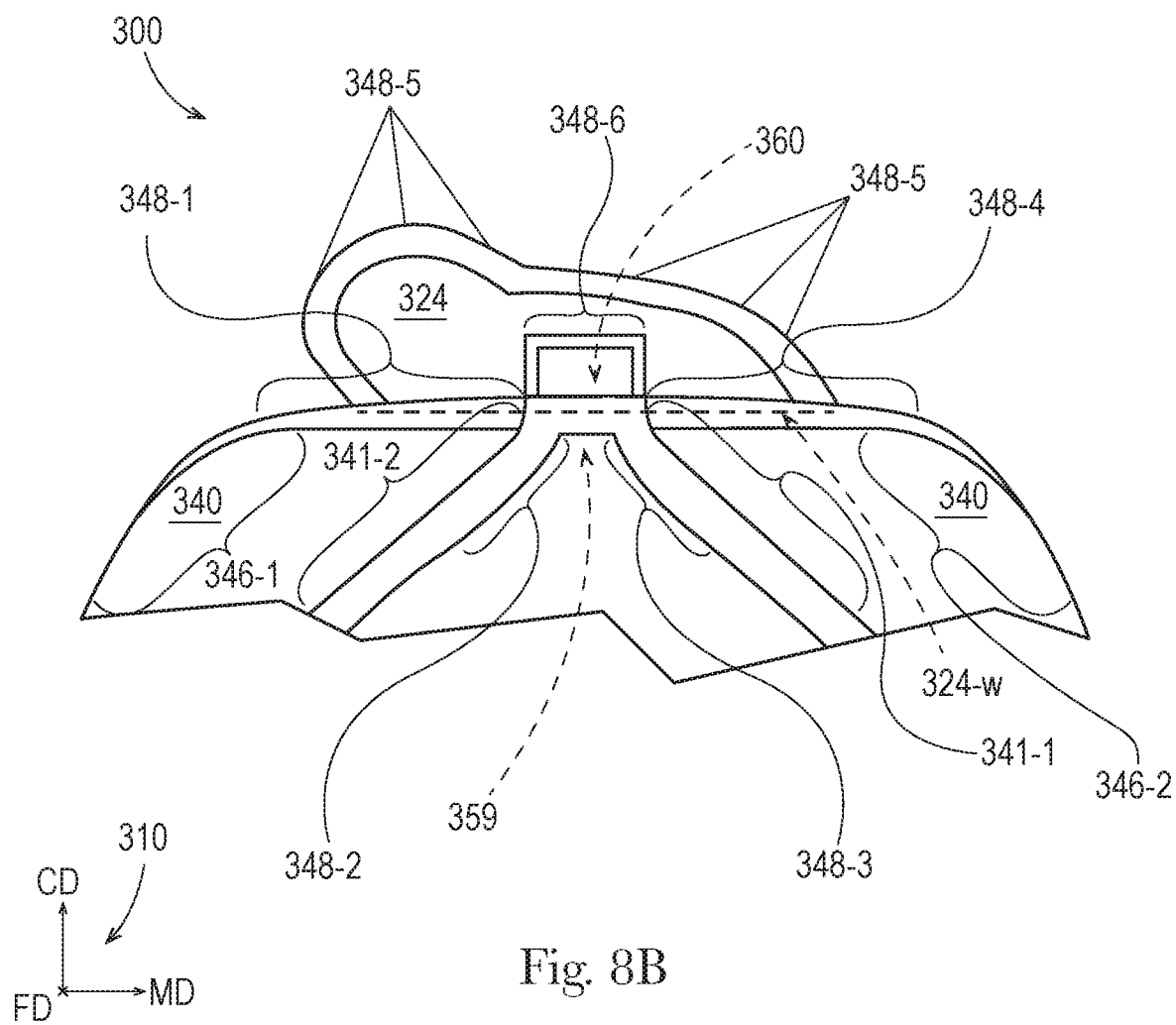
FIG. 8B illustrates an enlarged front view of a top portion of the container of FIG. 8A.
Figure 8C:
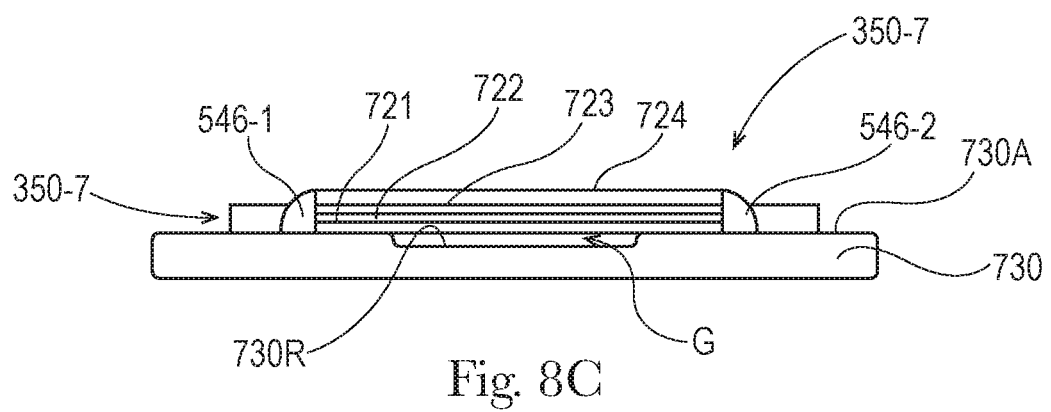
FIG. 8C is a schematic top view of the portion of the container blank from FIG. 7E that is adjacent to the pinch gripper, showing the configuration of the surface of the additional (or only) pinch gripper.

FIG. 8B illustrates an enlarged front view of a top portion of the container of FIG. 8A, with some details omitted, for the sake of clarity. The third seal 348 extends continuously to each of the following connections: the first portion 348-1 extends from an inner end outward (in the negative MD direction) to partially overlap and connect with a laterally inward upper extent of the first portion 346-1 of the second seal (on the left); the second portion 348-2 connects to the inner end of the first portion 348-1 and extends at an angle, downward and outward (in the negative MD direction and the negative CD direction), to partially overlap and connect with an upper left-side portion of the first portion 341-1 of the first seal; the third portion 348-3 connects to an inner end of a fourth portion 348-4 and extends at an angle, downward and outward (in the positive MD direction and the negative CD direction), to partially overlap and connect with an upper right-side portion of the first portion 341-1 of the first seal; the fourth portion 348-4, extends from its inner end outward (in the positive MD direction) to partially overlap and connect with a laterally inward upper extent of the second portion 346-2 of the second seal (on the right); the fifth portion 348-5 connects to the first portion 348-1 and extends upward and outward (in the positive CD direction and negative MD direction), then curves across (generally in the positive MD direction), then extends downward (in the negative CD direction and positive MD direction) to connect with the fourth portion 348-4, such that the fifth portion 348-5 is disposed around an upper portion of a periphery of the tear tab 324; the sixth portion 348-6 connects to and extends upward (in the positive CD direction) from an upper extent of the second portion 348-2, then extends across (in the positive MD direction), and then extends downward (in the negative CD direction) and connects to an upper extent of the third portion 348-3. The third seal 348 closes off about all of the front, top open gusset leg, except that the third seal 348 is sized and shaped to leave an unsealed gap (between the inward ends of the first portion 348-1 and the fourth portion 348-4), along a laterally central portion of the open gusset leg where the adjacent layers of the first flexible material (i.e. the flexible inner sheet) are not sealed together.

Each portion of the third seal 348 can overlap with a portion of another seal by various amounts. As examples, seals can overlap by 2-50 millimeters, or by any integer value for millimeters between 2 and 50, or within any range formed by any of these preceding values, such as: 2-20 millimeters, 3-15 millimeters, 4-10 millimeters, 5-40 millimeters, 10-30 millimeters, 10-50 millimeters, 20-50 millimeters, 30-50 millimeters, etc. As further examples, seals can overlap by a multiple of the width of the narrower seal, such as an overlap of 1-25 times the width, 1-10 times the width, 1-5 times the width, or 1-2 times the width.

Together, the first portion 348-1 and the second portion 348-2 of the third seal 348, hermetically seal off, define, and thus form an upper portion of a structural support volume on a left side in the structural support frame 340 of the flexible container 300. Together, the third portion 348-3 and the fourth portion 348-4 of the third seal 348, hermetically seal off, define, and thus form an upper portion of a structural support volume on a right side in the structural support frame 340 of the flexible container 300. In various embodiments, portions of a third seal may form relatively more or relatively less of the outer extent of one or more structural support volumes of a structural support frame.

Together, the second portion 348-2 and the third portion 348-3 of the third seal 348, seal off, define, and respectively form left and right sides of a flow channel 359. The flow channel 359 is formed between these portions of the third seal 348 and between the layers of the first flexible material (i.e. the flexible inner sheet). A bottom (inward) part of the flow channel 359 is in fluid communication with the product space 350 of the container 300. A top (outward) part of the flow channel 359 ends at the unsealed gap, which forms the dispenser 360 of the container 300, when the container 300 is unsealed (by removing the tear tab 324). Thus, the flow channel 359 can provide fluid communication between the product space 350 and the environment outside of the container 300. In various embodiments, portions of a third seal may form part, parts, or all of a flow channel.

Together, the fifth portion 348-5 along with part of the first portion 348-1, and part of the fourth portion define substantially all of a tab seal disposed around the periphery of the tear tab 324. In various embodiments, the fifth portion 348-5 may extend continuously over part, parts, or all of the tear tab 324. In other embodiments, part, parts, or all of a fifth portion of a third seal may be omitted; however, such an omission may allow separation between part, parts, or all of one or more of the layers of flexible material that form the tear tab, which may create an undesirable appearance to consumers.

The sixth portion 348-6 of the third seal 348 forms a cap seal that hermetically seals off the product space 350 by fully bounding the unsealed gap, from its left side to its right side. Since the sixth portion 348-6 is offset from the line of weakness 324-w, the cap seal extends partway into the tear tab 324. In various embodiments, a cap seal may extend into a tear tab by various degrees. In other embodiments, part, parts, or all of a sixth portion of a third seal may be omitted; however, such an omission may allow small amounts of fluent product from the product space to move farther within the tear tab and leak out upon its removal, which may lead to undesirable contact with the end users hands/fingers.

Part, parts, or all of any of the structures of the flexible container 300 can be configured in the same way as the corresponding structure(s) of any embodiment of the flexible container of FIGS. 1A-1G (including any alternative embodiment disclosed herein). Any of the elements of the flexible container 300 can be configured in the same way as the like-numbered element in the embodiment of FIGS. 1A-1G (including any alternative embodiment disclosed herein).

Thus, the filled flexible container 300 is a product that is ready for packaging, supply, and use, as described herein.

Embodiments of the present disclosure can use any and all embodiments of materials, structures, and/or features for flexible containers, as well as any and all methods of making and/or using such flexible containers, as disclosed in the following patent documents: U.S. Pat. No. 5,137,154, filed Oct. 29, 1991, entitled "Food bag structure having pressurized compartments" in the name of Cohen, granted Aug. 11, 1992; PCT international patent application WO 96/01775 filed Jul. 5, 1995, published Jan. 26, 1995, entitled "Packaging Pouch with Stiffening Air Channels" in the name of Prats (applicant Danapak Holding A/S); PCT international patent application WO 98/01354 filed Jul. 8, 1997, published Jan. 15, 1998, entitled "A Packaging Container and a Method of its Manufacture" in the name of Naslund; U.S. Pat. No. 5,960,975 filed Mar. 19, 1997, entitled "Packaging material web for a self-supporting packaging container wall, and packaging containers made from the web" in the name of Lennartsson (applicant Tetra Laval), granted Oct. 5, 1999; U.S. Pat. No. 6,244,466 filed Jul. 8, 1997, entitled "Packaging Container and a Method of its Manufacture" in the name of Naslund, granted Jun. 12, 2001; PCT international patent application WO 02/085729 filed Apr. 19, 2002, published Oct. 31, 2002, entitled "Container" in the name of Rosen (applicant Eco Lean Research and Development A/S); Japanese patent JP4736364 filed Jul. 20, 2004, published Jul. 27, 2011, entitled "Independent Sack" in the name of Masaki (applicant Toppan Printing); PCT international patent application WO2005/063589 filed Nov. 3, 2004, published 14 Jul. 2005, entitled "Container of Flexible Material" in the name of Figols Gamiz (applicant Volpak, S. A.); German patent application DE202005016704 U1 filed Jan. 17, 2005, entitled "Closed bag for receiving liquids, bulk material or objects comprises a bag wall with taut filled cushions or bulges which reinforce the wall to stabilize it" in the name of Heukamp (applicant Menshen), laid open as publication DE102005002301; Japanese patent application 2008JP-0024845 filed Feb. 5, 2008, entitled "Self-standing Bag" in the name of Shinya (applicant Toppan Printing), laid open as publication JP2009184690; U.S. patent application Ser. No. 10/312,176 filed Apr. 19, 2002, entitled "Container" in the name of Rosen, published as US20040035865; U.S. Pat. No. 7,585,528 filed Dec. 16, 2002, entitled "Package having an inflated frame" in the name of Ferri, et al., granted on Sep. 8, 2009; U.S. patent application Ser. No. 12/794,286 filed Jun. 4, 2010, entitled "Flexible to Rigid Packaging Article and Method of Use and Manufacture" in the name of Helou (applicant, published as US20100308062; U.S. Pat. No. 8,540,094 filed Jun. 21, 2010, entitled "Collapsible Bottle, Method Of Manufacturing a Blank For Such Bottle and Beverage-Filled Bottle Dispensing System" in the name of Reidl, granted on Sep. 24, 2013; and/or PCT international patent application WO 2013/124201 filed Feb. 14, 2013, published Aug. 29, 2013, entitled "Pouch and Method of Manufacturing the Same" in the name of Rizzi (applicant Cryovac, Inc.).

Part, parts, or all of any of the embodiments disclosed herein also can be combined with part, parts, or all of other embodiments known in the art of containers for fluent products, so long as those embodiments can be applied to flexible containers, as disclosed herein.

Any of the embodiments of flexible containers, described herein, can be modified to take on a different overall form, including forms having a different overall shape and/or a different number of panels, as described in connection with the embodiments disclosed in U.S. patent application Ser. No. 13/888,679 filed May 7, 2013, entitled "Flexible Containers," published as US 20130292353.

In various embodiments, any of the embodiments of flexible containers, described herein, can be used to create a line-up of flexible containers, as described in any of the following: U.S. patent application Ser. No. 14/973,822, filed Dec. 18, 2015, entitled "Flexible Containers with Easily Variable Sizing," published as US20160176578; U.S. patent application Ser. No. 14/973,827, filed Dec. 18, 2015, entitled "Flexible Containers with Easily Variable Sizing," published as US20160176578; U.S. patent application Ser. No. 14/973,835, filed Dec. 18, 2015, entitled "Flexible Containers with Easily Variable Sizing," published as US20160176583; U.S. patent application Ser. No. 14/973,838, filed Dec. 18, 2015, entitled "Flexible Containers with Easily Variable Sizing," published as US20160176597; U.S. patent application Ser. No. 14/973,852, filed Dec. 18, 2015, entitled "Flexible Containers with Easily Variable Sizing," published as US20160176584; in any workable combination.

The packages described herein, may be used across a variety of industries for a variety of products. For example, any embodiment of a package, as described herein may be used for receiving, containing, storing, and/or dispensing any fluent product in the consumer products industry, including any of the following products, any of which can take any product form described herein or known in the art: baby care products (e.g. soaps, shampoos, and lotions); beauty care products for cleaning, treating, beautifying, and/or decorating human hair (e.g. hair shampoos, hair conditioners, hair dyes, hair colorants, hair repair products, hair growth products, hair removal products, hair minimization products, etc.); beauty care products for cleaning, treating, beautifying, and/or decorating human skin (e.g. soaps, body washes, body scrubs, facial cleansers, astringents, sunscreens, sun block lotions, lip balms, cosmetics, skin conditioners, cold creams, skin moisturizers, antiperspirants, deodorants, etc.); beauty care products for cleaning, treating, beautifying, and/or decorating human nails (e.g. nail polishes, nail polish removers, etc.); grooming products for cleaning, treating, beautifying, and/or decorating human facial hair (e.g. shaving products, pre-shaving products, after shaving products, etc.); health care products for cleaning, treating, beautifying, and/or decorating human oral cavities (e.g. toothpaste, mouthwash, breath freshening products, anti-plaque products, tooth whitening products, etc.); health care products for treating human health conditions (e.g. medicines, medicaments, pharmaceuticals, vitamins, nutraceuticals, nutrient supplements (for calcium, fiber, etc.), cough treatment products, cold remedies, lozenges, treatments for respiratory and/or allergy conditions, pain relievers, sleep aids, gastrointestinal treatment products (for heartburn, upset stomach, diarrhea, irritable bowel syndrome, etc.), purified water, treated water, etc.); fabric care products for cleaning, conditioning, refreshing and/or treating fabrics, clothes, and/or laundry (e.g. laundry detergents, fabric conditioners, fabric dyes, fabric bleaches, etc.); dish care products for home, commercial, and/or industrial use (e.g. dish soaps and rinse aids for hand-washing and/or machine washing); cleaning and/or deodorizing products for home, commercial, and/or industrial use (e.g. soft surface cleaners, hard surface cleaners, glass cleaners, ceramic tile cleaners, carpet cleaners, wood cleaners, multi-surface cleaners, surface disinfectants, kitchen cleaners, bath cleaners (e.g. sink, toilet, tub, and/or shower cleaners), appliance cleaning products, appliance treatment products, car cleaning products, car deodorizing products, air cleaners, air deodorizers, air disinfectants, etc.), and the like.

Although the present disclosure describes its embodiments with respect to consumer products, they can also be similarly applied outside of the consumer products industry, including: the areas of home, commercial, agricultural, and/or industrial, building and/or grounds, construction and/or maintenance; the food and beverage industry; the medical industry, in the areas of medicines, medical devices, and medical treatment; and all industries that use internal combustion engines (such as the transportation industry, and the power equipment industry, the power generation industry, etc.).

Although the present disclosure describes its embodiments with respect to fluent products, in various embodiments, the flexible containers described herein can be modified to receive, contain, and/or dispense individual articles or separately packaged portions of a product.

Definitions

As used herein, the term "about" modifies a particular value, by referring to a range equal to the particular value, plus or minus twenty percent (+/−20%). The term "about" can also be used to modify a particular condition, by referring to a range of conditions that are within twenty percent (+/−20%) of the particular condition. For any of the embodiments of flexible containers, disclosed herein, any disclosure of a particular value or condition is also intended to be a disclosure of various alternative embodiments of that flexible container, with the value or condition being variable within the range of about (i.e. within 20%).

As used herein, when the term "about" refers to the flatness of one or more flexible materials, the phrase "about flat" means that the flexible material fits between two parallel planes set apart by a separation distance that is equal to the average overall thickness of the material plus 5.0 millimeters.

As used herein, the term "approximately" modifies a particular value, by referring to a range equal to the particular value, plus or minus fifteen percent (+/−15%). The term "approximately" can also be used to modify a particular condition, by referring to a range of conditions that are within fifteen percent (+/−15%) of the particular condition. For any of the embodiments of flexible containers, disclosed herein, any disclosure of a particular value or condition is also intended to be a disclosure of various alternative embodiments of that flexible container, with the value or condition being variable within the range of approximately (i.e. within 15%).

As used herein, when the term "approximately" refers to the flatness of one or more flexible materials, the phrase "approximately flat" means that the flexible material fits between two parallel planes set apart by a separation distance that is equal to the average overall thickness of the material plus 3.0 millimeters.

As used herein, the term "atmospheric pressure" refers to an absolute pressure of 1 atmosphere.

As used herein, when referring to a flexible container, the term "bottom" refers to the portion of the container that is located in the lowermost 30% of the overall height of the container, that is, from 0-30% of the overall height of the container. As used herein, the term bottom can be further limited by modifying the term bottom with a particular percentage value, which is less than 30%. For any of the embodiments of flexible containers, disclosed herein, a reference to the bottom of the container can, in various alternative embodiments, refer to the bottom 25% (i.e. from 0-25% of the overall height), the bottom 20% (i.e. from 0-20% of the overall height), the bottom 15% (i.e. from 0-15% of the overall height), the bottom 10% (i.e. from 0-10% of the overall height), or the bottom 5% (i.e. from 0-5% of the overall height), or any integer value for percentage from 0% to 30%.

As used herein, the term "directly connected" refers to a configuration wherein elements are attached to each other without any intermediate elements therebetween, except for any means of attachment (e.g. adhesive).

As used herein, when referring to a flexible container, the term "dispenser" refers to a structure configured to dispense fluent product(s) from a product space and/or from a mixing space to the environment outside of the container. For any of the flexible containers disclosed herein, any dispenser can be configured in any way disclosed herein or known in the art, including any suitable type, location, number, size, shape, and flow rate. For example, a dispenser can be a push-pull type dispenser, a dispenser with a flip-top cap, a dispenser with a screw-on cap, a rotatable type dispenser, a dispenser with a cap, a pump type dispenser, a pump spray type dispenser, a trigger spray type dispenser, a straw dispenser, a flip up straw dispenser, a straw dispenser with bite valve, a dosing dispenser, etc. In various embodiments, a dispenser can be configured according to any of the embodiments for dispensers disclosed in U.S. patent application Ser. No. 13/888,679 filed May 7, 2013, entitled "Flexible Containers," published as US 20130292353. A dispenser can be a parallel dispenser, providing multiple flow channels in fluid communication with multiple product spaces, wherein those flow channels remain separate until the point of dispensing, thus allowing fluent products from multiple product spaces to be dispensed as separate fluent products, dispensed together at the same time. In various embodiments, any dispenser or any number of dispensers in a flexible container can be configured according to any of the embodiments for dispensers disclosed in U.S. patent application Ser. No. 13/889,000 filed May 7, 2013, entitled "Flexible Containers with Multiple Product Volumes," published as US20130292413. A dispenser can be a mixing dispenser, providing one or more flow channels in fluid communication with multiple product spaces, with multiple flow channels combined before the point of dispensing, thus allowing fluent products from multiple product spaces to be dispensed as the fluent products mixed together. As another example, a dispenser can be formed by a frangible opening (e.g. an opening designed to be broken open). As further examples, a dispenser can utilize one or more valves and/or dispensing mechanisms disclosed in the art, such as those disclosed in: U.S. patent application Ser. No. 15/148,395 filed May 6, 2016 entitled "Methods of Forming Flexible Containers with Gussets"; published US patent application 2003/0096068, entitled "One-way valve for inflatable package"; U.S. Pat. No. 4,988,016 entitled "Self-sealing container"; and U.S. Pat. No. 7,207,717, entitled "Package having a fluid actuated closure." Still further, a dispenser can be configured according to any of the embodiments for flexible valves disclosed in U.S. patent application Ser. No. 14/534,203 filed Nov. 6, 2014, entitled "Flexible Containers Having Flexible Valves," published as US20150122840. Yet further, any of the dispensers disclosed herein, may be incorporated into a flexible container either directly (e.g. formed by one or more flexible materials that are integral with the flexible container), or in combination with one or more other rigid materials or structures (such as a fitment), or in any way known in the art. In some alternative embodiments, dispensers disclosed herein can be configured for both dispensing and filling, to allow filling of product space(s) through one or more dispensers. In other alternative embodiments, a product space can include one or more filling structure(s) (e.g. for adding water to a mixing space) in addition to or instead of one or more dispenser(s). Any location for a dispenser, disclosed herein can alternatively be used as a location for a filling structure. In some embodiments, a product space can include one or more filling structures in addition to any dispenser(s). And, any location for a dispenser, disclosed herein can alternatively be used as a location for an opening, through which product can be filled and/or dispensed, wherein the opening may be reclosable or non-reclosable, and can be configured in any way known in the art of packaging. For example, an opening can be: a line of weakness, which can be torn open; a zipper seal, which can be pulled open and pressed closed (e.g. a press seal), or opened and closed with a slider; openings with adhesive-based closures; openings with cohesive-based closures; openings with closures having mechanical fasteners (e.g. snaps, buckles, straps, tin-ties, etc.), openings with closures having micro-sized fasteners (e.g. with opposing arrays of interlocking fastening elements, such as hook, loops, and/or other mating elements, etc.), and any other kind of opening for packages or containers, with or without a closure, known in the art.

As used herein, when referring to a flexible container, the term "disposable" refers to a container which, after dispensing a product to an end user, is not configured to be refilled with an additional amount of the product, but is configured to be disposed of (i.e. as waste, compost, and/or recyclable material(s)). Part, parts, or all of any of the embodiments of flexible containers, disclosed herein, can be configured to be disposable.

As used herein, when referring to a flexible container, the term "durable" refers to a container that is reusable more than non-durable containers.

As used herein, when referring to a flexible container, the term "expanded" refers to the state of one or more flexible materials that are configured to be formed into a structural support volume, after the structural support volume is made stiff by one or more expansion materials. An expanded structural support volume has an overall width that is significantly greater than the combined thickness of its one or more flexible materials, before the structural support volume is filled with the one or more expansion materials. Examples of expansion materials include liquids (e.g. water), gases (e.g. compressed air), fluent products, foams (that can expand after being added into a structural support volume), co-reactive materials (that produce gases), or phase change materials (that can be added in solid or liquid form, but which turn into a gas; for example, liquid nitrogen or dry ice), or other suitable materials known in the art, or combinations of any of these (e.g. a fluent product and liquid nitrogen). In various embodiments, expansion materials can be added at atmospheric pressure, or added under pressure greater than atmospheric pressure, or added to provide a material change that increases pressure to something above atmospheric pressure. For example, a structural support volume can be expanded by an expansion material at a pressure of 2-20 psi, or any integer value for psi from 2 to 20, or any range formed by any of these values, such as 3-15 psi, 4-11 psi, 5-9 psi, 6-8 psi, etc. For any of the embodiments of flexible containers, disclosed herein, its one or more flexible materials can be expanded at various points in time, with respect to its manufacture, sale, and use, including, for example: before, during, or after its product space(s) are filled with fluent product(s), before or after the flexible container is shipped to a seller, and before or after the flexible container is purchased by an end user.

As used herein, when referring to a product space of a flexible container, the term "filled" refers to the state of the product space in the container (which is fully manufactured) after the filling of its product space(s) with fluent product(s) is complete and the container is fully closed and/or sealed, wherein the container has not been opened or unsealed, and wherein the fluent product(s) in the container have not been put into its/their intended end use.

A filled product space may or may not include an allowance for headspace, depending on the kind of fluent product(s) being contained, and the requirements for containing the fluent product(s). As an example, a manufacturer can label a flexible container with an external amount indicium that indicates a listed amount of a fluent product that is being offered for sale with the container, can add to the product space of the container an actual amount of the fluent product that is nearly equal to the listed amount (but still includes a headspace that is designed for that fluent product in that product space), and can close the container so the container is configured for retail sale; that container is considered filled. As used herein, the term filled can be modified by using the term filled with a particular percentage value.

As used herein, the term "flat" refers to a surface that is without significant projections or depressions.

As used herein, the term "flexible container" refers to a container with a product space, wherein one or more flexible materials form 50-100% of the overall surface area of the one or more materials that define the three-dimensional space of the product space. For any of the embodiments of flexible containers, disclosed herein, in various embodiments, the flexible container can be configured to have a product space, wherein one or more flexible materials form a particular percentage of the overall area of the one or more materials that define the three-dimensional space, and the particular percentage is any integer value for percentage from 50% to 100%, or within any range formed by any of these values, such as: 60-100%, or 70-100%, or 80-100%, or 90-100%, etc. One kind of flexible container is a film-based container, which is a flexible container made from one or more flexible materials, which include a film.

For any of the embodiments of flexible containers, disclosed herein, in various embodiments, the middle of the flexible container (apart from any product, such as fluent product(s)) can be configured to have an overall middle mass, wherein one or more flexible materials form a particular percentage of the overall middle mass, and the particular percentage is any integer value for percentage from 50% to 100%, or within any range formed by any of the preceding values, such as: 60-100%, or 70-100%, or 80-100%, or 90-100%, etc.

For any of the embodiments of flexible containers, disclosed herein, in various embodiments, the entire flexible container (apart from any product, such as fluent product(s)) can be configured to have an overall mass, wherein one or more flexible materials form a particular percentage of the overall mass, and the particular percentage is any integer value for percentage from 50% to 100%, or within any range formed by any of the preceding values, such as: 60-100%, or 70-100%, or 80-100%, or 90-100%, etc.

As used herein, the term "flexible material" refers to a thin, easily deformable, sheet-like material, having a flexibility factor within the range of 1,000-2,500,000 N/m. As examples, a flexible material may have a flexibility factor of 1,000-1,250,500 N/m, 1,000-750,700 N/m, 1,000-500,800 N/m, 1,000-250,900 N/m, 1,000-63,475 N/m, 1,000-25,990 N/m, 1,000-13,495 N/m, 13,495-1,250,500 N/m, 25,990-750,700 N/m, 63,475-500,800 N/m, 125,950-250-900 N/m, 13,495-2,500,000 N/m, 12,990-2,500,000 N/m, 63,475-2,500,000 N/m, 125,950-2,500,000 N/m, 250,900-2,500,000 N/m, 500,800-2,500,000 N/m, 750,700-2,500,000 N/m, 1,250,500-2,500,000 N/m, etc. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate (e.g. a multi-layered extruded film laminate), or as part(s) of a composite material, or in a microlayered or nanolayered structure, or with or without one or more of any suitable additives (such as perfumes, dyes, pigments, particles, agents, actives, fillers (e.g. fibers, reinforcing structures), etc.) and in any combination, as described herein or as known in the art. As further examples, a flexible container can be made from one or more of any flexible material disclosed in: U.S. patent application Ser. No. 13/889,090 entitled "Flexible Material for Flexible Containers," published as US20130294711; and U.S. patent application Ser. No. 13/889,061 entitled "Flexible Material for Flexible Containers," published as US20130337244. And, still further, part, parts, or all of an outside surface of a flexible container can be covered with a cover material as described in U.S. patent application Ser. No. 14/448,599 filed Jul. 31, 2014, entitled "Enhancements to Tactile Interaction with Film Walled Packaging Having Air Filled Structural Support Volumes," published as US20150034662.

A flexible material can be provided in the form of discrete sheets or continuous webs. When a discrete sheet of flexible material is used in the making process, the sheet can be sized for converting into one or more parts of a container blank, for converting into a single container blank, or for converting into multiple container blanks. When a continuous web of flexible material is used in the making process, any number of webs can be joined together in a single web and/or separated into different webs to provide flexible materials of appropriate size and properties. When a continuous web of flexible material is used in the making process, the web can be sized for converting into any number of container blanks in any orientation. In various embodiments, part or parts of a flexible material can also be provided in the form of small sections (i.e. patches), which can be attached to sheets and/or webs in any way known in the art (e.g. by a servo-driven patch placer).

The flexible materials used to make the flexible containers disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, when referring to a flexible container, the term "flexibility factor" refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, when referring to a flexible container, the term "fluent product" refers to one or more liquids and/or pourable solids, and combinations thereof. Examples of fluent products include one or more of any of the following: bites, bits, creams, chips, chunks, crumbs, crystals, emulsions, flakes, gels, grains, granules, jellies, kibbles, liquid solutions, liquid suspensions, lotions, nuggets, ointments, particles, particulates, pastes, pieces, pills, powders, salves, shreds, sprinkles, and the like, either individually or in any combination. Throughout the present disclosure the terms "fluent product" and "flowable product" are used interchangeably and are intended to have the same meaning. Any of the product spaces disclosed herein can be configured to include one or more of any fluent product disclosed herein, or known in the art, in any combination.

As used herein, when referring to a flexible container, the term "formed" refers to the state of one or more materials that are configured to be formed into a product space, after the product space is provided with its defined three-dimensional space.

As used herein, the term "indirectly connected" refers to a configuration wherein elements are attached to each other with one or more intermediate elements therebetween.

As used herein, the term "joined" refers to a configuration wherein elements are either directly connected or indirectly connected.

As used herein, the term "lateral" refers to a direction, orientation, or measurement that is parallel to a lateral centerline of a container, when the container is standing upright or hanging down from a support, as described herein. A lateral orientation may also be referred to a "horizontal" orientation, and a lateral measurement may also be referred to as a "width."

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with a differing first digit, wherein that first digit matches the number for its figure; as an example, an element of FIG. 3 labeled 320 and an element of FIG. 4A labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-a and a second embodiment of an element in FIG. 3B labeled 320-b, are like numbered.

As used herein, the term "longitudinal" refers to a direction, orientation, or measurement that is parallel to a longitudinal centerline of a container, when the container is standing upright on a horizontal support surface or hanging down from a support, as described herein. A longitudinal orientation may also be referred to a "vertical" orientation. When expressed in relation to a horizontal support surface for a container, a longitudinal measurement may also be referred to as a "height", measured above the horizontal support surface.

As used herein, when referring to a flexible container, the term "middle" refers to the portion of the container that is located in between the top of the container and the bottom of the container. As used herein, the term middle can be modified by describing the term middle with reference to a particular percentage value for the top and/or a particular percentage value for the bottom. For any of the embodiments of flexible containers, disclosed herein, a reference to the middle of the container can, in various alternative embodiments, refer to the portion of the container that is located between any particular percentage value for the top, disclosed herein, and any particular percentage value for the bottom, disclosed herein, in any combination.

As used herein, the term "nearly" modifies a particular value, by referring to a range equal to the particular value, plus or minus five percent (+/−5%). The term "nearly" can also be used to modify a particular condition, by referring to a range of conditions that are within five percent (+/−5%) of the particular condition. For any of the embodiments of flexible containers, disclosed herein, any disclosure of a particular value or condition is also intended to be a disclosure of various alternative embodiments of that flexible container, with the value or condition being variable within the range of nearly (i.e. within 5%).

As used herein, when the term "nearly" refers to the flatness of one or more flexible materials, the phrase "nearly flat" means that the flexible material fits between two parallel planes set apart by a separation distance that is equal to the average overall thickness of the material plus 1.0 millimeter.

As used herein, when referring to a flexible container, the term "non-durable" refers to a container that is temporarily reusable or disposable.

As used herein, when referring to a flexible container, the term "nonstructural panel" refers to a layer of one or more (e.g. two, three, four, or more) adjacent sheets of flexible material(s) that are not formed into a stiffened member (in other words, a nonstructural panel differs from an expanded structural support volume); the panel has an outermost major surface that faces outward toward the environment outside of the flexible container and an innermost major surface that faces inward toward one or more product spaces and/or mixing spaces disposed within the flexible container; a nonstructural panel is configured such that the layer does not independently provide substantial support in making the container self-supporting and/or standing upright; a nonstructural panel is considered nonstructural because it is not configured to carry compressive loads in a flexible container. In various embodiments, part, parts, about all, approximately all, substantially all, nearly all, or all of a nonstructural panel may overlay part, parts, about all, approximately all, substantially all, nearly all, or all of one or more product spaces and/or one or more mixing spaces. In some embodiments, a nonstructural panel may be configured to be a squeeze panel.

As used herein, the term "product space" refers to an enclosable three-dimensional space that is configured to receive and directly contain one or more fluent product(s), wherein that space is defined by one or more materials that form a barrier that prevents the fluent product(s) from escaping the product space. By directly containing the one or more fluent products, the fluent products come into contact with the materials that form the enclosable three-dimensional space; there is no intermediate material or container, which prevents such contact. Throughout the present disclosure the terms "product space," "product volume," and "product receiving volume" are used interchangeably and are intended to have the same meaning. Any of the embodiments of flexible containers, disclosed herein, can be configured to have any number of product spaces including one product space, two product spaces, three product spaces, or even more product spaces. In some embodiments, one or more product spaces can be enclosed within another product space. Any of the product spaces disclosed herein can have a product space of any size, including from 0.001 liters to 100.0 liters, or any value in increments of 0.001 liters from 0.001 liters to 100.0 liters, or any value in increments of 0.01 liters from 3.0 liters to 10.0 liters, or any value increments of 1.0 liters from 10.0 liters to 100.0 liters, or within any range formed by any of the preceding values, such as: from 0.001 to 2.2 liters, 0.01 to 2.0 liters, 0.05 to 1.8 liters, 0.1 to 1.6 liters, 0.15 to 1.4 liters, 0.2 to 1.2 liters, 0.25 to 1.0 liters, etc. A product space can have any shape in any orientation. A product space can be included in a flexible container that has a structural support frame, and a product space can be included in a flexible container that does not have a structural support frame. In various embodiments, any product space or any number of product spaces in a flexible container can be configured according to any of the embodiments for product volumes disclosed in U.S. patent application Ser. No. 13/889,000 filed May 7, 2013, entitled "Flexible Containers with Multiple Product Volumes," published as US20130292413. In various embodiments, any product space in a flexible container can be configured according to any of the embodiments for product volumes disclosed in U.S. patent application Ser. No. 14/534,198 filed Nov. 6, 2014, entitled "Easy to Empty Flexible Containers," published as US20150122841.

As used herein, the term "sealed," when referring to a product space, refers to a state of the product space wherein fluent products within the product space are prevented from escaping the product space (e.g. by one or more materials that form a barrier, and by a seal), and the product space is hermetically sealed.

As used herein, the term "sealing" refers to locally joining together flexible materials over one or more limited portions of their faces (i.e. seals). Any of the seals described herein can have any convenient width, including from 1 to 22 millimeters, or any value in increments of millimeters from 1 to 22, or any range formed by any of the preceding values, such as 1-12 mm, 1-6 mm, 1-3 mm, 1-2 mm, 6-12 mm, 2-3 mm, 2-22 mm, 3-22 mm, 6-22 mm, or 12-22 mm.

As used herein, the term "squeeze panel" refers to a nonstructural panel that is under tension generated and maintained across the nonstructural panel by one or more expanded structural support volumes; a squeeze panel is configured within a flexible container such that, when a force is externally applied to the squeeze panel, an underlying product/mixing space is deformed, which causes one or more fluent products to flow from that product/mixing space, through a dispenser, to an exterior of the flexible container.

As used herein, when referring to a flexible container, the term "structural support frame" refers to a stiffened structure formed of one or more expanded structural support members, joined together, around one or more sizable empty spaces and/or one or more nonstructural panels, and generally used as a major support for the product space(s) in the flexible container and in making the container self-supporting and/or standing upright. In each of the embodiments disclosed herein, when a flexible container includes a structural support frame and one or more product spaces, the structural support frame is considered to be supporting the product space(s) of the container, unless otherwise indicated.

As used herein, when referring to a flexible container, the term "structural support member" refers to a sturdy physical structure, which includes one or more expanded structural support volumes, and which is configured to be used in a structural support frame, to carry one or more loads (from the flexible container) across a span. A structure that does not include at least one expanded structural support volume, is not considered to be a structural support member, as used herein.

A structural support member has two defined ends, a middle between the two ends, and an overall length from its one end to its other end. A structural support member can have one or more cross-sectional areas, each of which has an overall width that is less than its overall length.

A structural support member can be configured in various forms. A structural support member can include one, two, three, four, five, six or more structural support volumes, arranged in various ways. For example, a structural support member can be formed by a single structural support volume. As another example, a structural support member can be formed by a plurality of structural support volumes, disposed end to end, in series, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other. As a further example, a structural support member can be formed by a plurality of support volumes disposed side by side, in parallel, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other.

In some embodiments, a structural support member can include a number of different kinds of elements. For example, a structural support member may include one or more structural support volumes along with one or more mechanical reinforcing elements (e.g. braces, collars, connectors, joints, ribs, etc.), which can be made from one or more rigid (e.g. solid) materials; alternatively a structural support member may not include any mechanical reinforcing elements.

Structural support members can have various shapes and sizes. Part, parts, or about all, or approximately all, or substantially all, or nearly all, or all of a structural support member can be straight, curved, angled, segmented, or other shapes, or combinations of any of these shapes. Part, parts, or about all, or approximately all, or substantially all, or nearly all, or all of a structural support member can have any suitable cross-sectional shape, such as circular, oval, square, triangular, star-shaped, or modified versions of these shapes, or other shapes, or combinations of any of these shapes. A structural support member can have an overall shape that is tubular, or convex, or concave, along part, parts, or about all, or approximately all, or substantially all, or nearly all, or all of a length. A structural support member can have any suitable cross-sectional area, any suitable overall width, and any suitable overall length. A structural support member can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of a structural support member can increase or decrease along part, parts, or all of its length. Part, parts, or all of any of the embodiments of structural support members of the present disclosure, can be configured according to any embodiment disclosed herein, including any workable combination of structures, features, materials, and/or connections from any number of any of the embodiments disclosed herein.

As used herein, when referring to a flexible container, the term "structural support volume" refers to a fillable space made from one or more flexible materials, wherein the space is configured to be at least partially filled with one or more expansion materials, which create tension in the one or more flexible materials, and form an expanded structural support volume. One or more expanded structural support volumes can be configured to be included in a structural support member. A structural support volume is distinct from structures configured in other ways, such as: structures without a fillable space (e.g. an open space), structures made from inflexible (e.g. solid) materials, structures with spaces that are not configured to be filled with an expansion material (e.g. an unattached area between adjacent layers in a multi-layer panel), and structures with flexible materials that are not configured to be expanded by an expansion material (e.g. a space in a structure that is configured to be a non-structural panel). Notably, in various embodiments, any spaces defined by the unattached area between adjacent layers in a multi-layer panel may contain any gas or vapor composition of single or multiple chemistries including air. Throughout the present disclosure the terms "structural support volume" and "expandable chamber" are used interchangeably and are intended to have the same meaning.

In some embodiments, a structural support frame can include a plurality of structural support volumes, wherein some of or all of the structural support volumes are in fluid communication with each other. In other embodiments, a structural support frame can include a plurality of structural support volumes, wherein some of or none of the structural support volumes are in fluid communication with each other. Any of the structural support frames of the present disclosure can be configured to have any kind of fluid communication disclosed herein.

As used herein, the term "substantially" modifies a particular value, by referring to a range equal to the particular value, plus or minus ten percent (+/−10%). The term "substantially" can also be used to modify a particular condition, by referring to a range of conditions that are within ten percent (+/−10%) of the particular condition. For any of the embodiments of flexible containers, disclosed herein, any disclosure of a particular value or condition is also intended to be a disclosure of various alternative embodiments of that flexible container, with the value or condition being variable within the range of substantially (i.e. within 10%).

As used herein, when the term "substantially" refers to the flatness of one or more flexible materials, the phrase "substantially flat" means that the flexible material fits between two parallel planes set apart by a separation distance that is equal to the average overall thickness of the material plus 2.0 millimeters.

As used herein, when referring to a flexible container, the term "temporarily reusable" refers to a container which, after dispensing a product to an end user, is configured to be refilled with an additional amount of a product, up to ten times, before the container experiences a failure that renders it unsuitable for receiving, containing, or dispensing the product. As used herein, the term temporarily reusable can be further limited by modifying the number of times that the container can be refilled before the container experiences such a failure. For any of the embodiments of flexible containers, disclosed herein, a reference to temporarily reusable can, in various alternative embodiments, refer to temporarily reusable by refilling up to eight times before failure, by refilling up to six times before failure, by refilling up to four times before failure, or by refilling up to two times before failure, or any integer value for refills from one to ten times before failure. Any of the embodiments of flexible containers, disclosed herein, can be configured to be temporarily reusable, for the number of refills disclosed herein.

As used herein, when referring to a measurement on a flexible container, the term "thickness" refers to a measurement that is parallel to a third centerline of the container, when the container is standing upright or hanging down from a support, as described herein. A thickness may also be referred to as a "depth."

As used herein, when referring to a flexible container, the term "top" refers to the portion of the container that is located in the uppermost 20% of the overall height of the container, that is, from 80-100% of the overall height of the container. As used herein, the term top can be further limited by modifying the term top with a particular percentage value, which is less than 20%. For any of the embodiments of flexible containers, disclosed herein, a reference to the top of the container can, in various alternative embodiments, refer to the top 15% (i.e. from 85-100% of the overall height), the top 10% (i.e. from 90-100% of the overall height), or the top 5% (i.e. from 95-100% of the overall height), or any integer value for percentage from 0% to 20%.

As used herein, when referring to a flexible container, the term "unexpanded" refers to the state of one or more materials that are configured to be formed into a structural support volume, before the structural support volume is made stiff by an expansion material.

As used herein, when referring to a product space of a flexible container, the term "unfilled" refers to the state of the product space when it does not contain a fluent product.

As used herein, when referring to a flexible container, the term "unformed" refers to the state of one or more materials that are configured to be formed into a product space, before the product space is provided with its defined three-dimensional space. For example, an article of manufacture could be a container blank with an unformed product space, wherein sheets of flexible material, with portions joined together, are laying flat against each other.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of making disposable, flexible containers for fluent products, the method comprising:
    forming a partially completed container blank that includes a flexible inner sheet and a flexible outer sheet, which together form a layered structure that includes:
        a first layer, which is an outer layer of the layered structure, and is formed by the flexible outer sheet;
        a second layer, which is an inner layer adjacent to the first layer, and is formed by the flexible inner sheet;
        a third layer, which is the inner layer, and is formed by the flexible inner sheet; and
        a fourth layer, which is the outer layer of the layered structure, and is formed by the flexible outer sheet;
        a first space, disposed between the second and third layers; and
        a second space, at least partially disposed between the first and second layers;
    filling the first space with a fluent product;
    adding into the second space an effective amount of expansion material;
    within 10 seconds after adding the expansion material, pressing part of the first layer against part of the second layer, such that:
        the second space is fully closed off from the environment outside of the partially completed container blank; and a contact area forms, between the first layer and the second layer;

for a portion of the layered structure that extends across the entire width of the blank, from the contact area to 25 millimeters above the contact area, the portion is approximately flat;

while the second space is fully closed off, locally sealing together two or more of the layers within the portion.

2. The method of claim 1, including beginning the pressing within 1.0 second after adding an effective amount of the expansion material.

3. The method of claim 1, including beginning the pressing within 0.5 seconds after adding an effective amount of the expansion material.

4. The method of claim 1, including beginning the pressing within 0.1 second after adding an effective amount of the expansion material.

5. The method of claim 1 including beginning the pressing while expansion material is still being added.

6. The method of claim 1, wherein the pressing is such that the portion is substantially flat.

7. The method of claim 1, wherein the pressing is such that the portion is nearly flat.

8. The method of claim 1, wherein the portion extends from an uppermost extent of the contact area to 50 millimeters above the uppermost extent.

9. The method of claim 1, wherein the portion extends from an uppermost extent of the contact area to a top edge of the partially completed container blank.

10. The method of claim 1, including, changing at least 50% of the expansion material from a liquid to a gas, during the pressing.

11. The method of claim 1, including, changing at least 75% of the expansion material from a liquid to a gas, during the pressing.

12. The method of claim 1, including, changing all of the expansion material from a liquid to a gas, during the pressing.

13. The method of claim 1, wherein, the local sealing includes hermetically sealing the first space to form a sealed product space.

14. The method of claim 1, wherein, the local sealing includes hermetically sealing the second space to form one or more structural support volumes.

15. The method of claim 1, including:

determining a location of a registration mark on the portion during the pressing; and further processing the partially completed container blank, using the location of the registration mark.

16. The method of claim 1, including, during the pressing, cutting through the portion using a laser.

17. The method of claim 1, including, during the pressing, scoring the portion using a laser.

18. The method of claim 1, wherein the pressing includes using one or more pinch grippers.

19. The method of claim 18, wherein, during the pressing, the partially completed container blank is held only by the one or more pinch grippers.

20. The method of claim 18 wherein at least one pinch gripper has a surface facing said partially completed container blank with a recess therein, wherein the recess in the surface of said pinch gripper allows the first space with fluent product therein to vent.

* * * * *